United States Patent
Sato et al.

(10) Patent No.: US 10,862,169 B2
(45) Date of Patent: Dec. 8, 2020

(54) PHOSPHORUS ELECTROLYTIC SOLUTION CONTAINING MAGNESIUM IONS

(71) Applicant: FUJIFILM Wako Pure Chemical Corporation, Osaka (JP)

(72) Inventors: Kazuhiko Sato, Saitama (JP); Goro Mori, Saitama (JP); Hiromi Watahiki, Saitama (JP); Kuniaki Okamoto, Saitama (JP); Nobutaka Shimamura, Saitama (JP)

(73) Assignee: FUJIFILM WAKO PURE CHEMICAL CORPORATION, Osaka (JP)

(*) Notice: Subject to any disclaimer, the term of this patent is extended or adjusted under 35 U.S.C. 154(b) by 85 days.

(21) Appl. No.: 16/304,488

(22) PCT Filed: May 26, 2017

(86) PCT No.: PCT/JP2017/019648
§ 371 (c)(1),
(2) Date: Nov. 26, 2018

(87) PCT Pub. No.: WO2017/204322
PCT Pub. Date: Nov. 30, 2017

(65) Prior Publication Data
US 2019/0296396 A1    Sep. 26, 2019

(30) Foreign Application Priority Data
May 27, 2016 (JP) ................... 2016-106718

(51) Int. Cl.
H01M 10/0567 (2010.01)
C07F 19/00 (2006.01)
(Continued)

(52) U.S. Cl.
CPC ......... H01M 10/0567 (2013.01); C07F 19/00 (2013.01); H01M 10/054 (2013.01);
(Continued)

(58) Field of Classification Search
None
See application file for complete search history.

(56) References Cited

U.S. PATENT DOCUMENTS

2014/0349178 A1* 11/2014 Mohtadi ........... H01M 10/0568
429/200

FOREIGN PATENT DOCUMENTS

| JP | 5617131 B | 11/2014 |
| JP | 5786540 B | 9/2015 |

OTHER PUBLICATIONS

Grim, et al., "Synthesis and Magnetic Resonance Studies of Some Phosphinous Acids, Phosphorylacetic Acids, and Some of their Coordination Compounds", 1977, J. Inorg. Nucl. Chem., vol. 39, pp. 499-511.*

(Continued)

*Primary Examiner* — Daniel S Gatewood
(74) *Attorney, Agent, or Firm* — Hamre, Schumann, Mueller & Larson, P.C.

(57) ABSTRACT

The present invention relates to an electrolytic solution for a magnesium battery, formed by mixing a compound represented by the following general formula (I), a Lewis acid or a compound represented by the following general formula (A), and a solvent; and the like.

(Continued)

{In the formula, m represents 0 or 2, n represents 2 in a case of m=0 and represents 0 or 1 in a case of m=2, $X^1$ represents a chlorine atom or a bromine atom, and two $R^1$'s each independently represent a magnesium chloride oxy group; a magnesium bromide oxy group; an alkyl group which may have a halogeno group or the like as a substituent; an alkoxy group; an aryl group which may have an alkoxy group or the like as a substituent; an aryloxy group which may have an alkoxy group or the like as a substituent; or a group represented by the following general formula (1), and two $R^1$'s may also form the following general formula (2).}

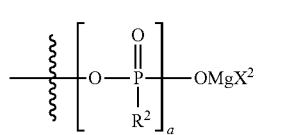

(1)

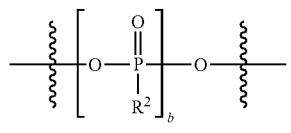

(2)

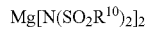

(A)

$Mg[N(SO_2R^{10})_2]_2$ (In the formula, four $R^{10}$'s each independently represent an alkyl group, a perfluoroalkyl group, a phenyl group, or a perfluorophenyl group.)

12 Claims, 8 Drawing Sheets

(51) Int. Cl.
  *H01M 10/054* (2010.01)
  *H01M 10/0568* (2010.01)
  *H01M 10/0569* (2010.01)
  *C07F 9/30* (2006.01)
  *C07F 9/46* (2006.01)
  *C07F 3/02* (2006.01)
  *C07F 9/38* (2006.01)

(52) U.S. Cl.
  CPC ... *H01M 10/0568* (2013.01); *H01M 10/0569* (2013.01); *C07F 3/02* (2013.01); *C07F 9/30* (2013.01); *C07F 9/38* (2013.01); *C07F 9/46* (2013.01); *H01M 2300/0025* (2013.01)

(56) References Cited

OTHER PUBLICATIONS

Aurbach, et al, "Prototype systems for rechargeable magnesium batteries", Nature, vol. 407, Oct. 12, 2000, pp. 724-727.
Wang, et al., "A novel electrolyte system without a Girgnard reagent for rechargeable magnesium batteries", Chem. Commun., vol. 48, 2012, pp. 10763-10765.
Liao, et al., "Highly soluble alkoxide magnesium salts for rechargeable magnesium batteries", Journal of Materials Chemistry A, 2, 2014, pp. 581-884.
Grim, et al., "Synthesis and Magnetic Resonance Studies of Some Phosphinous Acids, Phosphorylacetic Acids, and Some of their Coordination Compounds" J. Inorg. Nucl. Chem., vol. 39, No. 3, 1977, pp. 499-511.
Marynick, et al., "Theoretical Studies of Metal-phosphate interactions: Interation of Li+, Na+, K+, Be++, Mg++, and Ca++ with H2PO4- and (CH3O)2PO2-: Implications for nucleic acid solvation", Proc. Nat. Acad. Sci. USA, vol. 72, No. 10, Oct. 1975, pp. 3794-3798.
International Search Report issued in International Application No. PCT/JP2017/019648, dated Jul. 4, 2017, 2 pages.

* cited by examiner

PHOSPHORUS ELECTROLYTIC SOLUTION CONTAINING MAGNESIUM IONS

TECHNICAL FIELD

The present invention relates to an electrolytic solution containing magnesium ions and an electrochemical device containing the electrolytic solution.

BACKGROUND ART

Magnesium has large electric capacity per unit volume because its ion is polyvalent ion. In addition, magnesium has advantage compared to lithium in that it has a higher melting point and is safer, and further in that, magnesium resources are relatively evenly distributed on earth, the resources are abundant on earth, and magnesium is inexpensive. Therefore, a magnesium ion used battery adopting metallic magnesium as a negative electrode is drawing attention as a next-generation battery replacing a lithium ion battery.

However, in the magnesium ion used battery adopting metallic magnesium as a negative electrode, the magnesium reacts with an electrolytic solution owing to its high reducibility, and as a result, a passive film is formed on the electrode surface. Consequently, reversible deposition/dissolution of the magnesium is hindered, which makes it difficult for a negative electrode reaction to occur.

As an electrolytic solution which does not form the passive film, an electrolytic solution in which a Grignard reagent RMgX (R is an alkyl group or an aryl group, and X is chlorine or bromine) is dissolved in tetrahydrofuran (THF) is known, and this electrolytic solution has been confirmed to enable the reversible deposition/dissolution of magnesium. However, since the Grignard reagent RMgX is strongly basic, the electrolytic solution has a safety issue. Furthermore, unfortunately, the electrolytic solution is impractical since oxidation resistance thereof is low.

Therefore, an electrolytic solution having improved safety and performance has been developed by mixing the strongly basic Grignard reagent or an organic magnesium reagent with a Lewis acid having aluminum. For example, Aurbach and others have reported a THF solution of $Mg(AlCl_2BuEt)_2$ obtained by mixing dibutylmagnesium $Bu_2Mg$ with ethylaluminum dichloride $EtAlCl_2$ (Non-Patent Literature 1). In addition, Wang and others have reported an electrolytic solution obtained by mixing a non-nucleophilic phenoxide-based magnesium salt with aluminum chloride, and Liao and others have reported an electrolytic solution obtained by mixing a non-nucleophilic alkoxide-based magnesium salt with aluminum chloride (Non-Patent Literatures 2 and 3).

In addition, as an electrolytic solution for a lithium ion battery, an electrolytic solution in which lithium hexafluorophosphate ($LiPF_6$) is dissolved in a carbonate-based solvent has been widely put into practical use, but for an electrolytic solution for a magnesium ion used battery, there are few examples of the electrolytic solutions containing a phosphorus element. As an example in which a phosphorus element is used, for example, an ester-based electrolytic solution obtained by mixing a fused phosphoric acid with a magnesium ion (Patent Literature 1), a non-aqueous magnesium ion electrolytic solution containing a phosphorus-containing organic compound, a halogen, and magnesium ions, and the like have been reported (Patent Literature 2).

CITATION LIST

Patent Literature

Patent Literature 1: JP5617131B
Patent Literature 2: JP5786540B

Non-Patent Literature

Non-Patent Literature 1: Nature, 407, p. 724-727 (2000)
Non-Patent Literature 2: Chem. Commun., 48, 10763-10765 (2012)
Non-Patent Literature 3: J. Mater. Chem. A, 2, 581-584 (2014)

SUMMARY OF INVENTION

Technical Problem

The electrolytic solutions reported in Non-Patent Literatures 1 to 3 all exhibited the behavior of reversible deposition/dissolution of magnesium, but only had an oxidative stability of approximately 2.5 V for magnesium, and the oxidation resistance of the electrolytic solutions for putting a magnesium ion used battery as a substitute for a lithium ion battery into practical use was insufficient. In addition, both of electrolytic solutions containing a phosphorus element, such as those reported in Patent Literatures 1 and 2, did not obviously exhibit the behavior of reversible deposition/dissolution of magnesium, and their oxidation resistance was not obvious, neither.

In view of the circumstances, the present inventors have conducted extensive studies, and as a result, they have found an electrolytic solution formed by mixing a magnesium salt of a phosphoric acid analog or a condensate thereof with a Lewis acid or magnesium sulfonimide having a specific structure in an appropriate solvent has an excellent oxidative stability of 3 V or more, thus leading to completion of the present invention. That is, the present invention has an object to provide an electrolytic solution which has high oxidation resistance to magnesium and good practical uses, and allows dissolution•precipitation of magnesium to proceed repeatedly and stably.

Solution to Problem

The present invention relates to "an electrolytic solution for a magnesium battery, formed by mixing a compound represented by the following general formula (I), a Lewis acid or a compound represented by the following general formula (A), and a solvent (hereinafter abbreviated as the electrolytic solution of the present invention in some cases):

{in the formula, m represents 0 or 2, n represents 2 in a case of m=0 and represents 0 or 1 in a case of m=2, $X^1$ represents a chlorine atom or a bromine atom, two $R^1$'s each independently represent a magnesium chloride oxy group (—OMgCl); a magnesium bromide oxy group (—OMgBr); an alkyl group having 1 to 6 carbon atoms, which may have a halogeno group or an alkoxy group as a substituent; an alkoxy group having 1 to 6 carbon atoms; an aryl group having 6 to 10 carbon atoms, which may have a halogeno group, an alkyl group, a halogenoalkyl group, or an alkoxy group as a substituent; an aryloxy group having 6 to 10 carbon atoms, which may have a halogeno group, an alkyl group, a halogenoalkyl group, or an alkoxy group as a substituent; or a group represented by the following general formula (1), and two $R^1$'s may form the following general formula (2):

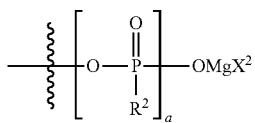

(1)

(in the formula, a represents an integer of 1 to 3, $X^2$ represents a chlorine atom or a bromine atom, and a pieces of $R^2$'s each independently represent a magnesium chloride oxy group (—OMgCl); a magnesium bromide oxy group (—OMgBr); an alkyl group having 1 to 6 carbon atoms, which may have a halogeno group or an alkoxy group as a substituent; an alkoxy group having 1 to 6 carbon atoms; an aryl group having 6 to 10 carbon atoms, which may have a halogeno group, an alkyl group, a halogenoalkyl group, or an alkoxy group as a substituent; or an aryloxy group having 6 to 10 carbon atoms, which may have a halogeno group, an alkyl group, a halogenoalkyl group, or an alkoxy group as a substituent); and

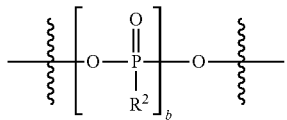

(2)

(in the formula, b represents an integer of 1 to 3, and $R^2$ is the same as described above)}; and

$Mg[N(SO_2R^{10})_2]_2$ (A)

(in the formula, four $R^{10}$'s each independently represent an alkyl group having 1 to 6 carbon atoms, a perfluoroalkyl group having 1 to 6 carbon atoms, a phenyl group, or a perfluorophenyl group)",
"an electrochemical device comprising the electrolytic solution, a positive electrode, and a negative electrode", and
"a compound represented by the following general formula (I'):

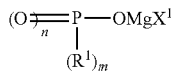

(I')

{in the formula, m represents 0 or 2, n represents 2 in a case of m=0 and represents 0 or 1 in a case of m=2, $X^1$ represents a chlorine atom or a bromine atom, two $R^1$'s each independently represent a magnesium chloride oxy group (—OMgCl); a magnesium bromide oxy group (—OMgBr); an alkyl group having 1 to 6 carbon atoms, which may have a halogeno group or an alkoxy group as a substituent; an alkoxy group having 1 to 6 carbon atoms; an aryl group having 6 to 10 carbon atoms, which may have a halogeno group, an alkyl group, a halogenoalkyl group, or an alkoxy group as a substituent; an aryloxy group having 6 to 10 carbon atoms, which may have a halogeno group, an alkyl group, a halogenoalkyl group, or an alkoxy group as a substituent; or a group represented by the following general formula (1), and two $R^1$'s may form the following general formula (2):

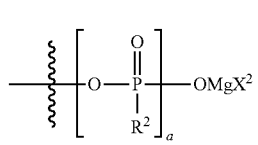

(1)

(in the formula, a represents an integer of 1 to 3, $X^2$ represents a chlorine atom or a bromine atom, and a pieces of $R^2$'s each independently represent a magnesium chloride oxy group (—OMgCl); a magnesium bromide oxy group (—OMgBr); an alkyl group having 1 to 6 carbon atoms, which may have a halogeno group or an alkoxy group as a substituent; an alkoxy group having 1 to 6 carbon atoms; an aryl group having 6 to 10 carbon atoms, which may have a halogeno group, an alkyl group, a halogenoalkyl group, or an alkoxy group as a substituent; or an aryloxy group having 6 to 10 carbon atoms, which may have a halogeno group, an alkyl group, a halogenoalkyl group, or an alkoxy group as a substituent); and

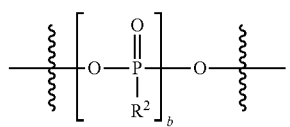

(2)

(in the formula, b represents an integer of 1 to 3, and $R^2$ is the same as described above), provided that (i) a case where m=2, n=0, and two $R^1$'s are the same unsubstituted aryl group having 6 to 10 carbon atoms, and (ii) a case where m=2, n=1, and two $R^1$'s are the same alkoxy group having 1 to 6 carbon atoms are excluded}".

Advantageous Effects of Invention

The electrolytic solution of the present invention can be used as an electrolytic solution for a high-voltage magnesium battery since it has high oxidation resistance, as compared with electrolytic solutions in the related art. In addition, the electrolytic solution of the present invention exhibits an effect that dissolution•precipitation of magnesium proceeds repeatedly and stably in a case of being used as an electrolytic solution for a magnesium secondary battery. In addition, the electrolytic solution of the present invention can be easily prepared and also has excellent storage stability.

(immediately after preparation of the solution: solid line, and after the passage of one month: dashed line).

Figure 2:
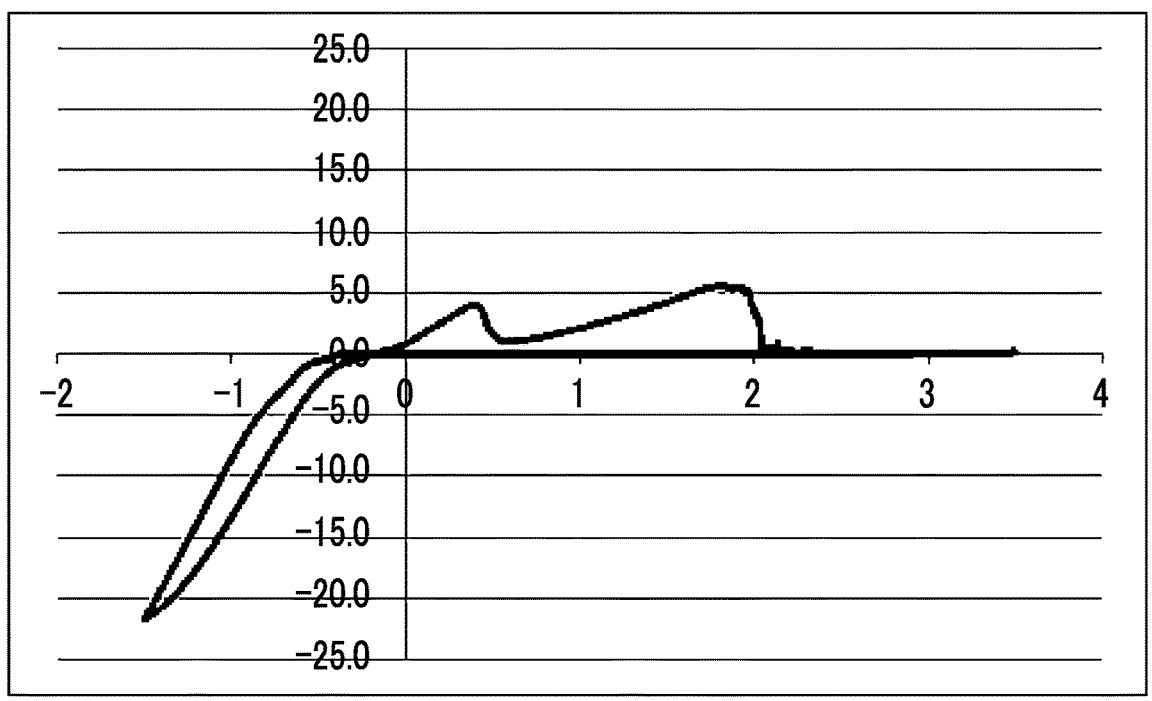

FIG. 2 shows a graph illustrating the results from 10 cycles in CV measurement using an electrolytic solution 2 [orthophosphoric acid tris(magnesium chloride) salt-magnesium bis(trifluoromethanesulfonyl)imide/triglyme solution] in Experimental Example 1.

Figure 3:
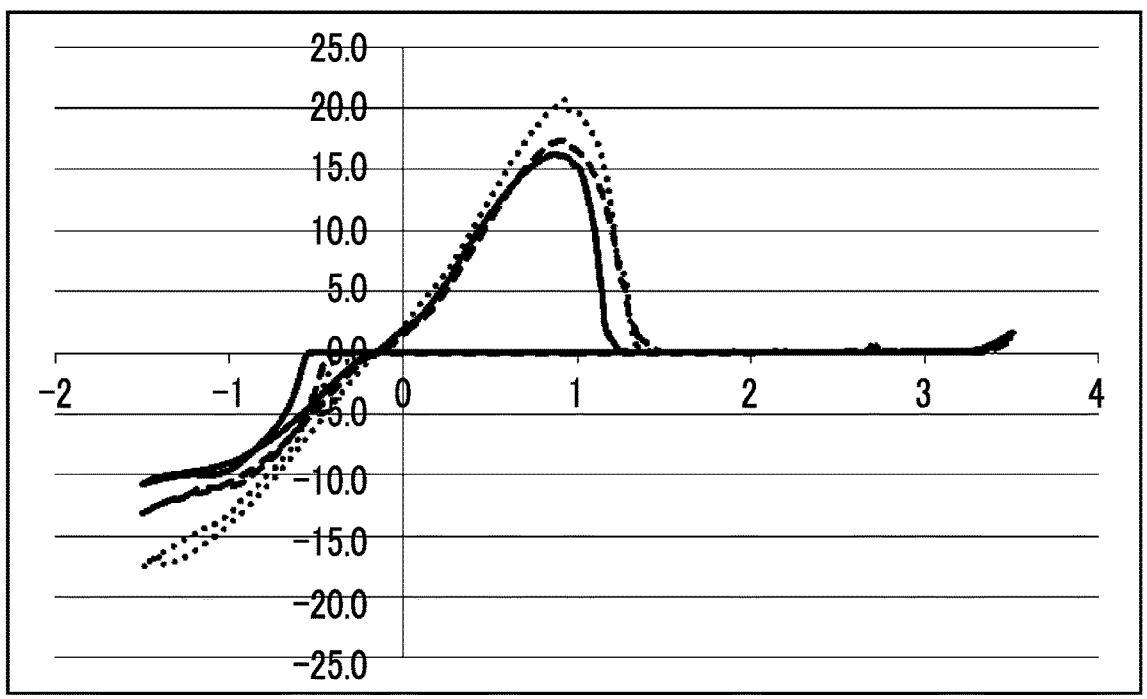

FIG. 3 shows a graph illustrating the results from 1 cycle, 10 cycles, and 30 cycles in CV measurement using an electrolytic solution 3 [phenylphosphonic acid bis(magnesium chloride) salt-aluminum chloride/triglyme solution] in Experimental Example 1 (1$^{st}$ cycle: solid line, 10$^{th}$ cycle: dashed line, and 30$^{th}$ cycle: dotted line).

Figure 4:
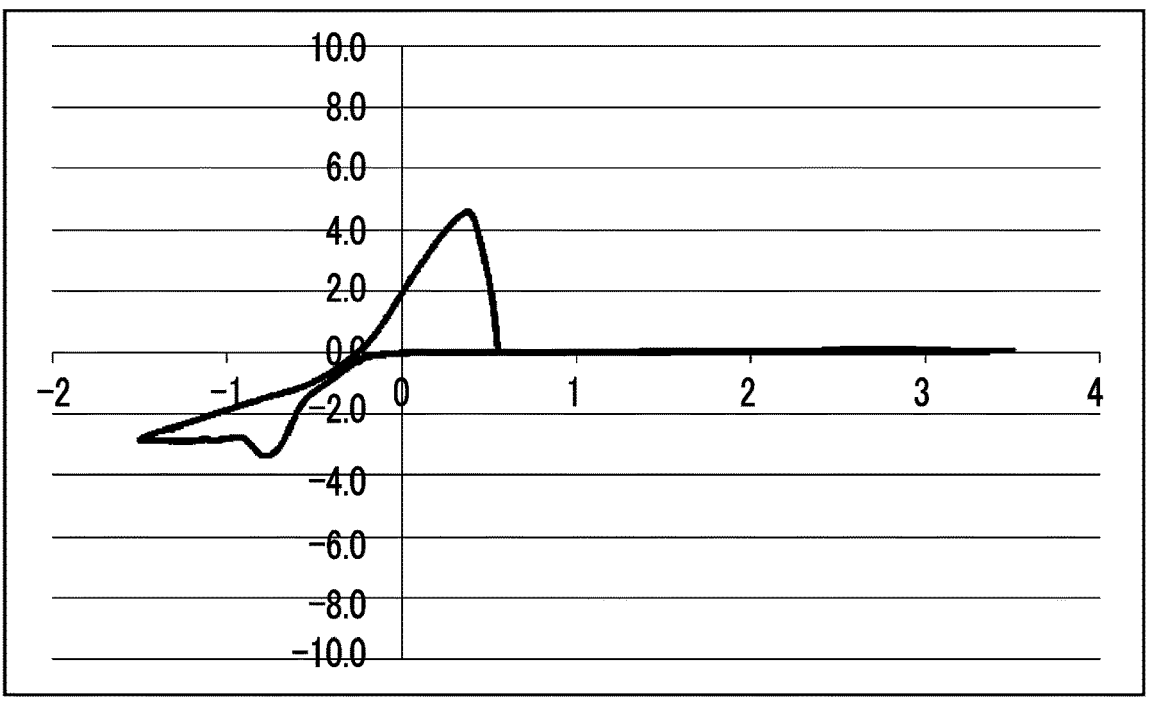

FIG. 4 shows a graph illustrating the results from 10 cycles in CV measurement using an electrolytic solution 4 [diphenylphosphinic acid magnesium chloride salt-aluminum chloride/triglyme solution] in Experimental Example 1.

Figure 5:
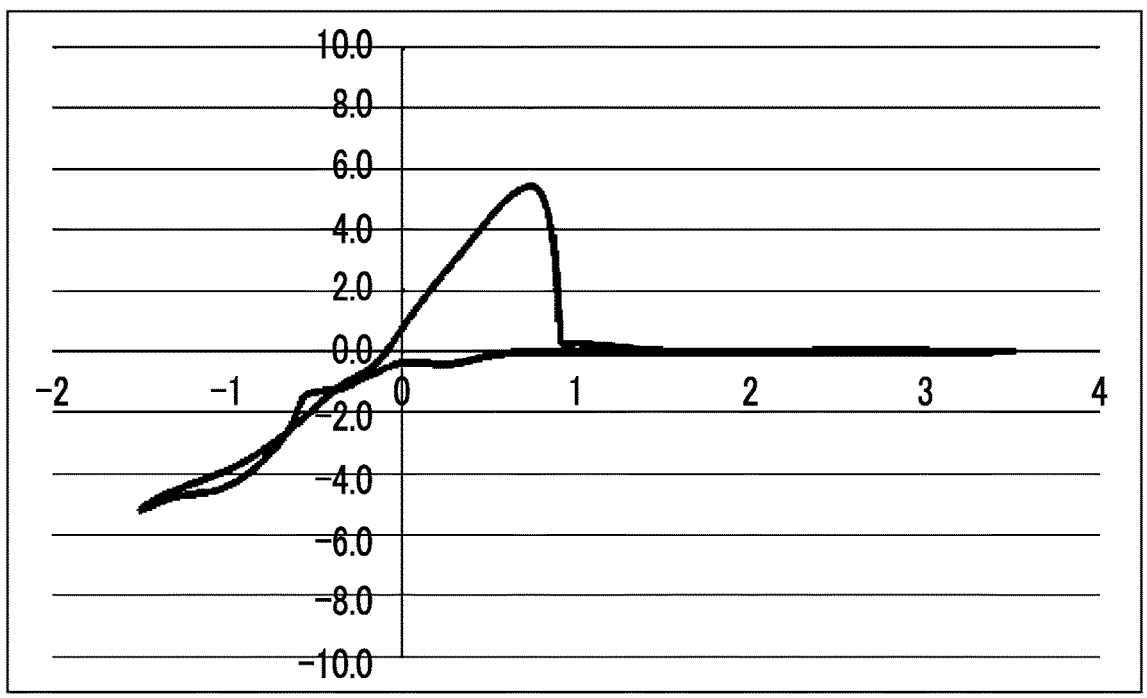

FIG. 5 shows a graph illustrating the results from 10 cycles in CV measurement using an electrolytic solution 5 [diphenylphosphine oxide magnesium chloride salt-aluminum chloride/triglyme solution] in Experimental Example 1.

Figure 6:
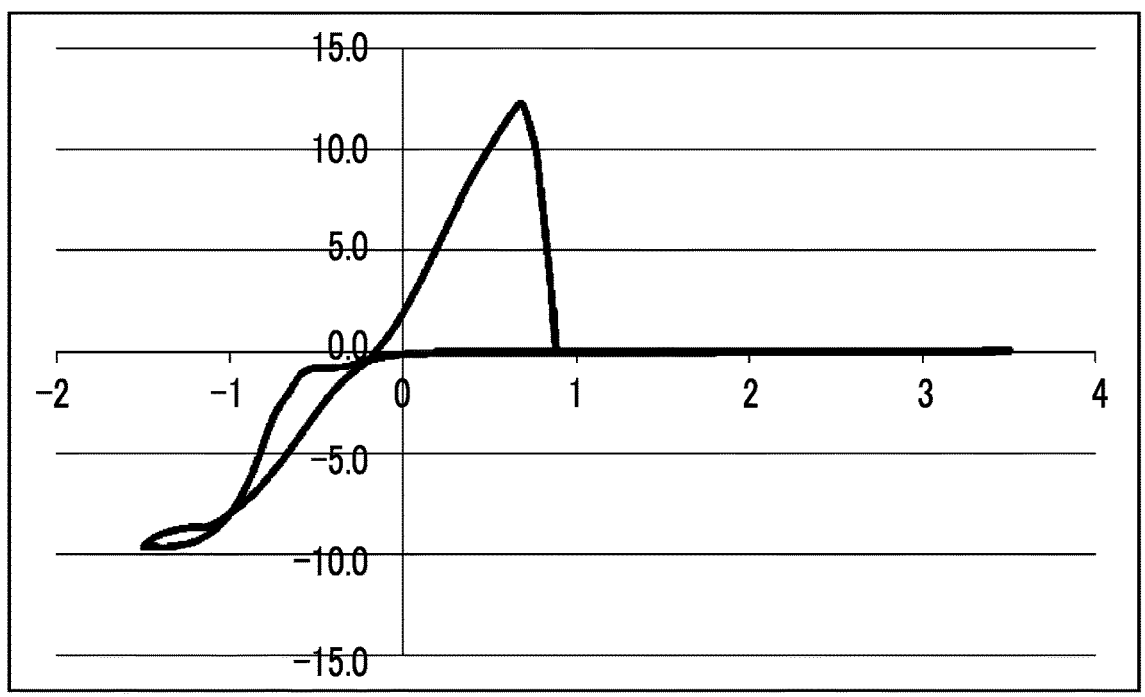

FIG. 6 shows a graph illustrating the results from 10 cycles in CV measurement using an electrolytic solution 6 [phenylphosphinic acid bis(magnesium chloride) salt-aluminum chloride/triglyme solution] in Experimental Example 1.

Figure 7:
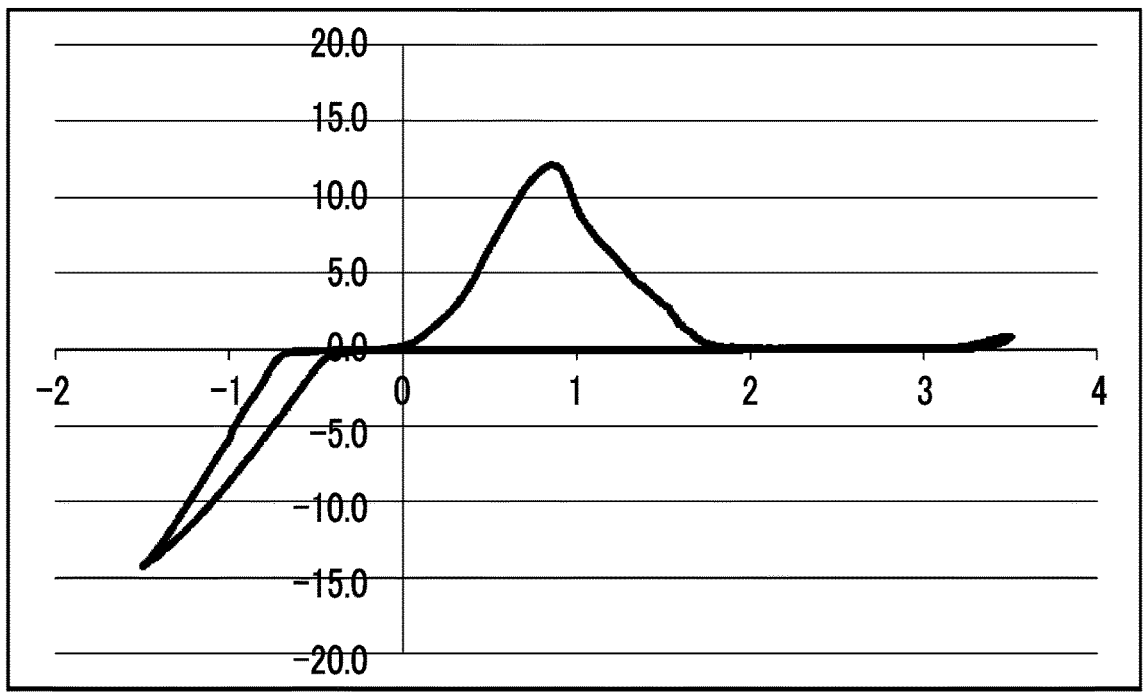

FIG. 7 shows a graph illustrating the results from 10 cycles in CV measurement using an electrolytic solution 7 [phosphorous acid tris(magnesium chloride) salt-aluminum chloride/triglyme solution] in Experimental Example 1.

Figure 8:
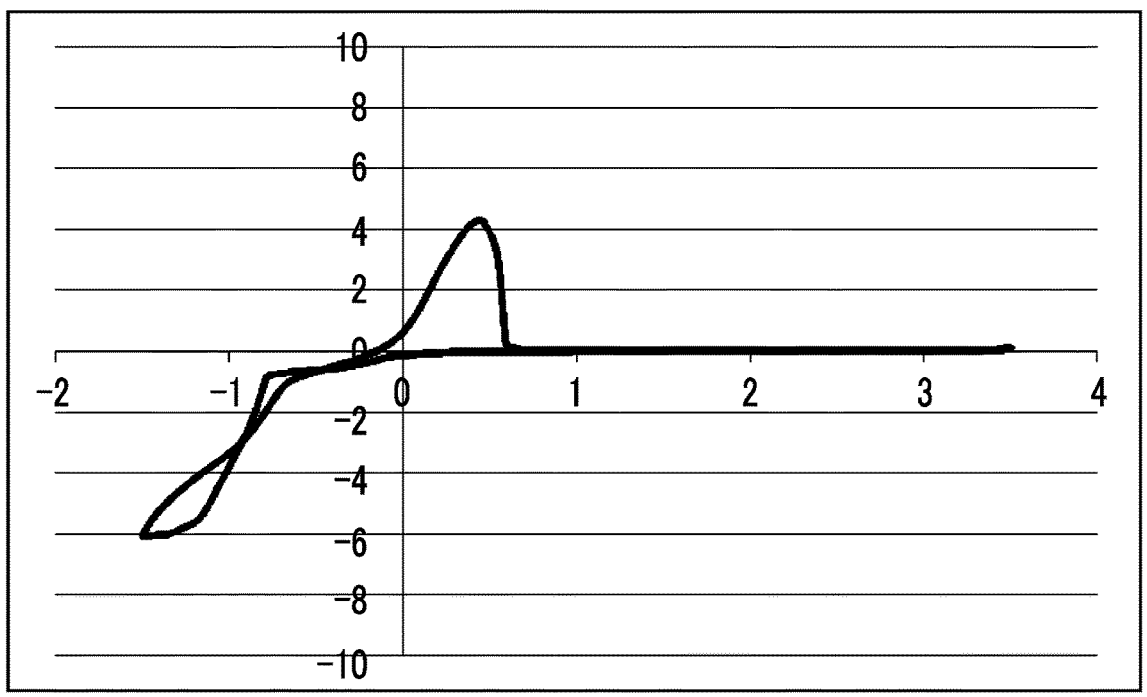

FIG. 8 shows a graph illustrating the results from 10 cycles in CV measurement using an electrolytic solution 8 [diphenyl phosphite magnesium chloride salt-aluminum chloride/triglyme solution] in Experimental Example 1.

Figure 9:
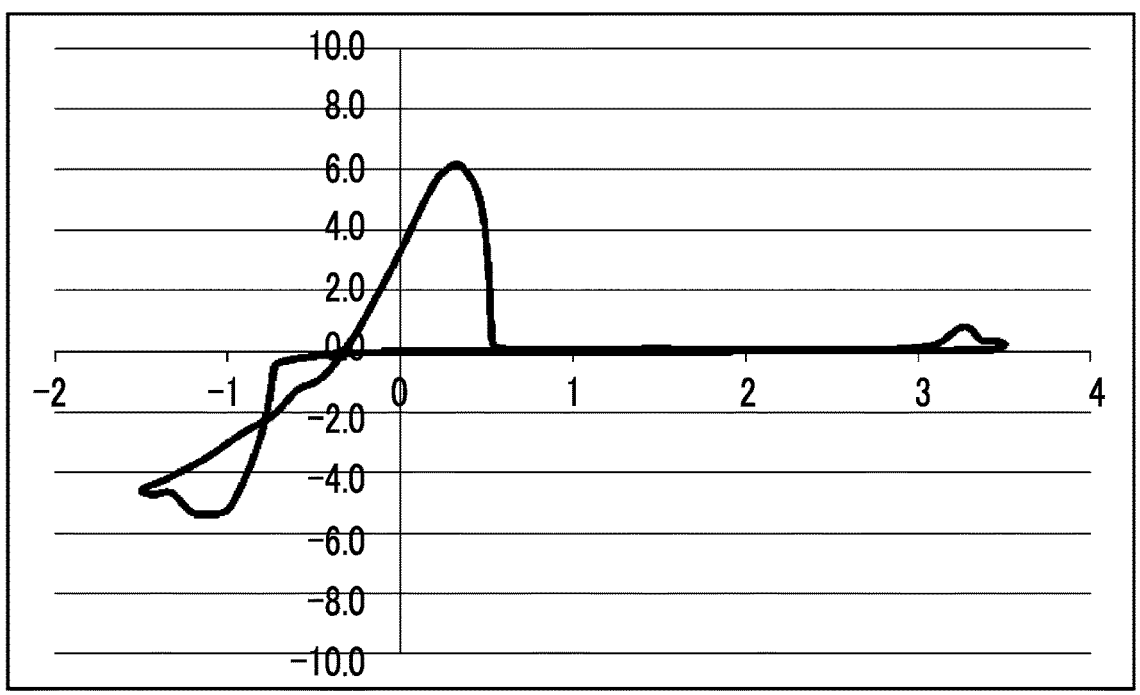

FIG. 9 shows a graph illustrating the results from 10 cycles in CV measurement using an electrolytic solution 9 [diphenyl phosphate magnesium chloride salt-aluminum chloride/triglyme solution] in Experimental Example 1.

Figure 10:
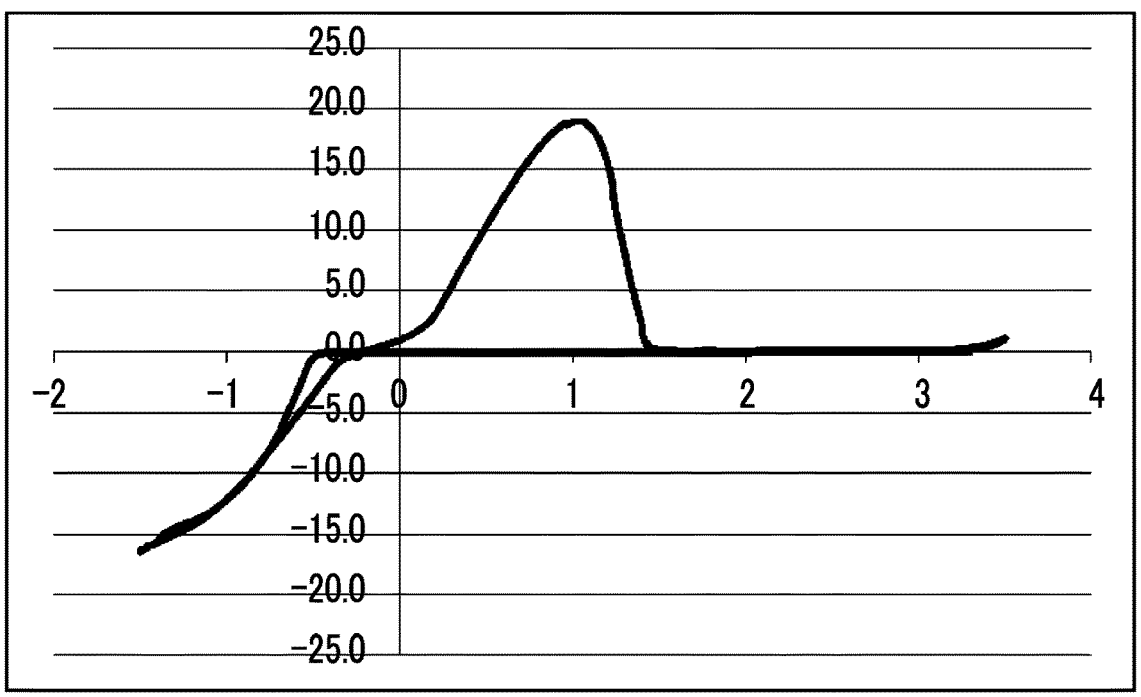

FIG. 10 shows a graph illustrating the results from 10 cycles in CV measurement using an electrolytic solution 10 [phenyl phosphate bis(magnesium chloride) salt-aluminum chloride/triglyme solution] in Experimental Example 1.

Figure 11:
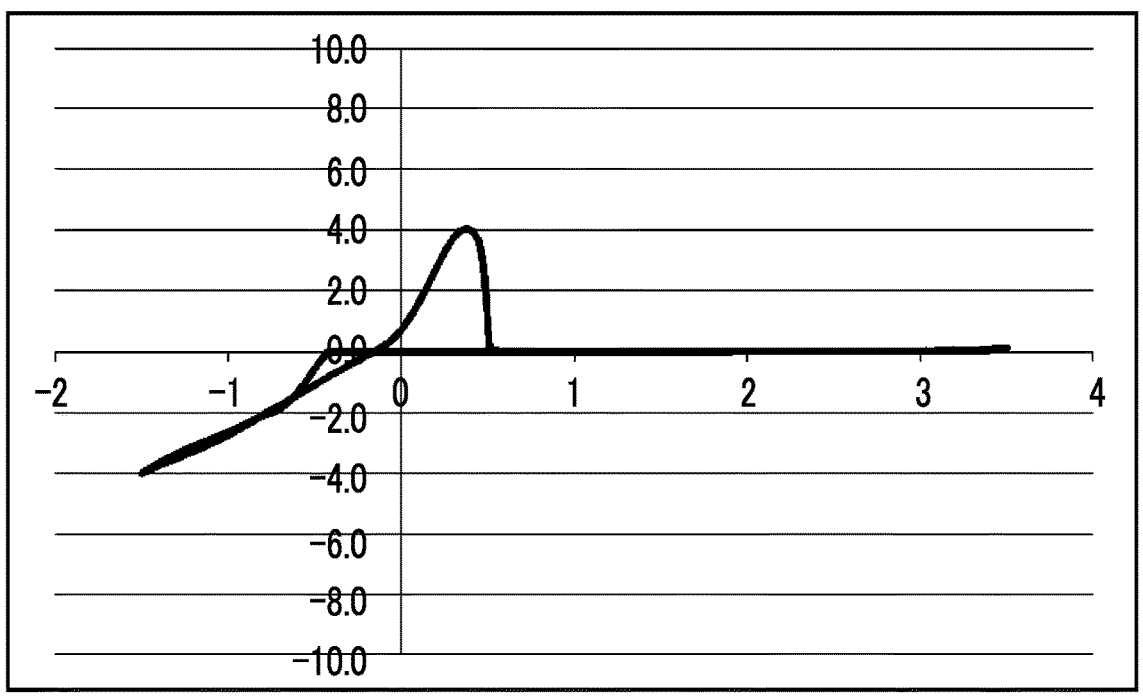

FIG. 11 shows a graph illustrating the results from 10 cycles in CV measurement using an electrolytic solution 11 [bis(4-methoxyphenyl)phosphinic acid magnesium chloride salt-aluminum chloride/THF solution] in Experimental Example 1.

Figure 12:
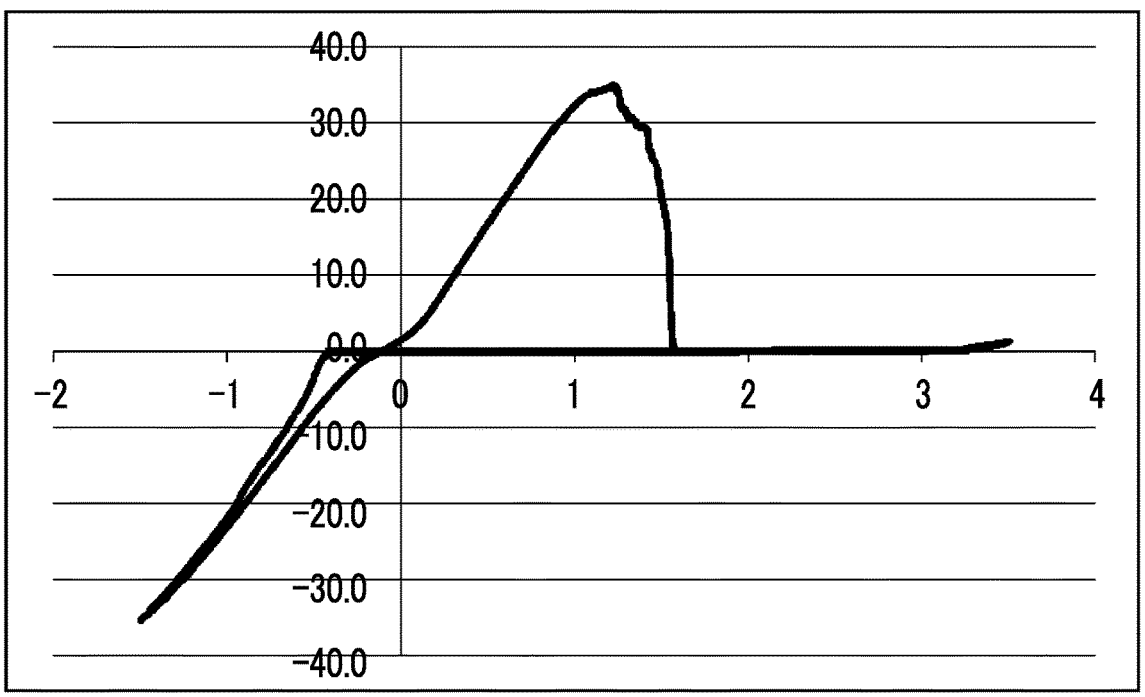

FIG. 12 shows a graph illustrating the results from 10 cycles in CV measurement using an electrolytic solution 12 [methylphosphonic acid bis(magnesium chloride) salt-aluminum chloride/THF-triglyme solution] in Experimental Example 1.

Figure 13:
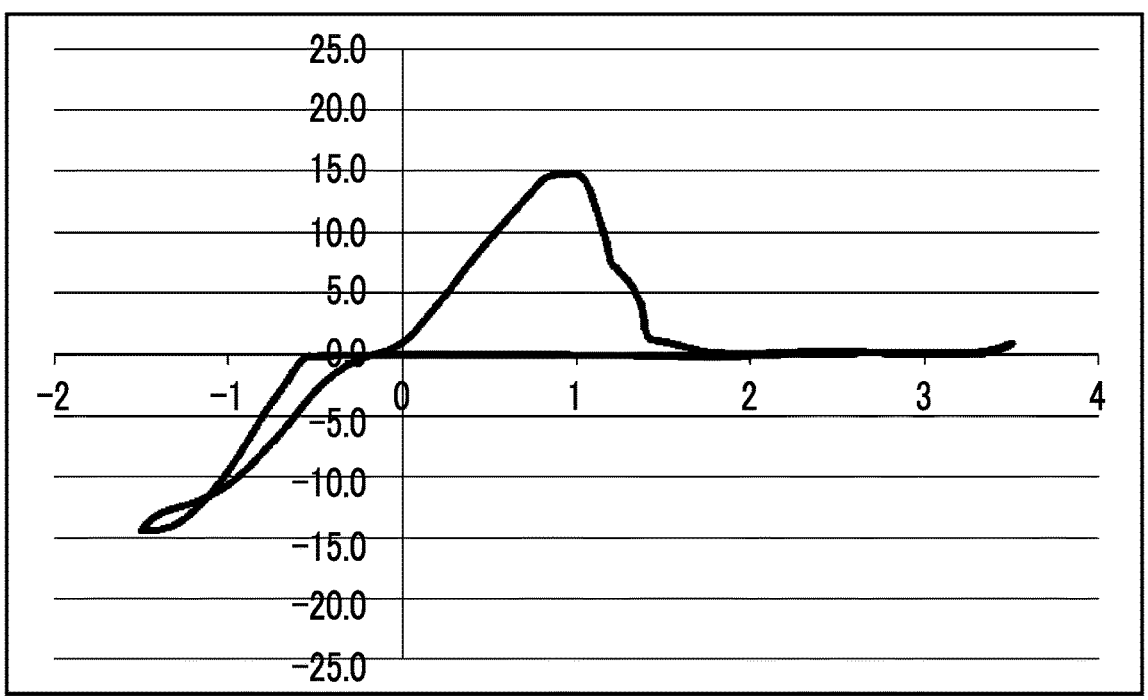

FIG. 13 shows a graph illustrating the results from 10 cycles in CV measurement using an electrolytic solution 13 [diphosphoric acid tetrakis(magnesium chloride) salt-aluminum chloride/triglyme solution] in Experimental Example 1.

Figure 14:
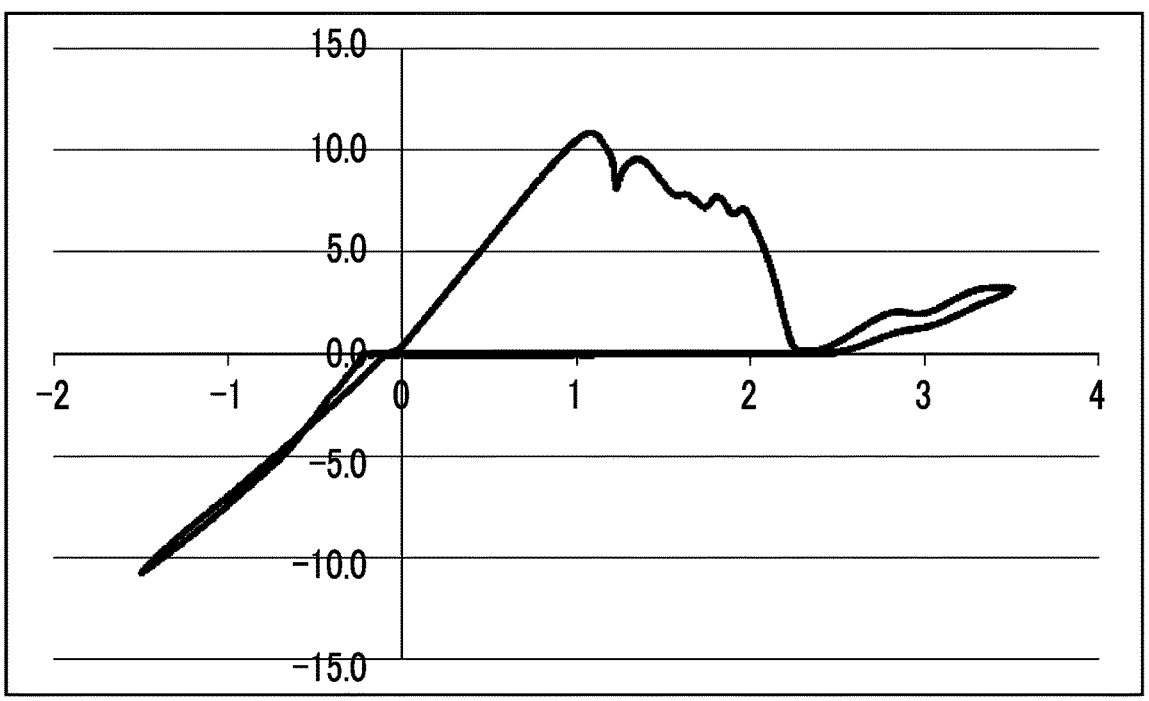

FIG. 14 shows a graph illustrating the results from 10 cycles in CV measurement using a comparative electrolytic solution 1 [(tert-BuOMgCl)$_6$—AlCl$_3$/THF solution] in Experimental Example 1.

Figure 15:
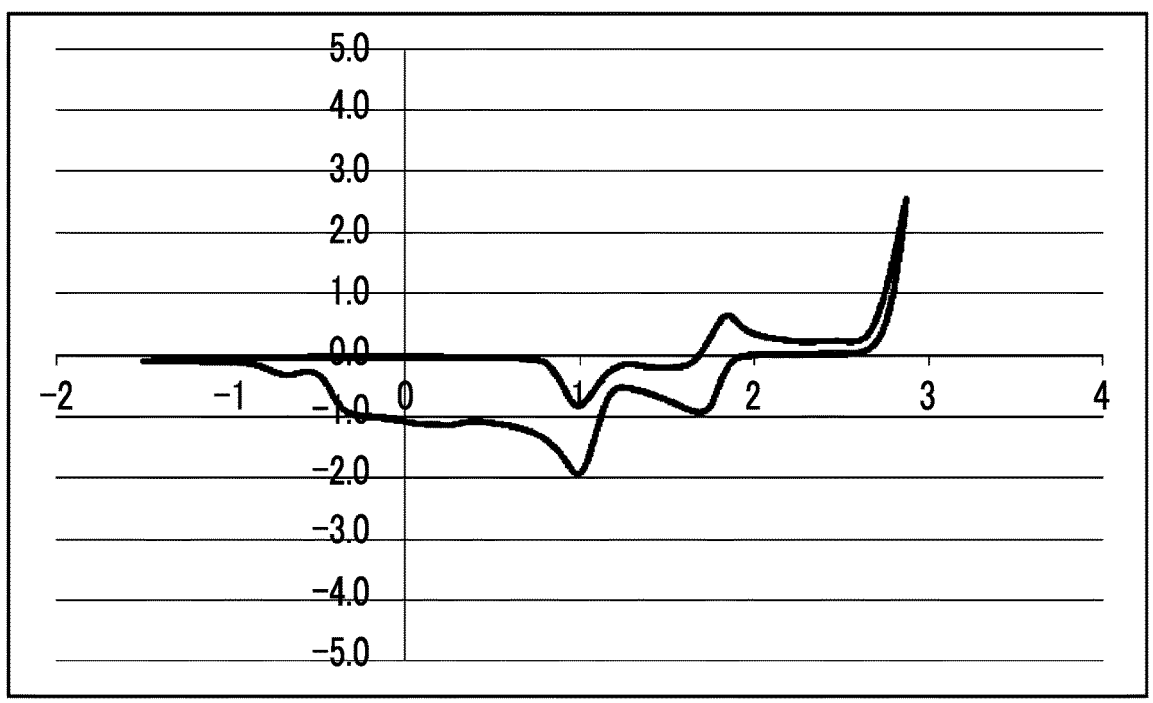

FIG. 15 shows a graph illustrating the results from 10 cycles in CV measurement using a comparative electrolytic solution 2 [Mg(ClO$_4$)$_2$—I$_2$/trimethyl phosphate solution] in Experimental Example 1.

Figure 16:
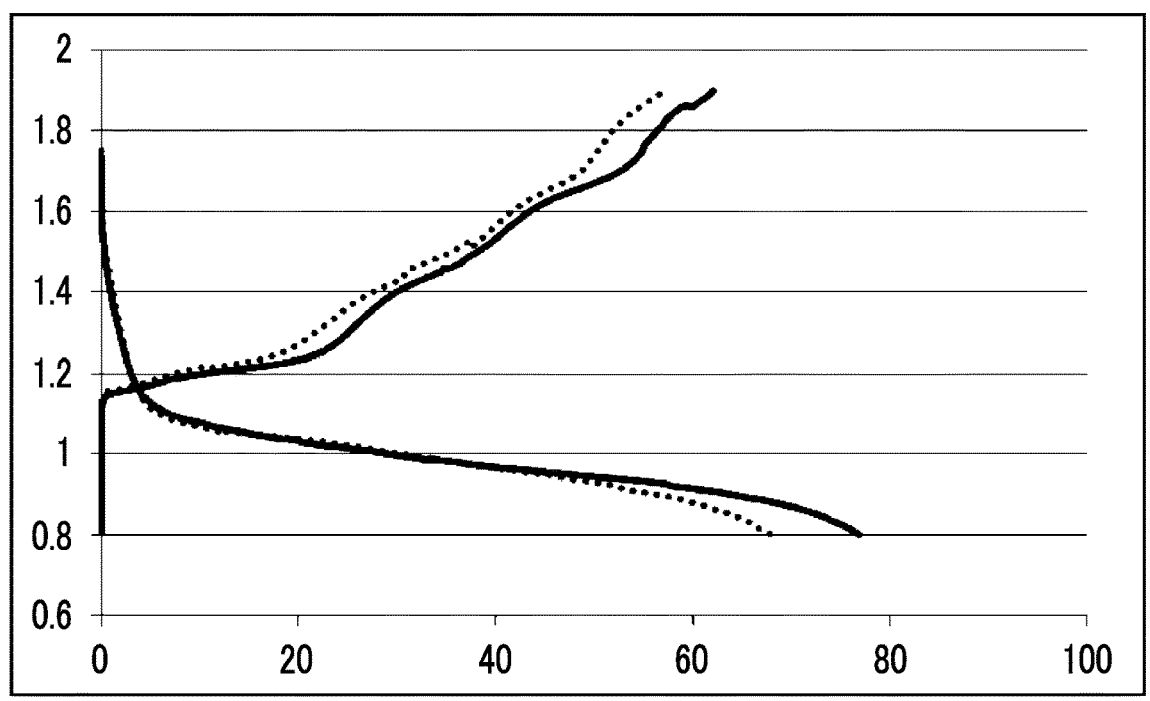

FIG. 16 shows a graph illustrating the results from 1 cycle and 5 cycles in a charge-discharge test using the electrolytic solution 1 [orthophosphoric acid tris(magnesium chloride) salt-aluminum chloride/triglyme solution] in Experimental Example 2 (1$^{st}$ cycle: solid line, and 5$^{th}$ cycle: dotted line).

DESCRIPTION OF EMBODIMENTS

Compound Represented by General Formula (I)

m in the general formula (I) is preferably 2.

n in the general formula (I) is 2 in a case of m=0, is 0 or 1 in a case of m=2, and is preferably 1.

$X^1$ in the general formula (I) represents a chlorine atom or a bromine atom, and is preferably a chlorine atom.

The alkyl group having 1 to 6 carbon atoms as $R^1$ in the general formula (I) may be linear, branched, or cyclic, and is preferably linear and branched, and more preferably linear. In addition, among the alkyl groups having 1 to 6 carbon atoms, an alkyl group having 1 to 4 carbon atoms is preferable, and an alkyl group having 1 or 2 carbon atoms is more preferable. Specific examples of the alkyl group include a methyl group, an ethyl group, an n-propyl group, an isopropyl group, an n-butyl group, an isobutyl group, a sec-butyl group, a tert-butyl group, a cyclobutyl group, an n-pentyl group, an isopentyl group, a sec-pentyl group, a tert-pentyl group, a neopentyl group, a 2-methylbutyl group, a 1,2-dimethylpropyl group, a 1-ethylpropyl group, a cyclopentyl group, an n-hexyl group, an isohexyl group, a sec-hexyl group, a tert-hexyl group, a neohexyl group, a 2-methylpentyl group, a 1,2-dimethylbutyl group, a 2,3-dimethylbutyl group, a 1-ethylbutyl group, and a cyclohexyl group, the methyl group, the ethyl group, the n-propyl group, the isopropyl group, the n-butyl group, the isobutyl group, the sec-butyl group, and the tert-butyl group are preferable, the methyl group, the ethyl group, the n-propyl group, and the n-butyl group are more preferable, the methyl group and the ethyl group are still more preferable, and the methyl group is particularly preferable.

Examples of the halogeno group as a substituent of the alkyl group having 1 to 6 carbon atoms in $R^1$ include a fluoro group, a chloro group, a bromo group, and an iodo group, and the fluoro group is preferable.

The alkyl group having 1 to 6 carbon atoms, having a halogeno group as a substituent, in $R^1$ is the alkyl group in which 1 to 13 hydrogen atoms are substituted with halogeno groups, preferably the alkyl group in which 1 to 3 hydrogen atoms or all the hydrogen atoms are substituted with halogeno groups, more preferably the alkyl group in which one hydrogen atom or all the hydrogen atom are substituted with halogeno groups, and particularly preferably the alkyl group in which all the hydrogen atom are substituted with halogeno groups (perhalogenoalkyl group). The halogeno group may be present at any position on the alkyl group, and is preferably present at the terminal of the alkyl group.

Specific examples of the alkyl group having 1 to 6 carbon atoms, having a halogeno group as a substituent, in $R^1$ include a trifluoromethyl group, a pentafluoroethyl group, a heptafluoro-n-propyl group, a heptafluoroisopropyl group, a perfluoro-n-butyl group, a perfluoroisobutyl group, a perfluoro-sec-butyl group, a perfluoro-tert-butyl group, a fluoromethyl group, a fluoroethyl group, a fluoro-n-propyl group, a fluoroisopropyl group, a fluoro-n-butyl group, a fluoroisobutyl group, a fluoro-sec-butyl group, and a fluoro-tert-butyl group, the trifluoromethyl group, the pentafluoroethyl group, the heptafluoro-n-propyl group, the heptafluoroisopropyl group, the perfluoro-n-butyl group, the perfluoroisobutyl group, the perfluoro-sec-butyl group, and the perfluoro-tert-butyl group are preferable, the trifluoromethyl group, the pentafluoroethyl group, the heptafluoro-n- propyl group, and the perfluoro-n-butyl group are more preferable, and the trifluoromethyl group is particularly preferable.

The alkoxy group as a substituent of the alkyl group having 1 to 6 carbon atoms in $R^1$ usually has 1 to 6 carbon atoms, preferably has 1 to 4 carbon atoms, and more preferably has 1 or 2 carbon atoms. In addition, the alkoxy group may be linear, branched, or cyclic, and is preferably linear and branched, and more preferably linear. Specific examples of the alkoxy group include a methoxy group, an ethoxy group, an n-propoxy group, an isopropoxy group, an n-butoxy group, an isobutoxy group, a sec-butoxy group, a tert-butoxy group, a cyclobutoxy group, an n-pentyloxy group, an isopentyloxy group, a sec-pentyloxy group, a tert-pentyloxy group, a neopentyloxy group, a 2-methylbutoxy group, a 1,2-dimethylpropoxy group, a 1-ethylpropoxy group, a cyclopentyloxy group, an n-hexyloxy group, an isohexyloxy group, a sec-hexyloxy group, a tert-hexyloxy group, a neohexyloxy group, a 2-methylpentyloxy group, a 1,2-dimethylbutoxy group, a 2,3-dimethylbutoxy group, a 1-ethylbutoxy group, and a cyclohexyloxy group, the methoxy group, the ethoxy group, the n-propoxy group, the isopropoxy group, the n-butoxy group, the isobutoxy group, the sec-butoxy group, and the tert-butoxy group are preferable, the methoxy group, the ethoxy group, the n-propoxy group, and the n-butoxy group are more preferable, the methoxy group and the ethoxy group are still more preferable, and the methoxy group is particularly preferable.

The alkyl group having 1 to 6 carbon atoms, having an alkoxy group as a substituent, in $R^1$ usually has 1 to 3 substituents, and preferably one substituent. The alkoxy group may be present at any position on the alkyl group, and is preferably present at the terminal of the alkyl group.

Specific examples of the alkyl group having 1 to 6 carbon atoms, having an alkoxy group as a substituent, in $R^1$ include a methoxymethyl group, an ethoxymethyl group, an n-propoxymethyl group, an isopropoxymethyl group, an n-butoxymethyl group, an isobutoxymethyl group, a sec-butoxymethyl group, a tert-butoxymethyl group, a methoxyethyl group, an ethoxyethyl group, an n-propoxyethyl group, an isopropoxyethyl group, an n-butoxyethyl group, an isobutoxyethyl group, a sec-butoxyethyl group, a tert-butoxyethyl group, a methoxy-n-propyl group, an ethoxy-n-propyl group, an n-propoxy-n-propyl group, an isopropoxy-n-propyl group, an n-butoxy-n-propyl group, an isobutoxy-n-propyl group, a sec-butoxy-n-propyl group, a tert-butoxy-n-propyl group, a methoxy-n-butyl group, an ethoxy-n-butyl group, an n-propoxy-n-butyl group, an isopropoxy-n-butyl group, an n-butoxy-n-butyl group, an isobutoxy-n-butyl group, a sec-butoxy-n-butyl group, and a tert-butoxy-n-butyl group, the methoxymethyl group, the ethoxymethyl group, the methoxyethyl group, the ethoxyethyl group, the methoxy-n-propyl group, the ethoxy-n-propyl group, the methoxy-n-butyl group, and the ethoxy-n-butyl group are preferable, and the methoxymethyl group, the ethoxymethyl group, the methoxyethyl group, and the ethoxyethyl group are more preferable.

The alkyl group having 1 to 6 carbon atoms, which may have a halogeno group or an alkoxy group as a substituent, in $R^1$ of the general formula (I), is preferably an alkyl group having 1 to 6 carbon atoms, which has a halogeno group or an alkoxy group having 1 to 6 carbon atoms as a substituent or is an unsubstituted, more preferably an alkyl group having 1 to 6 carbon atoms, which has a fluoro group or an alkoxy group having 1 to 4 carbon atoms as a substituent or is unsubstituted, and particularly preferably an alkyl group having 1 to 6 carbon atoms, which is unsubstituted.

Specific preferred examples of the alkyl group having 1 to 6 carbon atoms, which may have a halogeno group or an alkoxy group as a substituent, in $R^1$ of the general formula (I) include, among the above-mentioned specific examples, a methyl group, an ethyl group, an n-propyl group, an isopropyl group, an n-butyl group, an isobutyl group, a sec-butyl group, and a tert-butyl group; a trifluoromethyl group, a pentafluoroethyl group, a heptafluoro-n-propyl group, a heptafluoroisopropyl group, a perfluoro-n-butyl group, a perfluoroisobutyl group, a perfluoro-sec-butyl group, and a perfluoro-tert-butyl group; and a methoxymethyl group, an ethoxymethyl group, a methoxyethyl group, an ethoxyethyl group, a methoxy-n-propyl group, an ethoxy-n-propyl group, a methoxy-n-butyl group, and an ethoxy-n-butyl group, the methyl group, the ethyl group, the n-propyl group, and the n-butyl group; the trifluoromethyl group, the pentafluoroethyl group, the heptafluoro-n-propyl group, and the perfluoro-n-butyl group; and the methoxymethyl group, the ethoxymethyl group, the methoxyethyl group, and the ethoxyethyl group are preferable, the methyl group, the ethyl group, the n-propyl group, and the n-butyl group are more preferable, the methyl group and the ethyl group are still more preferable, and the methyl group is particularly preferable.

The alkoxy group having 1 to 6 carbon atoms in $R^1$ of the general formula (I) may be linear, branched, or cyclic, and is preferably linear and branched, and more preferably linear. In addition, among the alkoxy groups having 1 to 6 carbon atoms, an alkoxy group having 1 to 4 carbon atoms is preferable, and an alkoxy group having 1 or 2 carbon atoms is more preferable. Specific examples of the alkoxy group include the same ones as the specific examples of the alkoxy group as a substituent of the alkyl group having 1 to 6 carbon atoms in $R^1$ and preferred examples thereof are also the same.

Examples of the aryl group having 6 to 10 carbon atoms in $R^1$ of the general formula (I) include a phenyl group and a naphthyl group, and the phenyl group is preferable.

Examples of the halogeno group as a substituent of the aryl group having 6 to 10 carbon atoms in $R^1$ include a fluoro group, a chloro group, a bromo group, and an iodo group, and the fluoro group is preferable.

The alkyl group as a substituent of the aryl group having 6 to 10 carbon atoms in $R^1$ usually has 1 to 6 carbon atoms, preferably has 1 to 4 carbon atoms, and more preferably has 1 or 2 carbon atoms. In addition, the alkyl group may be linear, branched, or cyclic, and is preferably linear and branched, and more preferably linear. Specific examples of the alkyl group include the same ones as the specific examples of the alkyl group having 1 to 6 carbon atoms in $R^1$ and preferred examples thereof are also the same.

The halogenoalkyl group as a substituent of the aryl group having 6 to 10 carbon atoms in $R^1$ usually has 1 to 6 carbon atoms, preferably has 1 to 4 carbon atoms, and more preferably has 1 or 2 carbon atoms. In addition, the halogenoalkyl group may be linear, branched, or cyclic, and is preferably linear and branched, and more preferably linear. Specific examples of the halogenoalkyl group include fluoroalkyl groups, chloroalkyl groups, bromoalkyl groups, and iodoalkyl groups, the fluoroalkyl groups are preferable, and among these, a perfluoroalkyl group and a monofluoroalkyl group are more preferable, the perfluoroalkyl group is particularly preferable. More specific examples of the halogenoalkyl group include the same ones as the specific examples of the alkyl group having 1 to 6 carbon atoms, having a halogeno group as a substituent, in $R^1$ and preferred examples thereof are also the same.

Examples of the alkoxy group as a substituent of the aryl group having 6 to 10 carbon atoms in $R^1$ include the same ones as the alkoxy group as a substituent of the alkyl group having 1 to 6 carbon atoms in $R^1$ and preferred examples thereof are also the same.

The aryl group having 6 to 10 carbon atoms, having a halogeno group, an alkyl group, a halogenoalkyl group, or an alkoxy group as a substituent, in $R^1$ usually has 1 to 7 substituents, preferably has 1 to 5 substituents, more preferably has 1 or 2 substituents, and particularly preferably one substituent. The aryl group may have a substituent at any position. In addition, in a case where the aryl group is a phenyl group, the phenyl group may have a substituent at any position of an ortho-position, a meta-position, and a para-position, and preferably has a substituent at a para-position.

The aryl group having 6 to 10 carbon atoms, which may have a halogeno group, an alkyl group, a halogenoalkyl group, or an alkoxy group as a substituent, in $R^1$ of the general formula (I) is preferably a phenyl group which has a halogeno group, an alkyl group, a halogenoalkyl group, or an alkoxy group as a substituent, or unsubstituted, more preferably a phenyl group which has an alkyl group or an alkoxy group as a substituent, or is unsubstituted, still more preferably a phenyl group which has an alkoxy group as a substituent, or unsubstituted, and particularly preferably a phenyl group which is unsubstituted.

Specific examples of the aryl group having 6 to 10 carbon atoms, which may have a halogeno group, an alkyl group, a halogenoalkyl group, or an alkoxy group as a substituent, in $R^1$ of the general formula (I) include a phenyl group; a fluorophenyl group, and a perfluorophenyl group; a methylphenyl group, an ethylphenyl group, an n-propylphenyl group, an isopropylphenyl group, an n-butylphenyl group, an isobutylphenyl group, a sec-butylphenyl group, and a tert-butylphenyl group; a trifluoromethylphenyl group, a pentafluoroethylphenyl group, a heptafluoro-n-propylphenyl group, and a perfluoro-n-butylphenyl group; and a methoxyphenyl group, an ethoxyphenyl group, an n-propoxyphenyl group, an isopropoxyphenyl group, an n-butoxyphenyl group, an isobutoxyphenyl group, a sec-butoxyphenyl group, and a tert-butoxyphenyl group.

Among the specific examples, the phenyl group; the methylphenyl group, the ethylphenyl group, the n-propylphenyl group, the isopropylphenyl group, the n-butylphenyl group, the isobutylphenyl group, the sec-butylphenyl group, and the tert-butylphenyl group; and the methoxyphenyl group, the ethoxyphenyl group, the n-propoxyphenyl group, the isopropoxyphenyl group, the n-butoxyphenyl group, the isobutoxyphenyl group, the sec-butoxyphenyl group, and the tert-butoxyphenyl group are preferable, the phenyl group, the methylphenyl group, the ethylphenyl group, the n-propylphenyl group, the n-butylphenyl group, the methoxyphenyl group, the ethoxyphenyl group, the n-propoxyphenyl group, and the n-butoxyphenyl group are more preferable, the phenyl group, the methoxyphenyl group, and the ethoxyphenyl group are still more preferable, and the phenyl group is particularly preferable.

Examples of the aryloxy group having 6 to 10 carbon atoms in $R^1$ of the general formula (I) include a phenoxy group and a naphthyloxy group, and the phenoxy group is preferable.

Examples of the halogeno group, the alkyl group, the halogenoalkyl group, and the alkoxy group as a substituent of the aryloxy group having 6 to 10 carbon atoms in $R^1$ include the same ones as those as a substituent of the aryl group having 6 to 10 carbon atoms in $R^1$, and preferred examples thereof are also the same.

The aryloxy group having 6 to 10 carbon atoms, having a halogeno group, an alkyl group, a halogenoalkyl group, or an alkoxy group as a substituent, in $R^1$ usually has 1 to 7 substituents, preferably has 1 to 5 substituents, more preferably has 1 or 2 substituents, and particularly preferably has one substituent. The aryloxy group may have a substituent at any position. In addition, in a case where the aryloxy group is a phenoxy group, the phenoxy group may have a substituent at any position of an ortho-position, a meta-position, and a para-position, and preferably has a substituent at a para-position.

The aryloxy group having 6 to 10 carbon atoms, which may have a halogeno group, an alkyl group, a halogenoalkyl group, or an alkoxy group as a substituent, in $R^1$ of the general formula (I) is preferably a phenoxy group which has a halogeno group, an alkyl group, a halogenoalkyl group, or an alkoxy group as a substituent, or is unsubstituted, more preferably a phenoxy group which has an alkyl group or an alkoxy group as a substituent or is unsubstituted, and particularly preferably an unsubstituted phenoxy group.

Specific examples of the aryloxy group having 6 to 10 carbon atoms, which may have a halogeno group, an alkyl group, a halogenoalkyl group, or an alkoxy group as a substituent, in $R^1$ of the general formula (I) include a phenoxy group; a fluorophenoxy group and a perfluorophenoxy group; a methylphenoxy group, an ethylphenoxy group, an n-propylphenoxy group, an isopropylphenoxy group, an n-butylphenoxy group, an isobutylphenoxy group, a sec-butylphenoxy group, and a tert-butylphenoxy group; a trifluoromethylphenoxy group, a pentafluoroethylphenoxy group, a heptafluoro-n-propylphenoxy group, and a perfluoro-n-butylphenoxy group; and a methoxyphenoxy group, an ethoxyphenoxy group, an n-propoxyphenoxy group, an isopropoxyphenoxy group, an n-butoxyphenoxy group, an isobutoxyphenoxy group, a sec-butoxyphenoxy group, and a tert-butoxyphenoxy group.

Among the specific examples, the phenoxy group; the methylphenoxy group, the ethylphenoxy group, the n-propylphenoxy group, the isopropylphenoxy group, the n-butylphenoxy group, the isobutylphenoxy group, the sec-butylphenoxy group, and the tert-butylphenoxy group; and the methoxyphenoxy group, the ethoxyphenoxy group, the n-propoxyphenoxy group, the isopropoxyphenoxy group, the n-butoxyphenoxy group, the isobutoxyphenoxy group, the sec-butoxyphenoxy group, and the tert-butoxyphenoxy group are preferable, the phenoxy group, the methylphenoxy group, the ethylphenoxy group, the n-propylphenoxy group, the n-butylphenoxy group, the methoxyphenoxy group, the ethoxyphenoxy group, the n-propoxyphenoxy group, and the n-butoxyphenoxy group are more preferable, and the phenoxy group is particularly preferable.

a in the general formula (1) is preferably 1 or 2, and more preferably 1.

$X^2$ in the general formula (1) represents a chlorine atom or a bromine atom, and is preferably a chlorine atom.

Examples of the alkyl group having 1 to 6 carbon atoms, which may have a halogeno group or an alkoxy group as a substituent; the alkoxy group having 1 to 6 carbon atoms; the aryl group having 6 to 10 carbon atoms, which may have a halogeno group, an alkyl group, a halogenoalkyl group, or an alkoxy group as a substituent; and the aryloxy group having 6 to 10 carbon atoms, which may have a halogeno group, an alkyl group, a halogenoalkyl group, or an alkoxy group as a substituent, in $R^2$ of the general formula (1) and the general formula (2) include the same ones as those in $R^1$ of the general formula (I), and preferred examples thereof are also the same.

As $R^2$ in the general formula (1) and the general formula (2), a magnesium chloride oxy group; an alkyl group having 1 to 6 carbon atoms; an alkoxy group having 1 to 6 carbon atoms; a phenyl group which may have a halogeno group, an alkyl group, a halogenoalkyl group, or an alkoxy group as a substituent; and a phenoxy group which may have a halogeno group, an alkyl group, a halogenoalkyl group, or an alkoxy group as a substituent are preferable, the magnesium chloride oxy group; the alkyl group having 1 to 6 carbon atoms; the alkoxy group having 1 to 6 carbon atoms; the phenyl group which may have an alkyl group or an alkoxy group as a substituent; and the phenoxy group which may have an alkyl group or an alkoxy group as a substituent are more preferable, the magnesium chloride oxy group, the alkyl group having 1 to 6 carbon atoms, the alkoxy group having 1 to 6 carbon atoms, the phenyl group, and the phenoxy group are still more preferable, and the magnesium chloride oxy group, the alkyl group having 1 to 4 carbon atoms, the phenyl group, and the phenoxy group are particularly preferable. Specific preferred examples of $R^2$ include a magnesium chloride oxy group, a methyl group, an ethyl group, an n-propyl group, an n-butyl group, a phenyl group, and a phenoxy group, and the magnesium chloride oxy group is preferable.

Specific preferred examples of the general formula (1) include the following general formula (3).

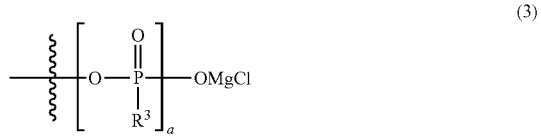

(3)

(In the formula, a pieces of $R^3$'s each independently represent a magnesium chloride oxy group; an alkyl group having 1 to 6 carbon atoms; an alkoxy group having 1 to 6 carbon atoms; a phenyl group which may have a halogeno group, an alkyl group, a halogenoalkyl group, or an alkoxy group as a substituent; or a phenoxy group which may have a halogeno group, an alkyl group, a halogenoalkyl group, or an alkoxy group as a substituent, and a is the same as described above.)

Examples of the alkyl group having 1 to 6 carbon atoms and the alkoxy group having 1 to 6 carbon atoms in $R^3$ of the general formula (3) include the same ones as those in $R^1$ of the general formula (I), and preferred examples thereof are also the same.

Examples of the halogeno group, the alkyl group, the halogenoalkyl group, and the alkoxy group as a substituent of the phenyl group in $R^3$ include the same ones as those as a substituent of the aryl group having 6 to 10 carbon atoms in $R^1$ of the general formula (I), and preferred examples thereof are also the same.

The phenyl group having a halogeno group, an alkyl group, a halogenoalkyl group, or an alkoxy group as a substituent in $R^3$ usually has 1 to 5 substituents, preferably has 1 or 2 substituents, and more preferably has one substituent. The phenyl group may have a substituent at any position of an ortho-position, a meta-position, and a para-position, and preferably has a substituent at a para-position.

As the phenyl group which may have a halogeno group, an alkyl group, a halogenoalkyl group, or an alkoxy group as a substituent in $R^3$ of the general formula (3), a phenyl group which has an alkyl group or an alkoxy group as a substituent or is unsubstituted is preferable, and a phenyl group which is unsubstituted is more preferable.

Specific examples of the phenyl group which may have a halogeno group, an alkyl group, a halogenoalkyl group, or an alkoxy group as a substituent in $R^3$ of the general formula (3) include a phenyl group; a fluorophenyl group, and a perfluorophenyl group; a methylphenyl group, an ethylphenyl group, an n-propylphenyl group, an isopropylphenyl group, an n-butylphenyl group, an isobutylphenyl group, a sec-butylphenyl group, and a tert-butylphenyl group; a trifluoromethylphenyl group, a pentafluoroethylphenyl group, a heptafluoro-n-propylphenyl group, and a perfluoro-n-butylphenyl group; and a methoxyphenyl group, an ethoxyphenyl group, an n-propoxyphenyl group, an isopropoxyphenyl group, an n-butoxyphenyl group, an isobutoxyphenyl group, a sec-butoxyphenyl group, and a tert-butoxyphenyl group.

Among the specific examples, the phenyl group; the methylphenyl group, the ethylphenyl group, the n-propylphenyl group, the isopropylphenyl group, the n-butylphenyl group, the isobutylphenyl group, the sec-butylphenyl group, and the tert-butylphenyl group; and the methoxyphenyl group, the ethoxyphenyl group, the n-propoxyphenyl group, the isopropoxyphenyl group, the n-butoxyphenyl group, the isobutoxyphenyl group, the sec-butoxyphenyl group, and the tert-butoxyphenyl group are preferable, the phenyl group, the methylphenyl group, the ethylphenyl group, the n-propylphenyl group, the n-butylphenyl group, the methoxyphenyl group, the ethoxyphenyl group, the n-propoxyphenyl group, and the n-butoxyphenyl group are more preferable, and the phenyl group is particularly preferable.

Examples of the halogeno group, the alkyl group, the halogenoalkyl group, and the alkoxy group as a substituent of the phenoxy group in $R^3$ include the same ones as those as a substituent of the aryl group having 6 to 10 carbon atoms in $R^1$ of the general formula (I), and preferred examples thereof are also the same.

The phenoxy group having a halogeno group, an alkyl group, a halogenoalkyl group, or an alkoxy group as a substituent in $R^3$ usually has 1 to 5 substituents, preferably 1 or 2 substituents, and more preferably one substituent. The phenoxy group may have a substituent at any position of an ortho-position, a meta-position, and a para-position, and preferably has a substituent at a para-position.

As the phenoxy group which may have a halogeno group, an alkyl group, a halogenoalkyl group, or an alkoxy group as a substituent in R of the general formula (3), a phenoxy group which has an alkyl group or an alkoxy group as a substituent or is unsubstituted is preferable, and a phenoxy group which is unsubstituted is more preferable.

Specific examples of the phenoxy group which may have a halogeno group, an alkyl group, a halogenoalkyl group, or an alkoxy group as a substituent in $R^3$ of the general formula (3) include a phenoxy group; a fluorophenoxy group and a perfluorophenoxy group; a methylphenoxy group, an ethylphenoxy group, an n-propylphenoxy group, an isopropylphenoxy group, an n-butylphenoxy group, an isobutylphenoxy group, a sec-butylphenoxy group, and a tert-butylphenoxy group; and a trifluoromethylphenoxy group, a pentafluoroethylphenoxy group, a heptafluoro-n-propylphenoxy group, a perfluoro-n-butylphenoxy group; a methoxyphenoxy group, an ethoxyphenoxy group, an n-propoxyphenoxy group, an isopropoxyphenoxy group, an n-butoxyphenoxy group, an isobutoxyphenoxy group, a sec-butoxyphenoxy group, and a tert-butoxyphenoxy group.

Among the specific examples, the phenoxy group; the methylphenoxy group, the ethylphenoxy group, the n-propylphenoxy group, the isopropylphenoxy group, the n-butylphenoxy group, the isobutylphenoxy group, the sec-butylphenoxy group, and the tert-butylphenoxy group; and the methoxyphenoxy group, the ethoxyphenoxy group, the n-propoxyphenoxy group, the isopropoxyphenoxy group, the n-butoxyphenoxy group, the isobutoxyphenoxy group, the sec-butoxyphenoxy group, and the tert-butoxyphenoxy group are preferable, the phenoxy group, the methylphenoxy group, the ethylphenoxy group, the n-propylphenoxy group, the n-butylphenoxy group, the methoxyphenoxy group, the ethoxyphenoxy group, the n-propoxyphenoxy group, and the n-butoxyphenoxy group are more preferable, and the phenoxy group is particularly preferable.

As $R^3$ in the general formula (3), a magnesium chloride oxy group; an alkyl group having 1 to 6 carbon atoms; an alkoxy group having 1 to 6 carbon atoms; a phenyl group which may have an alkyl group or an alkoxy group as a substituent; and a phenoxy group which may have an alkyl group or an alkoxy group as a substituent are preferable, the magnesium chloride oxy group, the alkyl group having 1 to 6 carbon atoms, the alkoxy group having 1 to 6 carbon atoms, the phenyl group, and the phenoxy group are more preferable, and the magnesium chloride oxy group, the alkyl group having 1 to 4 carbon atoms, the phenyl group, and the phenoxy group are particularly preferable. Specific preferred examples of $R^3$ include a magnesium chloride oxy group, a methyl group, an ethyl group, an n-propyl group, an n-butyl group, a phenyl group, and a phenoxy group, and the magnesium chloride oxy group is preferable.

Specific more preferred examples of the general formula (1) include the following formula (5).

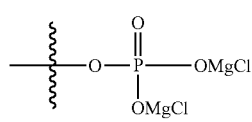

(5)

b in the general formula (2) is preferably 1 or 2, and more preferably 2.

In a case where two $R^1$'s in the general formula (I) form the general formula (2), the general formula (I) is a ring structure represented by the following general formula (7);

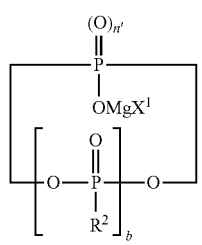

(7)

(in the formula, n' represents 0 or 1, and $X^1$, $R^2$, and b are the same as described above).

n' in the general formula (7) is preferably 1.

Specific preferred examples of the general formula (2) include the following general formula (4).

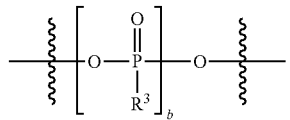

(4)

(in the formula, $R^3$ and b are the same as described above)

Specific more preferred examples of the general formula (2) include the following formula (6).

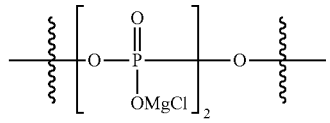

(6)

As $R^1$ in the general formula (I), a magnesium chloride oxy group; an alkyl group having 1 to 6 carbon atoms; an alkoxy group having 1 to 6 carbon atoms; a phenyl group which may have a halogeno group, an alkyl group, a halogenoalkyl group, or an alkoxy group as a substituent; a phenoxy group which may have a halogeno group, an alkyl group, a halogenoalkyl group, or an alkoxy group as a substituent; the group represented by the general formula (3); and the general formula (4) formed by two $R^1$'s are preferable, the magnesium chloride oxy group; the alkyl group having 1 to 6 carbon atoms; the alkoxy group having 1 to 6 carbon atoms; the phenyl group which may have an alkyl group or an alkoxy group as a substituent; the phenoxy group which may have an alkyl group or an alkoxy group as a substituent; the group represented by the general formula (3); and the general formula (4) formed by two $R^1$'s are more preferable, the magnesium chloride oxy group; the alkyl group having 1 to 6 carbon atoms; the alkoxy group having 1 to 6 carbon atoms; the phenyl group which may have an alkoxy group as a substituent; the phenoxy group; the group represented by the formula (5); and the formula (6) formed by two $R^1$'s are still more preferable, and the magnesium chloride oxy group; the alkyl group having 1 to 4 carbon atoms; the phenyl group which may have an alkoxy group as a substituent; the phenoxy group; and the group represented by the formula (5) are particularly preferable.

Specific examples of $R^1$ include a magnesium chloride oxy group, a methyl group, an ethyl group, an n-propyl group, an n-butyl group, a methoxy group, an ethoxy group, an n-propoxy group, an n-butoxy group, a phenyl group, a methylphenyl group, an ethylphenyl group, an n-propylphenyl group, an n-butylphenyl group, a methoxyphenyl group, an ethoxyphenyl group, an n-propoxyphenyl group, an n-butoxyphenyl group, a phenoxy group, a methylphenoxy group, an ethylphenoxy group, an n-propylphenoxy group, an n-butylphenoxy group, a methoxyphenoxy group, an ethoxyphenoxy group, an n-propoxyphenoxy group, an n-butoxyphenoxy group, the group represented by the formula (5), and the formula (6) formed by two $R^1$'s, the magnesium chloride oxy group, the methyl group, the ethyl group, the n-propyl group, the n-butyl group, the methoxy group, the ethoxy group, the phenyl group, the methoxyphenyl group, the ethoxyphenyl group, the n-propoxyphenyl group, the n-butoxyphenyl group, the phenoxy group, the group represented by the formula (5), and the formula (6) formed by two $R^1$'s are preferable, the magnesium chloride oxy group, the methyl group, the ethyl group, the phenyl group, the methoxyphenyl group, the ethoxyphenyl group, the phenoxy group, and the group represented by the formula (5) are more preferable, and the magnesium chloride oxy group, the methyl group, the phenyl group, the methoxyphenyl group, the phenoxy group, and the group represented by the formula (5) are particularly preferable.

Specific preferred examples of the general formula (I) include the following general formula (I-I) or (I-II).

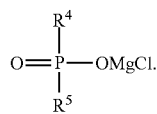

(I-I)

(In the formula, $R^4$ represents a magnesium chloride oxy group; an alkyl group having 1 to 6 carbon atoms; an alkoxy group having 1 to 6 carbon atoms; a phenyl group which may have a halogeno group, an alkyl group, a halogenoalkyl group, or an alkoxy group as a substituent; or a phenoxy group which may have a halogeno group, an alkyl group, a halogenoalkyl group, or an alkoxy group as a substituent, $R^5$ represents a magnesium chloride oxy group; an alkyl group having 1 to 6 carbon atoms; an alkoxy group having 1 to 6 carbon atoms; a phenyl group which may have a halogeno group, an alkyl group, a halogenoalkyl group, or an alkoxy group as a substituent; a phenoxy group which may have a halogeno group, an alkyl group, a halogenoalkyl group, or an alkoxy group as a substituent; or the group represented by the general formula (3), and $R^4$ and $R^5$ may form the general formula (4).)

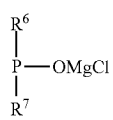

(I-II)

(In the formula, $R^6$ and $R^7$ each independently represent a magnesium chloride oxy group; an alkyl group having 1 to 6 carbon atoms; an alkoxy group having 1 to 6 carbon atoms; a phenyl group which may have a halogeno group, an alkyl group, a halogenoalkyl group, or an alkoxy group as a substituent; or a phenoxy group which may have a halogeno group, an alkyl group, a halogenoalkyl group, or an alkoxy group as a substituent.)

Examples of the alkyl group having 1 to 6 carbon atoms; the alkoxy group having 1 to 6 carbon atoms; the phenyl group which may have a halogeno group, an alkyl group, a halogenoalkyl group, or an alkoxy group as a substituent; and the phenoxy group which may have a halogeno group, an alkyl group, a halogenoalkyl group, or an alkoxy group as a substituent in $R^4$ to $R^7$ include the same ones as those in $R^3$ in the general formula (3), and preferred examples thereof are also the same.

As $R^4$ in the general formula (I-I), a magnesium chloride oxy group; an alkyl group having 1 to 6 carbon atoms; an alkoxy group having 1 to 6 carbon atoms; a phenyl group which may have an alkyl group or an alkoxy group as a substituent; a phenoxy group which may have an alkyl group or an alkoxy group as a substituent; and the general formula (4) formed by $R^4$ and $R^5$ are preferable, the magnesium chloride oxy group; the alkyl group having 1 to 6 carbon atoms; the alkoxy group having 1 to 6 carbon atoms; the phenyl group which may have an alkoxy group as a substituent; the phenoxy group; and the formula (6) formed by $R^4$ and $R^5$ are more preferable, and the magnesium chloride oxy group; the alkyl group having 1 to 4 carbon atoms; the phenyl group which may have an alkoxy group as a substituent; and the phenoxy group are particularly preferable.

Specific examples of $R^4$ include a magnesium chloride oxy group, a methyl group, an ethyl group, an n-propyl group, an n-butyl group, a methoxy group, an ethoxy group, an n-propoxy group, an n-butoxy group, a phenyl group, a methylphenyl group, an ethylphenyl group, an n-propylphenyl group, an n-butylphenyl group, a methoxyphenyl group, an ethoxyphenyl group, an n-propoxyphenyl group, an n-butoxyphenyl group, a phenoxy group, a methylphenoxy group, an ethylphenoxy group, an n-propylphenoxy group, an n-butylphenoxy group, a methoxyphenoxy group, an ethoxyphenoxy group, an n-propoxyphenoxy group, an n-butoxyphenoxy group, and the formula (6) formed by $R^4$ and $R^5$, the magnesium chloride oxy group, the methyl group, the ethyl group, the n-propyl group, the n-butyl group, the methoxy group, the ethoxy group, the phenyl group, the methoxyphenyl group, the ethoxyphenyl group, the n-propoxyphenyl group, the n-butoxyphenyl group, the phenoxy group, and the formula (6) formed by $R^4$ and $R^5$ are preferable, the magnesium chloride oxy group, the methyl group, the ethyl group, the phenyl group, the methoxyphenyl group, the ethoxyphenyl group, and the phenoxy group are more preferable, and the magnesium chloride oxy group, the methyl group, the phenyl group, the methoxyphenyl group, and the phenoxy group are particularly preferable.

As $R^5$ in the general formula (I-I), a magnesium chloride oxy group; an alkyl group having 1 to 6 carbon atoms; an alkoxy group having 1 to 6 carbon atoms; a phenyl group which may have an alkyl group or an alkoxy group as a substituent; a phenoxy group which may have an alkyl group or an alkoxy group as a substituent; the group represented by the general formula (3); and the general formula (4) formed by $R^4$ and $R^5$ are preferable, the magnesium chloride oxy group; the alkyl group having 1 to 6 carbon atoms; the alkoxy group having 1 to 6 carbon atoms; the phenyl group which may have an alkoxy group as a substituent; the phenoxy group; the group represented by the formula (5); and the formula (6) formed by $R^4$ and $R^5$ are more preferable, and the magnesium chloride oxy group; the alkyl group having 1 to 4 carbon atoms; the phenyl group which may have an alkoxy group as a substituent; the phenoxy group; and the group represented by the formula (5) are particularly preferable.

Specific examples of $R^5$ include a magnesium chloride oxy group, a methyl group, an ethyl group, an n-propyl group, an n-butyl group, a methoxy group, an ethoxy group, an n-propoxy group, an n-butoxy group, a phenyl group, a methylphenyl group, an ethylphenyl group, an n-propylphenyl group, an n-butylphenyl group, a methoxyphenyl group, an ethoxyphenyl group, an n-propoxyphenyl group, an n-butoxyphenyl group, a phenoxy group, a methylphenoxy group, an ethylphenoxy group, an n-propylphenoxy group, an n-butylphenoxy group, a methoxyphenoxy group, an ethoxyphenoxy group, an n-propoxyphenoxy group, an n-butoxyphenoxy group, the group represented by the formula (5), and the formula (6) formed by $R^4$ and $R^5$, the magnesium chloride oxy group, the methyl group, the ethyl group, the n-propyl group, the n-butyl group, the methoxy group, the ethoxy group, the phenyl group, the methoxyphenyl group, the ethoxyphenyl group, the n-propoxyphenyl group, the n-butoxyphenyl group, the phenoxy group, the group represented by the formula (5), and the formula (6)

formed by $R^4$ and $R^5$ are preferable, the magnesium chloride oxy group, the methyl group, the ethyl group, the phenyl group, the methoxyphenyl group, the ethoxyphenyl group, the phenoxy group, and the group represented by the formula (5) are more preferable, and the magnesium chloride oxy group, the methyl group, the phenyl group, the methoxyphenyl group, the phenoxy group, and the group represented by the formula (5) are particularly preferable.

As a combination of $R^4$ and $R^5$ in the general formula (I-I), combinations 1 to 19 described in Table 1 are preferable, combinations 1 to 4, 6, 7, 10 to 13, 15, 16, and 19 are more preferable, combinations 1, 2, 4, 6, 7, 10, 11, 13, 15, and 16 are still more preferable, and combinations 1, 2, 4, 7, 10, 13, 15, and 16 are particularly preferable.

TABLE 1

| | $R^4$ | $R^5$ |
|---|---|---|
| 1 | Magnesium chloride oxy group | Magnesium chloride oxy group |
| 2 | Magnesium chloride oxy group | Alkyl group having 1 to 6 carbon atoms |
| 3 | Magnesium chloride oxy group | Alkoxy group having 1 to 6 carbon atoms |
| 4 | Magnesium chloride oxy group | Phenyl group |
| 5 | Magnesium chloride oxy group | Phenyl group having alkyl group as substituent |
| 6 | Magnesium chloride oxy group | Phenyl group having alkoxy group as substituent |
| 7 | Magnesium chloride oxy group | Phenoxy group |
| 8 | Magnesium chloride oxy group | Phenoxy group having alkyl group as substituent |
| 9 | Magnesium chloride oxy group | Phenoxy group having alkoxy group as substituent |
| 10 | Magnesium chloride oxy group | Group represented by general formula (3) |
| 11 | Same, | alkyl group having 1 to 6 carbon atoms |
| 12 | Same, | alkoxy group having 1 to 6 carbon atoms |
| 13 | Phenyl group | Phenyl group |
| 14 | Same, | phenyl group having alkyl group as substituent |
| 15 | Same, | phenyl group having alkoxy group as substituent |
| 16 | Phenoxy group | Phenoxy group |
| 17 | Same, | phenoxy group having alkyl group as substituent |
| 18 | Same, | phenoxy group having alkoxy group as substituent |
| 19 | | General formula (4) |

Specific preferred examples of the general formula (I-I) include the following ones.

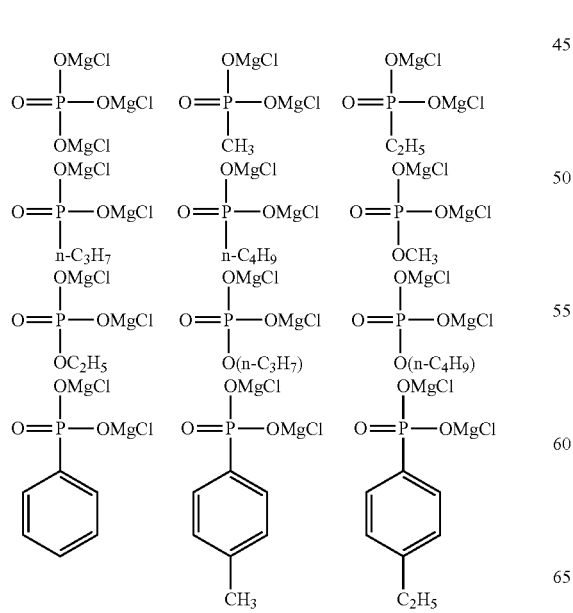
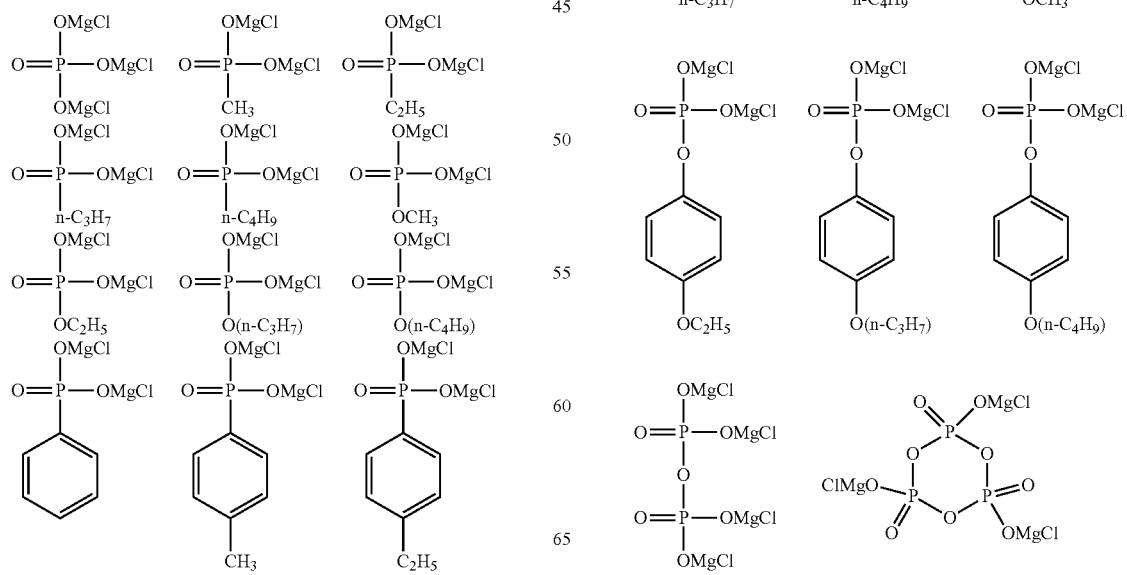

-continued
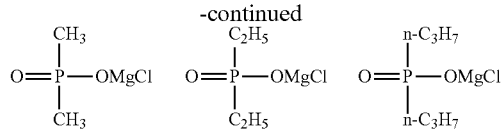
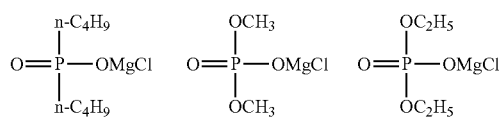
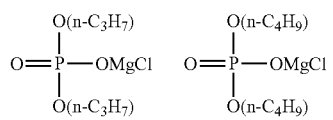
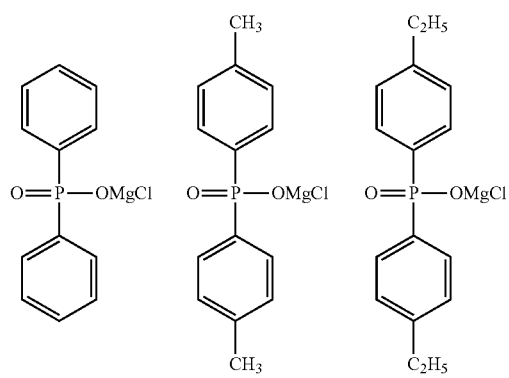
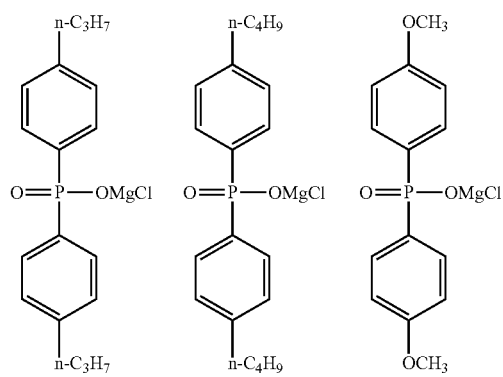
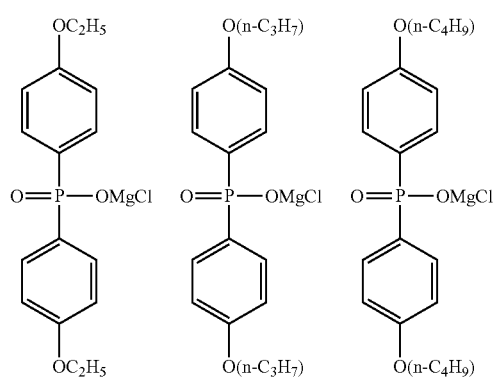
-continued
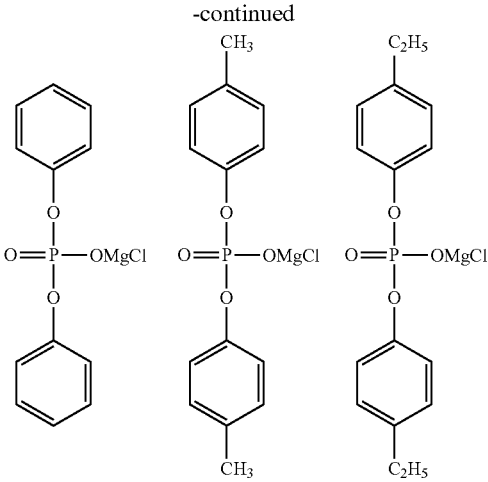
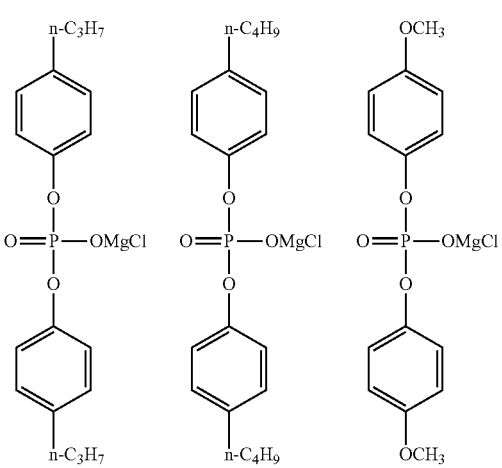
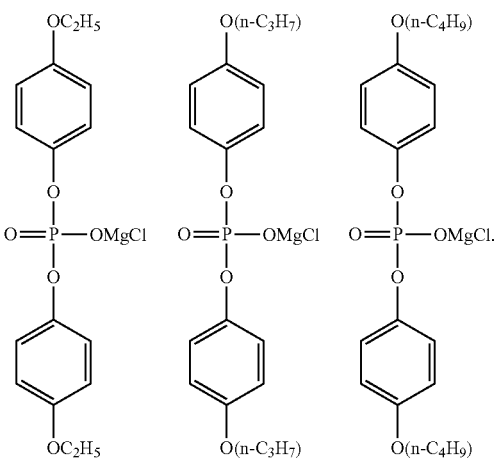
Among the specific preferred examples, the following ones are more preferable.
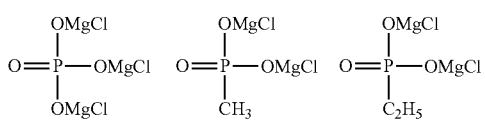

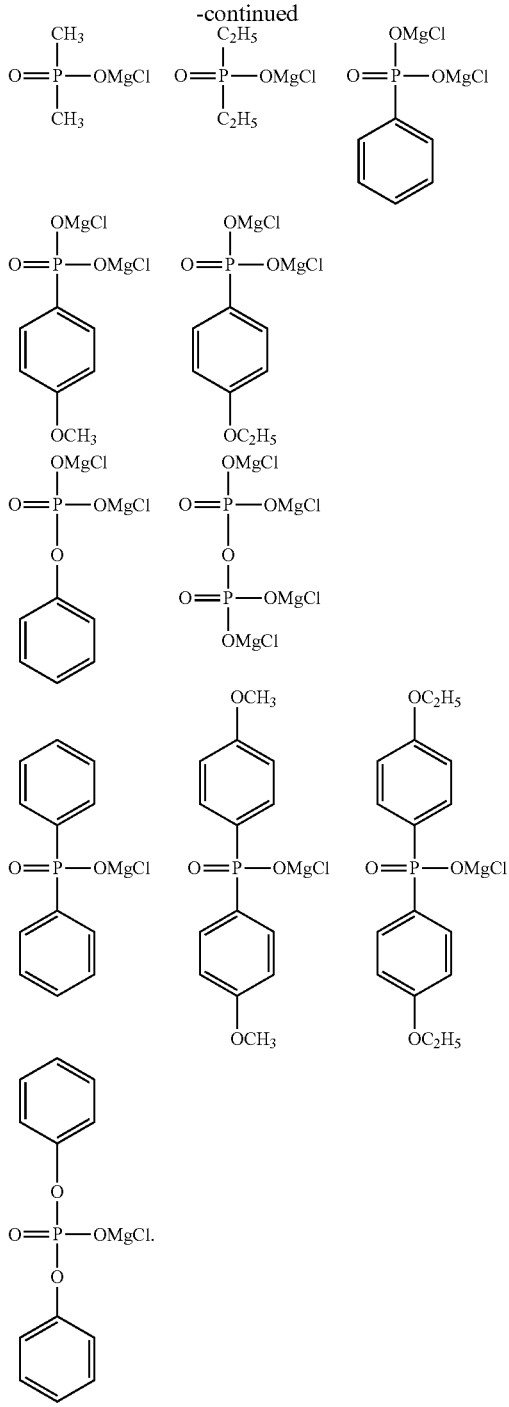
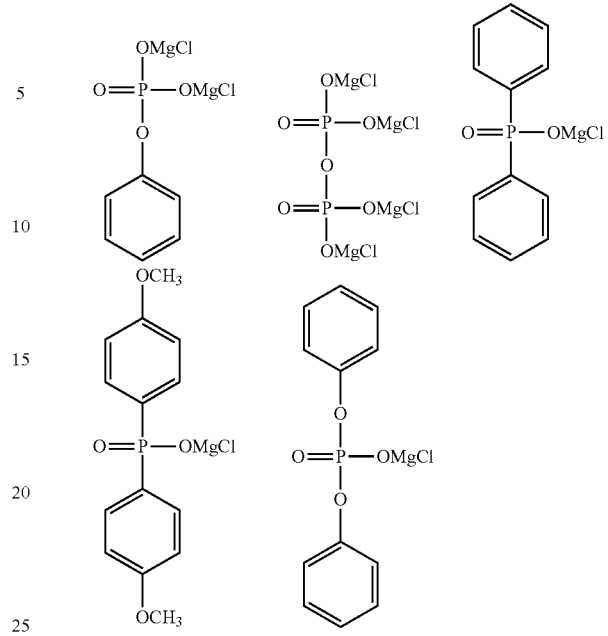

Among the specific preferred examples, the following ones are particularly preferable.

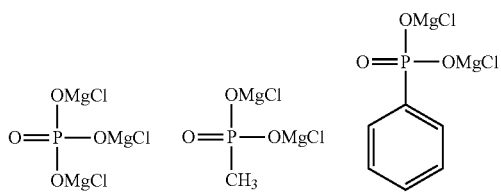

As $R^6$ and $R^7$ in the general formula (I-II), a magnesium chloride oxy group; an alkyl group having 1 to 6 carbon atoms; an alkoxy group having 1 to 6 carbon atoms; a phenyl group which may have an alkyl group or an alkoxy group as a substituent; and a phenoxy group which may have an alkyl group or an alkoxy group as a substituent are preferable, the magnesium chloride oxy group; the alkyl group having 1 to 6 carbon atoms; the alkoxy group having 1 to 6 carbon atoms; the phenyl group which may have an alkoxy group as a substituent; and the phenoxy group are more preferable, and the magnesium chloride oxy group; the alkyl group having 1 to 4 carbon atoms; the phenyl group which may have an alkoxy group as a substituent; and the phenoxy group are particularly preferable.

Specific examples of $R^6$ and $R^7$ include a magnesium chloride oxy group, a methyl group, an ethyl group, an n-propyl group, an n-butyl group, a methoxy group, an ethoxy group, an n-propoxy group, an n-butoxy group, a phenyl group, a methylphenyl group, an ethylphenyl group, an n-propylphenyl group, an n-butylphenyl group, a methoxyphenyl group, an ethoxyphenyl group, an n-propoxyphenyl group, an n-butoxyphenyl group, a phenoxy group, a methylphenoxy group, an ethylphenoxy group, an n-propylphenoxy group, an n-butylphenoxy group, a methoxyphenoxy group, an ethoxyphenoxy group, an n-propoxyphenoxy group, and an n-butoxyphenoxy group, the magnesium chloride oxy group, the methyl group, the ethyl group, the n-propyl group, the n-butyl group, the methoxy group, the ethoxy group, the phenyl group, the methoxyphenyl group, the ethoxyphenyl group, the n-propoxyphenyl group, the n-butoxyphenyl group, and the phenoxy group are preferable, the magnesium chloride oxy group, the methyl group, the ethyl group, the phenyl group, the methoxyphenyl group, the ethoxyphenyl group, and the phenoxy group are more preferable, and the magnesium chloride oxy group, the phenyl group, and the phenoxy group are particularly preferable.

As a combination of $R^6$ and $R^7$ in the general formula (I-II), combinations 1 to 17 described in Table 2 are preferable, combinations 1 to 4, 6, 7, 10 to 12, 14, and 15 are more preferable, combinations 1, 2, 4, 6, 7, 10, 12, 14, and 15 are still more preferable, combinations 1, 2, 4, 7, 10, 12, and 15 are even still more preferable, and combinations 1, 4, 12, and 15 are particularly preferable.

TABLE 2

| | R⁶ | R⁷ |
|---|---|---|
| 1 | Magnesium chloride oxy group | Magnesium chloride oxy group |
| 2 | Magnesium chloride oxy group | Alkyl group having 1 to 6 carbon atoms |
| 3 | Magnesium chloride oxy group | Alkoxy group having 1 to 6 carbon atoms |
| 4 | Magnesium chloride oxy group | Phenyl group |
| 5 | Magnesium chloride oxy group | Phenyl group having alkyl group as substituent |
| 6 | Magnesium chloride oxy group | Phenyl group having alkoxy group as substituent |
| 7 | Magnesium chloride oxy group | Phenoxy group |
| 8 | Magnesium chloride oxy group | Phenoxy group having alkyl group as substituent |
| 9 | Magnesium chloride oxy group | Phenoxy group having alkoxy group as substituent |
| 10 | | Same, alkyl group having 1 to 6 carbon atoms |
| 11 | | Same, alkoxy group having 1 to 6 carbon atoms |
| 12 | Phenyl group | Phenyl group |
| 13 | | Same, phenyl group having alkyl group as substituent |
| 14 | | Same, phenyl group having alkoxy group as substituent |
| 15 | Phenoxy group | Phenoxy group |
| 16 | | Same, phenoxy group having alkyl group as substituent |
| 17 | | Same, phenoxy group having alkoxy group as substituent |

Specific preferred examples of the general formula (I-II) include the following ones.

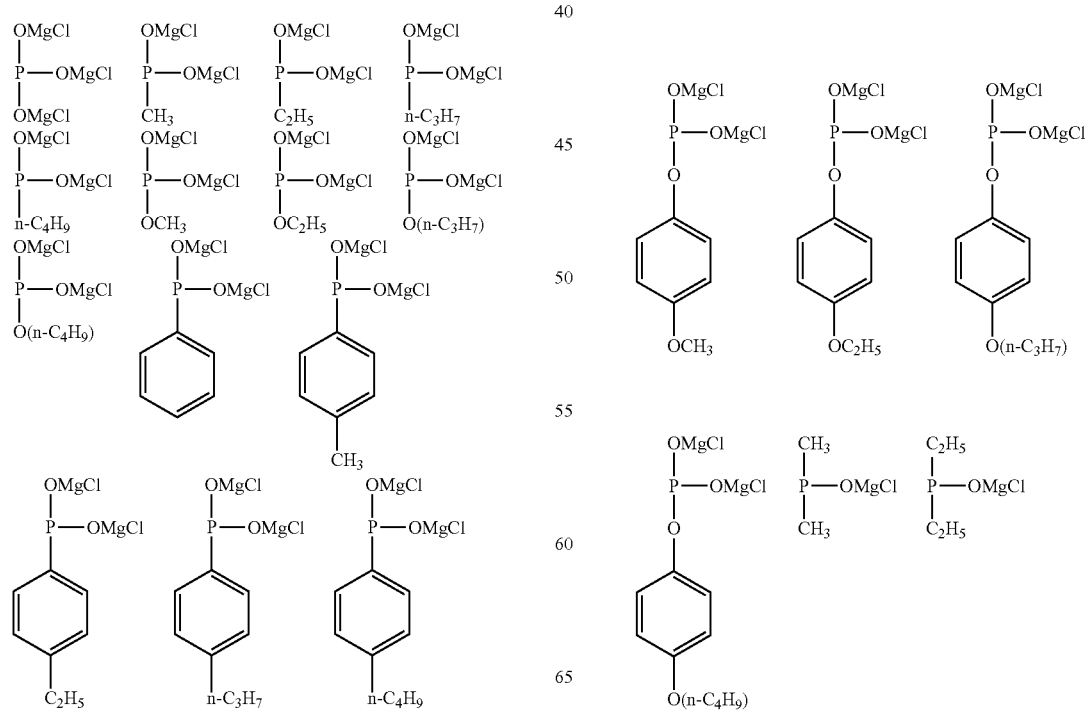
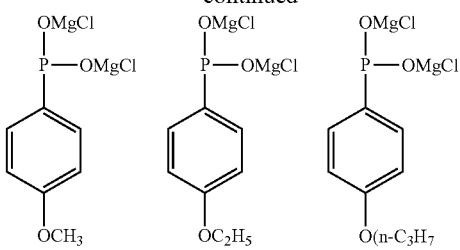
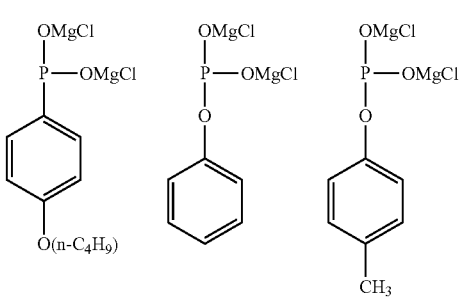
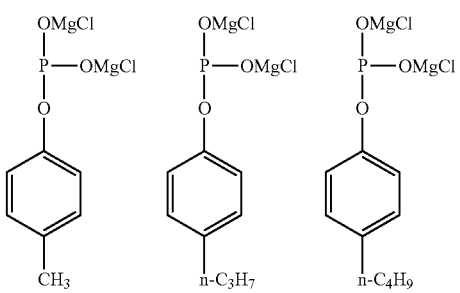
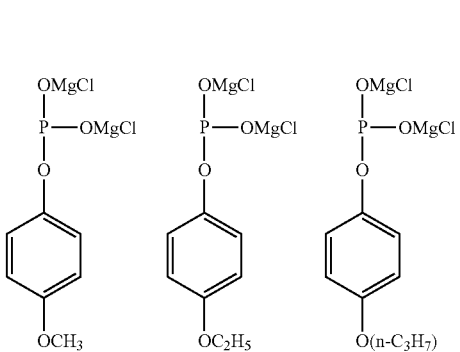
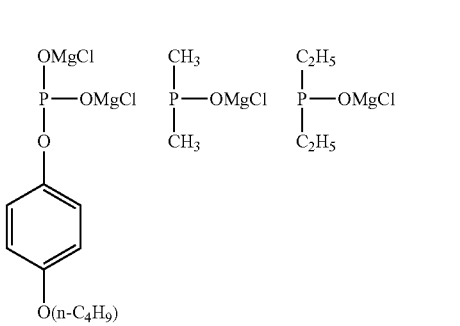

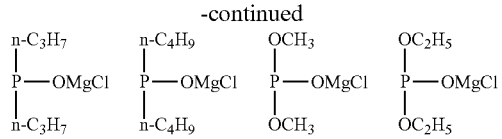
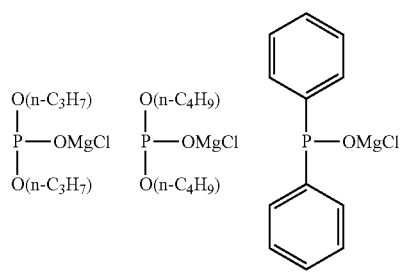
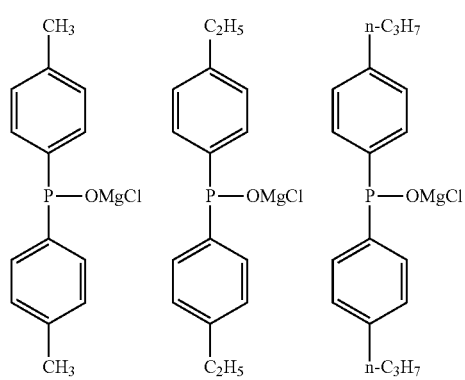
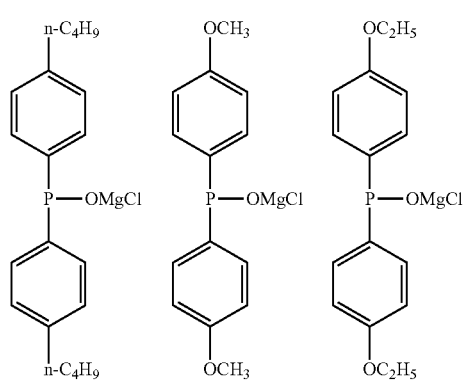
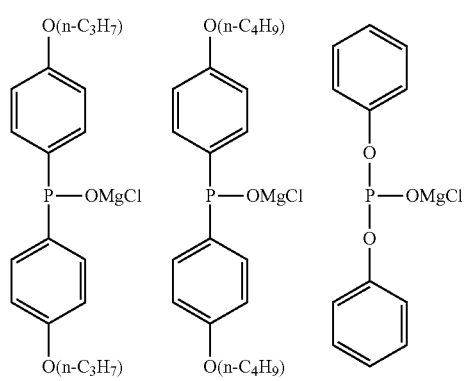
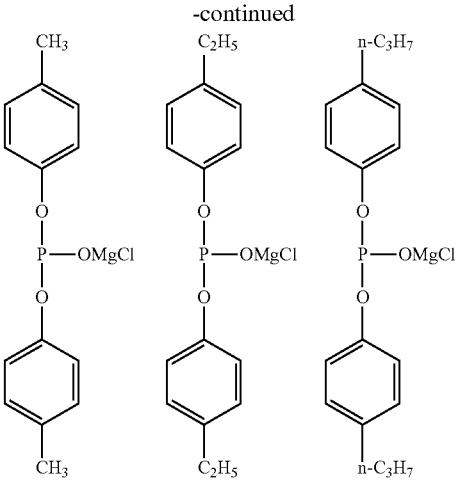
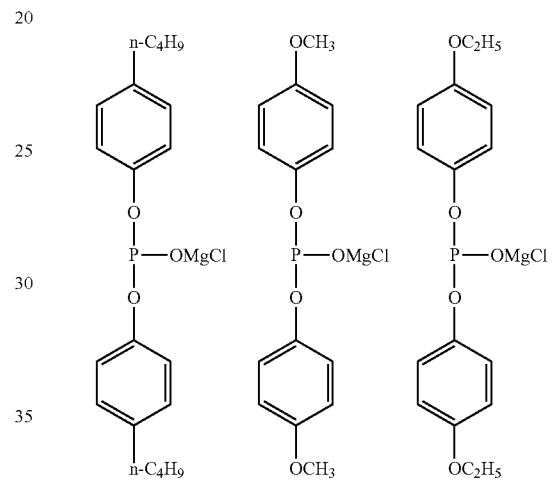
Among the specific preferred examples, the following ones are more preferable.
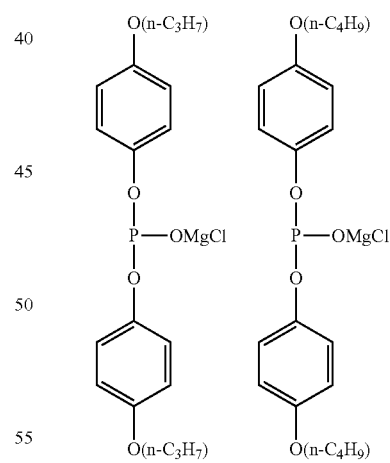
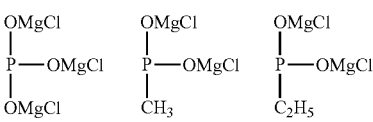

-continued

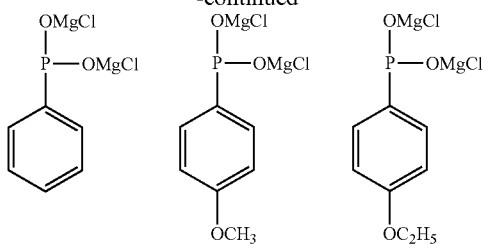
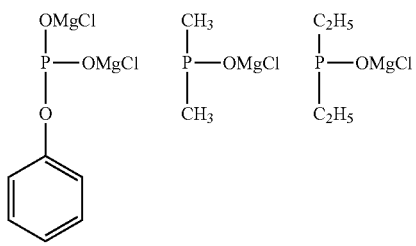
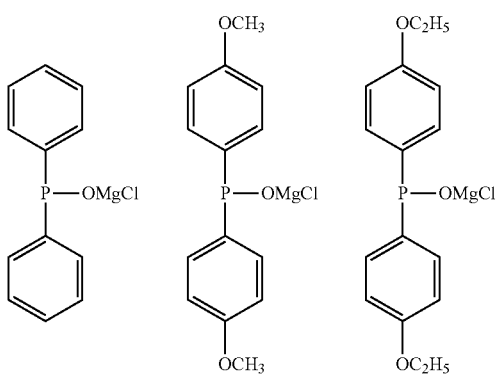
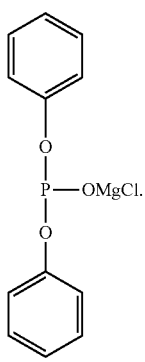

Among the specific preferred examples, the following ones are particularly preferable.

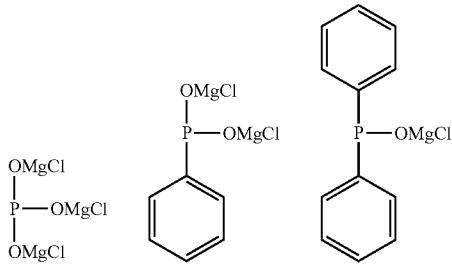

-continued

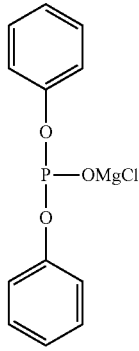

Method for Producing Compound Represented by General Formula (I)

The compound represented by the general formula (I) according to the present invention can be obtained, for example, by reacting a compound represented by the following formula (II), the following general formula (III), or the following general formula (IV) with a Grignard reagent in a solvent.

 (II)

 (III)

 (IV)

{In the formula, two $R^{11}$'s each independently represent a hydroxy group; an alkyl group having 1 to 6 carbon atoms, which may have a halogeno group or an alkoxy group as a substituent; an alkoxy group having 1 to 6 carbon atoms; an aryl group having 6 to 10 carbon atoms, which may have a halogeno group, an alkyl group, a halogenoalkyl group, or an alkoxy group as a substituent; an aryloxy group having 6 to 10 carbon atoms, which may have a halogeno group, an alkyl group, a halogenoalkyl group, or an alkoxy group as a substituent; or a group represented by the following general formula (11), and two $R^{11}$'s may form the following general formula (12):

$$\begin{Bmatrix} \xi \\ \xi \end{Bmatrix} \left[ O - \underset{R^{12}}{\overset{O}{\underset{\|}{P}}} - OH \right]_a \quad (11)$$

(in the formula, a pieces of $R^{12}$'s each independently represent a hydroxy group; an alkyl group having 1 to 6 carbon atoms, which may have a halogeno group or an alkoxy group as a substituent; an alkoxy group having 1 to 6 carbon atoms; an aryl group having 6 to 10 carbon atoms, which may have a halogeno group, an alkyl group, a halogenoalkyl group, or an alkoxy group as a substituent; or an aryloxy group having 6 to 10 carbon atoms, which may have a halogeno group, an alkyl group, a halogenoalkyl group, or an alkoxy group as a substituent, and a is the same as described above):

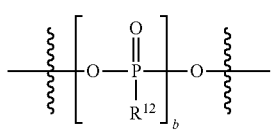

(12)

(in the formula, $R^{12}$ and b are the same as described above)}.

Examples of the alkyl group having 1 to 6 carbon atoms, which may have a halogeno group or an alkoxy group as a substituent; the alkoxy group having 1 to 6 carbon atoms; and the aryl group having 6 to 10 carbon atoms, which may have a halogeno group, an alkyl group, a halogenoalkyl group, or an alkoxy group as a substituent; and the aryloxy group having 6 to 10 carbon atoms, which may have a halogeno group, an alkyl group, a halogenoalkyl group, or an alkoxy group as a substituent in of the general formula (III) and (IV) include the same ones as those in $R^1$ of the general formula (I), and preferred examples thereof are also the same.

Examples of the alkyl group having 1 to 6 carbon atoms, which may have a halogeno group or an alkoxy group as a substituent; the alkoxy group having 1 to 6 carbon atoms; the aryl group having 6 to 10 carbon atoms, which may have a halogeno group, an alkyl group, a halogenoalkyl group, or an alkoxy group as a substituent; and the aryloxy group having 6 to 10 carbon atoms, which may have a halogeno group, an alkyl group, a halogenoalkyl group, or an alkoxy group as a substituent in $R^{12}$ of the general formula (11) and the general formula (12) include the same ones as those in $R^1$ of the general formula (I), and preferred examples thereof are also the same.

As $R^{12}$ in the general formula (11) and the general formula (12), a hydroxy group; an alkyl group having 1 to 6 carbon atoms; an alkoxy group having 1 to 6 carbon atoms; a phenyl group which may have a halogeno group, an alkyl group, a halogenoalkyl group, or an alkoxy group as a substituent; and a phenoxy group which may have a halogeno group, an alkyl group, a halogenoalkyl group, or an alkoxy group as a substituent are preferable, the hydroxy group; the alkyl group having 1 to 6 carbon atoms; the alkoxy group having 1 to 6 carbon atoms; the phenyl group which may have an alkyl group or an alkoxy group as a substituent; and the phenoxy group which may have an alkyl group or an alkoxy group as a substituent are more preferable, the hydroxy group, the alkyl group having 1 to 6 carbon atoms, the alkoxy group having 1 to 6 carbon atoms, the phenyl group, and the phenoxy group are still more preferable, and the hydroxy group, the alkyl group having 1 to 4 carbon atoms, the phenyl group, and the phenoxy group are particularly preferable. Specific preferred examples of $R^{12}$ include a hydroxy group, a methyl group, an ethyl group, an n-propyl group, an n-butyl group, a phenyl group, and a phenoxy group, and the hydroxy group is preferable.

Specific preferred examples of the general formula (11) include the following general formula (13).

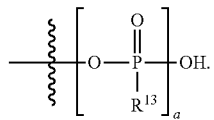

(13)

(In the formula, a pieces of $R^{13}$'s each independently represent a hydroxy group; an alkyl group having 1 to 6 carbon atoms; an alkoxy group having 1 to 6 carbon atoms; a phenyl group which may have a halogeno group, an alkyl group, a halogenoalkyl group, or an alkoxy group as a substituent; or a phenoxy group which may have a halogeno group, an alkyl group, a halogenoalkyl group, or an alkoxy group as a substituent, and a is the same as described above.)

Examples of the alkyl group having 1 to 6 carbon atoms; the alkoxy group having 1 to 6 carbon atoms; the phenyl group which may have a halogeno group, an alkyl group, a halogenoalkyl group, or an alkoxy group as a substituent; and the phenoxy group which may have a halogeno group, an alkyl group, a halogenoalkyl group, or an alkoxy group as a substituent in $R^{13}$ of the general formula (13) include the same ones as those in $R^3$ of the general formula (3), and preferred examples thereof are also the same.

As $R^{13}$ of the general formula (13), a hydroxy group; an alkyl group having 1 to 6 carbon atoms; an alkoxy group having 1 to 6 carbon atoms; a phenyl group which may have an alkyl group or an alkoxy group as a substituent; and a phenoxy group which may have an alkyl group or an alkoxy group as a substituent are preferable, the hydroxy group, the alkyl group having 1 to 6 carbon atoms, the alkoxy group having 1 to 6 carbon atoms, and the phenyl group, and the phenoxy group are more preferable, and the magnesium chloride oxy group, the alkyl group having 1 to 4 carbon atoms, the phenyl group, and the phenoxy group are particularly preferable. Specific preferred examples of $R^{13}$ include a hydroxy group, a methyl group, an ethyl group, an n-propyl group, an n-butyl group, a phenyl group, and a phenoxy group, and the hydroxy group is preferable.

Specific more preferred examples of the general formula (11) include a phosphoric acid group ($-PO_4H_2$).

Specific preferred examples of the general formula (12) include the following general formula (14).

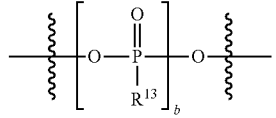

(14)

(In the formula, $R^{13}$ and b are the same as described above.)

Specific more preferred examples of the general formula (12) include the following formula (15).

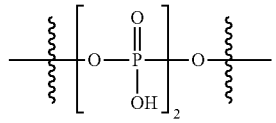

(15)

As $R^{11}$ of the general formula (III), a hydroxy group; an alkyl group having 1 to 6 carbon atoms; an alkoxy group having 1 to 6 carbon atoms; a phenyl group which may have a halogeno group, an alkyl group, a halogenoalkyl group, or an alkoxy group as a substituent; a phenoxy group which may have a halogeno group, an alkyl group, a halogenoalkyl group, or an alkoxy group as a substituent; the group represented by the general formula (13); and the general formula (14) formed by two $R^{11}$'s are preferable, the hydroxy group; the alkyl group having 1 to 6 carbon atoms; the alkoxy group having 1 to 6 carbon atoms; the phenyl group which may have an alkyl group or an alkoxy group as a substituent; the phenoxy group which may have an alkyl group or an alkoxy group as a substituent; the group represented by the general formula (13); and the general formula (14) formed by two $R^{11}$'s are more preferable, the hydroxy group; the alkyl group having 1 to 6 carbon atoms; the alkoxy group having 1 to 6 carbon atoms; the phenyl group which may have an alkoxy group as a substituent; the phenoxy group; the phosphoric acid group; and the formula (15) formed by two $R^1$'s are still more preferable, and the hydroxy group; the alkyl group having 1 to 4 carbon atoms; the phenyl group which may have an alkoxy group as a substituent; the phenoxy group; and the phosphoric acid group are particularly preferable.

Specific examples of $R^{11}$ include a hydroxy group, a methyl group, an ethyl group, an n-propyl group, an n-butyl group, a methoxy group, an ethoxy group, an n-propoxy group, an n-butoxy group, a phenyl group, a methylphenyl group, an ethylphenyl group, an n-propylphenyl group, an n-butylphenyl group, a methoxyphenyl group, an ethoxyphenyl group, an n-propoxyphenyl group, an n-butoxyphenyl group, a phenoxy group, a methylphenoxy group, an ethylphenoxy group, an n-propylphenoxy group, an n-butylphenoxy group, a methoxyphenoxy group, an ethoxyphenoxy group, an n-propoxyphenoxy group, an n-butoxyphenoxy group, a phosphoric acid group, and the formula (15) formed by two $R^{11}$'s, the hydroxy group, the methyl group, the ethyl group, the n-propyl group, the n-butyl group, the methoxy group, the ethoxy group, the phenyl group, the methoxyphenyl group, the ethoxyphenyl group, the n-propoxyphenyl group, the n-butoxyphenyl group, the phenoxy group, the phosphoric acid group, and the formula (15) formed by two $R^{11}$'s are preferable, the hydroxy group, the methyl group, the ethyl group, the phenyl group, the methoxyphenyl group, the ethoxyphenyl group, the phenoxy group, and the phosphoric acid group are more preferable, and the hydroxy group, the methyl group, the phenyl group, the methoxyphenyl group, the phenoxy group, and the phosphoric acid group are particularly preferable.

As a combination of two $R^{11}$'s of the general formula (III), combinations 1 to 19 described in Table 3 are preferable, combinations 1 to 4, 6, 7, 10 to 13, 15, 16, and 19 are more preferable, combinations 1, 2, 4, 6, 7, 10, 11, 13, 15, and 16 are still more preferable, and combinations 1, 2, 4, 7, 10, 13, 15, and 16 are particularly preferable.

TABLE 3

| Two $R^{11}$'s |
|---|
| 1  Two hydroxy groups |
| 2  One hydroxy group and one alkyl group having 1 to 6 carbon atoms |
| 3  One hydroxy group and one alkoxy group having 1 to 6 carbon atoms |
| 4  One hydroxy group and one phenyl group |
| 5  One hydroxy group and one phenyl group having alkyl group as substituent |
| 6  One hydroxy group and one phenyl group having alkoxy group as substituent |

TABLE 3-continued

| Two $R^{11}$'s |
|---|
| 7  One hydroxy group and one phenoxy group |
| 8  One hydroxy group and one phenoxy group having alkyl group as substituent |
| 9  One hydroxy group and one phenoxy group having alkoxy group as substituent |
| 10 One hydroxy group and one group represented by general formula (13) |
| 11 Same, two alkyl groups having 1 to 6 carbon atoms |
| 12 Same, two alkoxy groups having 1 to 6 carbon atoms |
| 13 Two phenyl groups |
| 14 Same, two phenyl groups having alkyl group as substituent |
| 15 Same, two phenyl groups having alkoxy group as substituent |
| 16 Two phenoxy groups |
| 17 Same, two phenoxy groups having alkyl group as substituent |
| 18 Same, two phenoxy groups having alkoxy group as substituent |
| 19 General formula (14) |

Specific preferred examples of the compound represented by the general formula (III) include the following compounds.

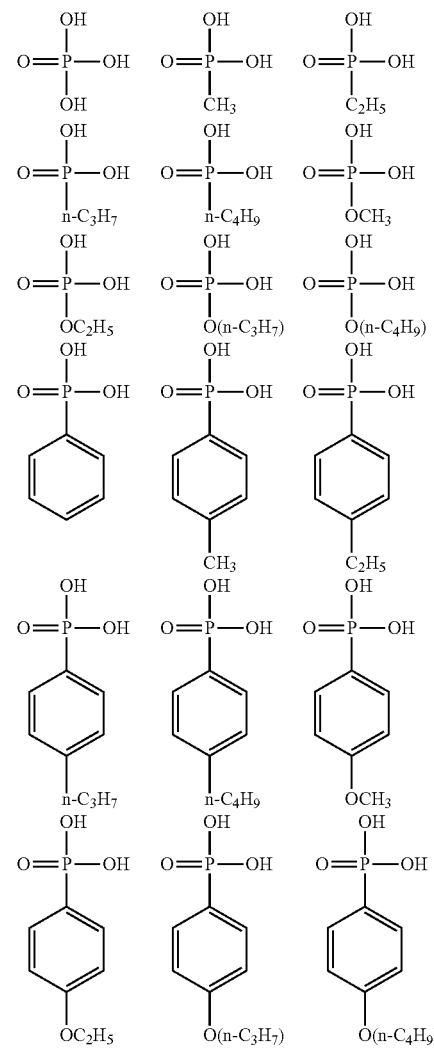

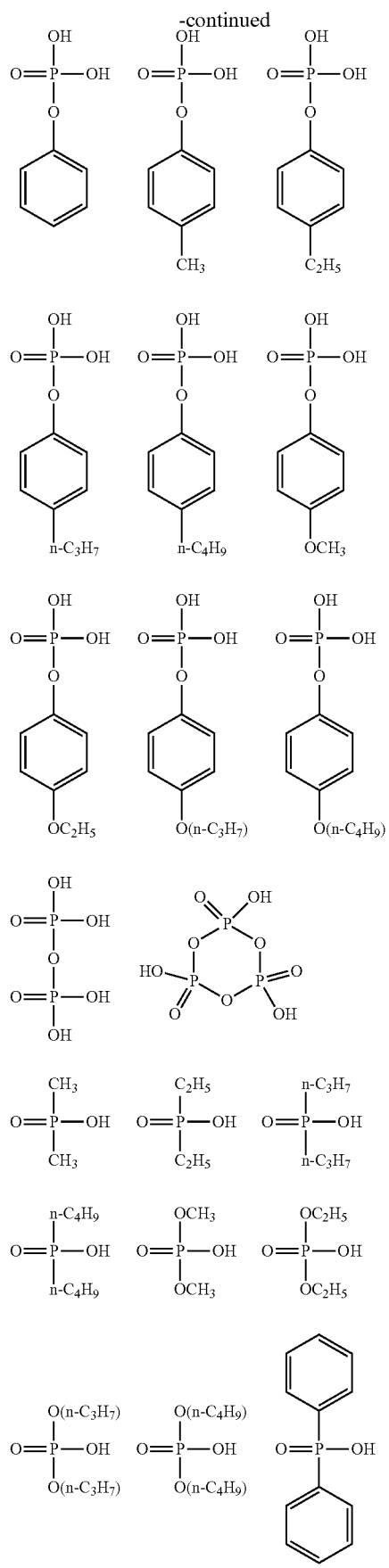

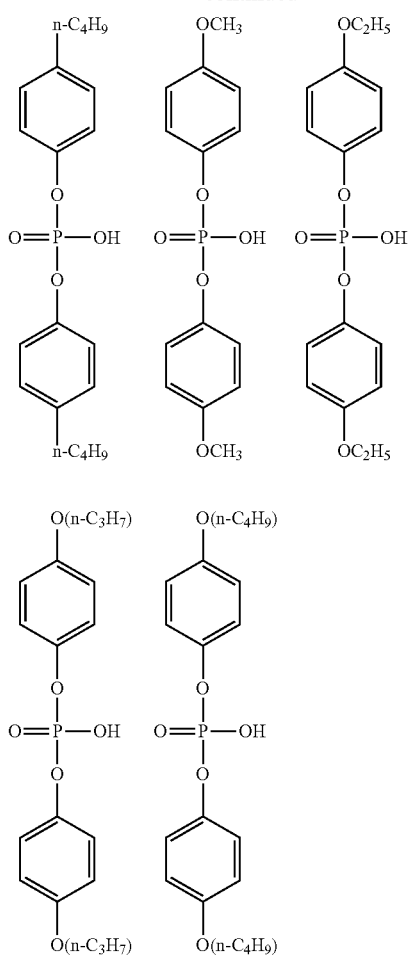
Among the specific preferred examples, the following ones are more preferable.
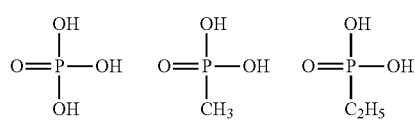
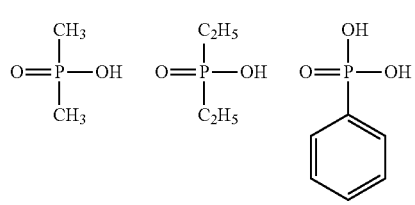
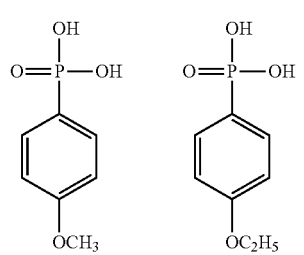
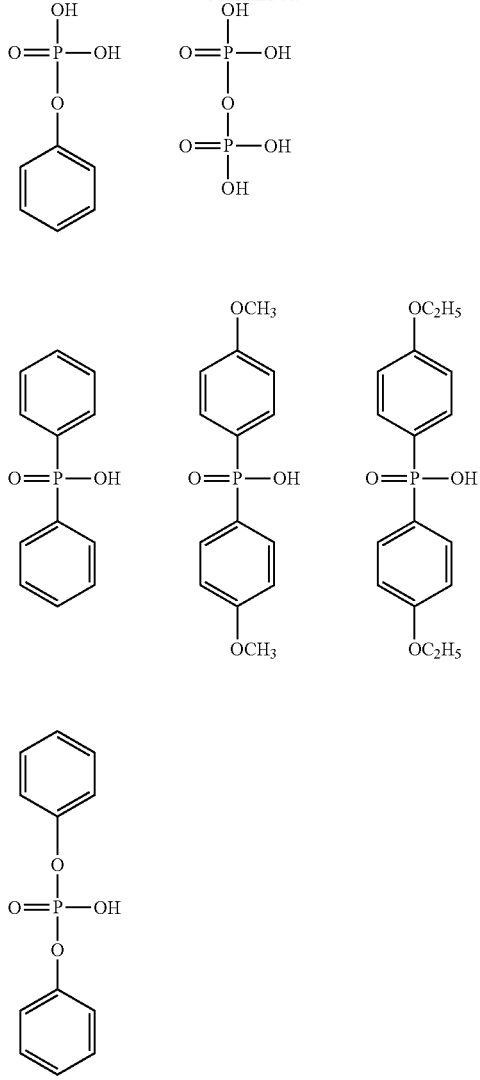
Among the specific preferred examples, the following ones are particularly preferable.

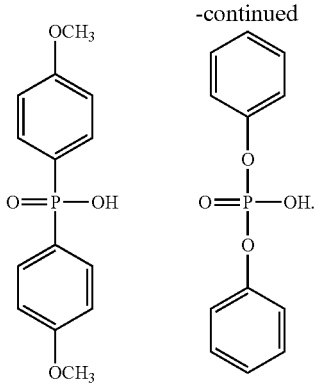

As $R^{11}$ of the general formula (IV), a hydroxy group; an alkyl group having 1 to 6 carbon atoms; an alkoxy group having 1 to 6 carbon atoms; a phenyl group which may have a halogeno group, an alkyl group, a halogenoalkyl group, or an alkoxy group as a substituent; and a phenoxy group which may have a halogeno group, an alkyl group, a halogenoalkyl group, or an alkoxy group as a substituent are preferable, the hydroxy group; the alkyl group having 1 to 6 carbon atoms; the alkoxy group having 1 to 6 carbon atoms; the phenyl group which may have an alkyl group or an alkoxy group as a substituent; and the phenoxy group which may have an alkyl group or an alkoxy group as a substituent are more preferable, the hydroxy group; the alkyl group having 1 to 6 carbon atoms; the alkoxy group having 1 to 6 carbon atoms; the phenyl group which may have an alkoxy group as a substituent; and the phenoxy group are still more preferable, and the hydroxy group; the alkyl group having 1 to 4 carbon atoms; the phenyl group which may have an alkoxy group as a substituent; and the phenoxy group are particularly preferable.

Specific examples of $R^{11}$ include a hydroxy group, a methyl group, an ethyl group, an n-propyl group, an n-butyl group, a methoxy group, an ethoxy group, an n-propoxy group, an n-butoxy group, a phenyl group, a methylphenyl group, an ethylphenyl group, an n-propylphenyl group, an n-butylphenyl group, a methoxyphenyl group, an ethoxyphenyl group, an n-propoxyphenyl group, an n-butoxyphenyl group, a phenoxy group, a methylphenoxy group, an ethylphenoxy group, an n-propylphenoxy group, an n-butylphenoxy group, a methoxyphenoxy group, an ethoxyphenoxy group, an n-propoxyphenoxy group, and an n-butoxyphenoxy group, the hydroxy group, the methyl group, the ethyl group, the n-propyl group, the n-butyl group, the methoxy group, the ethoxy group, the phenyl group, the methoxyphenyl group, the ethoxyphenyl group, the n-propoxyphenyl group, the n-butoxyphenyl group, and the phenoxy group are preferable, the hydroxy group, the methyl group, the ethyl group, the phenyl group, the methoxyphenyl group, the ethoxyphenyl group, and the phenoxy group are more preferable, and the hydroxy group, the methyl group, the phenyl group, the methoxyphenyl group, and the phenoxy group are particularly preferable.

As a combination of two $R^{11}$'s of the general formula (IV), combinations 1 to 17 described in Table 4 are preferable, combinations 1 to 4, 6, 7, 10 to 12, 14, and 15 are more preferable, combinations 1, 2, 4, 6, 7, 10, 12, 14, and 15 are still more preferable, combinations 1, 2, 4, 7, 10, 12, and 15 are even still more preferable, and combinations 1, 4, 12, and 15 are particularly preferable.

TABLE 4

| Two $R^{11}$'s |
|---|
| 1  Two hydroxy groups |
| 2  One hydroxy group and one alkyl group having 1 to 6 carbon atoms |
| 3  One hydroxy group and one alkoxy group having 1 to 6 carbon atoms |
| 4  One hydroxy group and one phenyl group |
| 5  One hydroxy group and one phenyl group having alkyl group as substituent |
| 6  One hydroxy group and one phenyl group having alkoxy group as substituent |
| 7  One hydroxy group and one phenoxy group |
| 8  One hydroxy group and one phenoxy group having alkyl group as substituent |
| 9  One hydroxy group and one phenoxy group having alkoxy group as substituent |
| 10  Same, two alkyl groups having 1 to 6 carbon atoms |
| 11  Same, two alkoxy groups having 1 to 6 carbon atoms |
| 12  Two phenyl groups |
| 13  Same, two phenyl groups having alkyl group as substituent |
| 14  Same, two phenyl groups having alkoxy group as substituent |
| 15  Two phenoxy groups |
| 16  Same, two phenoxy groups having alkyl group as substituent |
| 17  Same, two phenoxy groups having alkoxy group as substituent |

Specific preferred examples of the compound represented by the general formula (IV) include the following compounds.

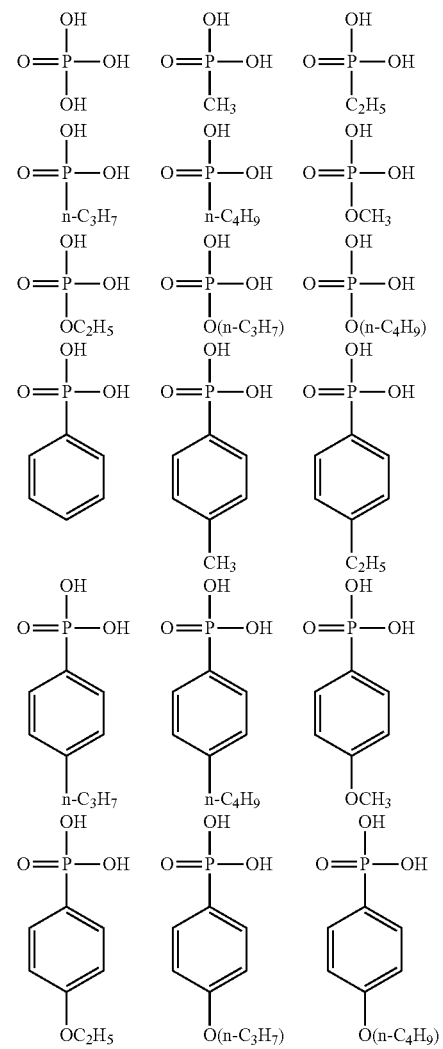

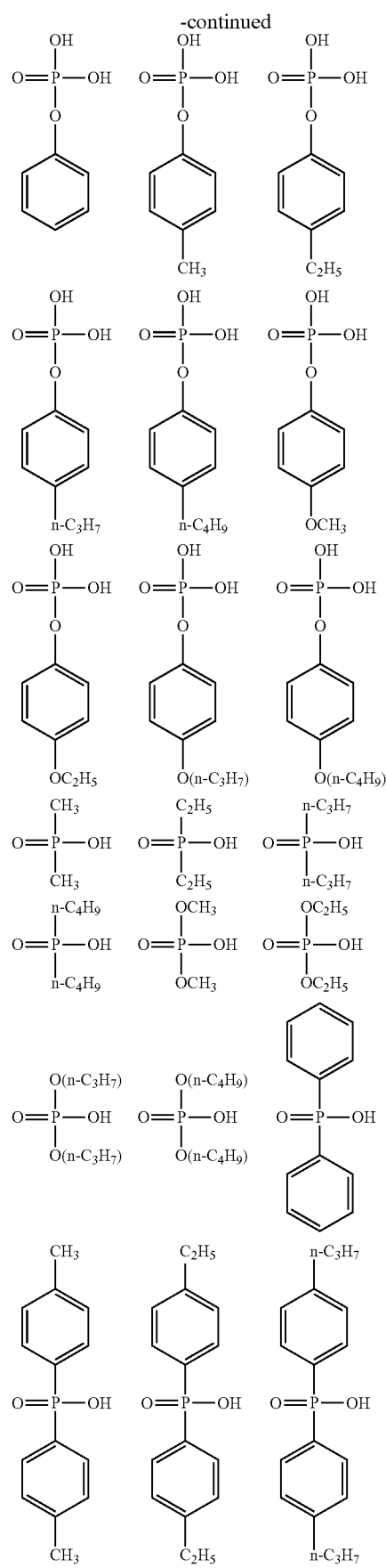

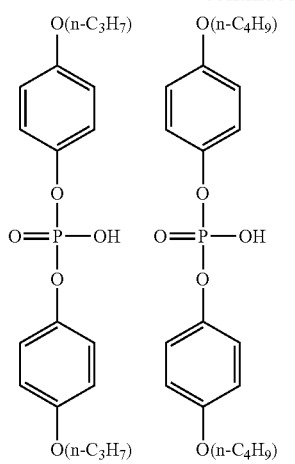

Among the specific preferred examples, the following ones are more preferable.

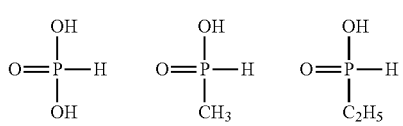

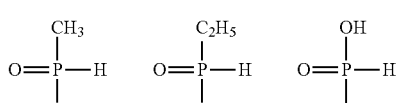

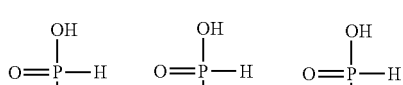

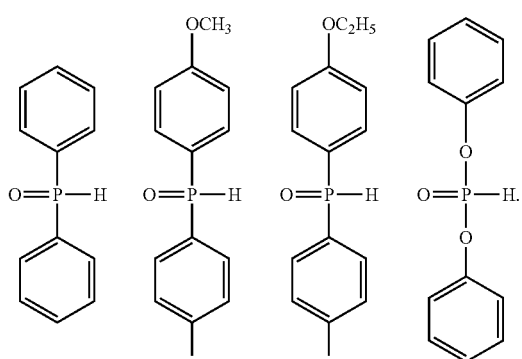

Among the specific preferred examples, the following ones are particularly preferable.

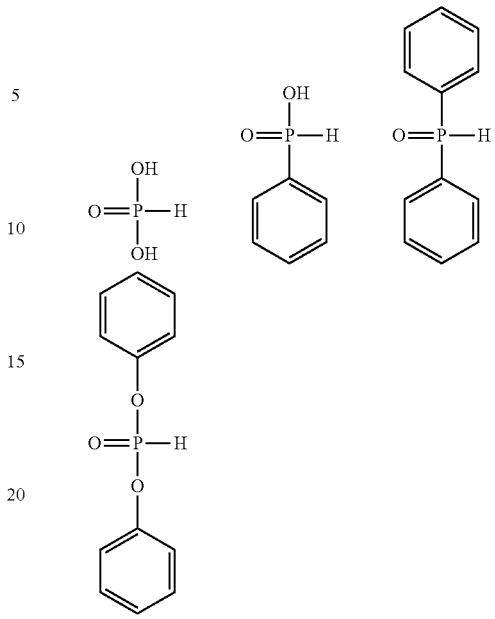

As any of the compound represented by the formula (II), the general formula (III), or the general formula (IV), a commercial product may be used, or the compound appropriately synthesized by a method known per se may be used.

Examples of the Grignard reagent include a compound represented by $RMgX^1$ (in which R represents an alkyl group having 1 to 6 carbon atoms or a phenyl group, and $X^1$ is the same as described above).

Examples of the alkyl group having 1 to 6 carbon atoms in R include the same ones as the alkyl group having 1 to 6 carbon atoms in $R^1$ of the general formula (I), and preferred examples thereof are also the same.

Specific examples of the Grignard reagent include methylmagnesium chloride, methylmagnesium bromide, ethylmagnesium chloride, ethylmagnesium bromide, n-propylmagnesium chloride, n-propylmagnesium bromide, isopropylmagnesium chloride, n-butylmagnesium chloride, n-butylmagnesium bromide, sec-butylmagnesium chloride, tert-butylmagnesium chloride, phenylmagnesium chloride, and phenylmagnesium bromide. Among these, the methylmagnesium chloride, the ethylmagnesium chloride, the n-propylmagnesium chloride, the isopropylmagnesium chloride, the n-butylmagnesium chloride, the sec-butylmagnesium chloride, the tert-butylmagnesium chloride, and the phenylmagnesium chloride are preferable, and the methylmagnesium chloride, the ethylmagnesium chloride, the n-propylmagnesium chloride, the n-butylmagnesium chloride, and the phenylmagnesium chloride are more preferable.

The amount of the Grignard reagent to be used is usually 0.1 to 27 equivalents, and preferably 0.5 to 13.5 equivalents, with respect to moles of the compound represented by the formula (II), the general formula (III), or the general formula (IV).

More specifically, the amount of the Grignard reagent to be used increases in proportion to an increase in the number of the hydroxy groups contained in a molecule of the compound represented by the formula (II), the general formula (III), or the general formula (IV).

In a case of using the compound represented by the formula (II), the amount of the Grignard reagent to be used is usually 0.1 to 3 equivalents, and preferably 0.5 to 1.5 equivalents, with respect to moles of the compound.

In a case of using the compound represented by the general formula (III), the amount of the Grignard reagent to be used increases by usually 0.1 to 3 equivalents, and preferably 0.5 to 1.5 equivalents, with respect to moles of the compound, per hydroxy group contained in a molecule of the compound. For example, in a case where the compound has two hydroxy groups in the molecule thereof, the amount of the Grignard reagent to be used is usually 0.2 to 6 equivalents, and preferably 1 to 3 equivalents, with respect to moles of the compound, and in a case where the compound has three hydroxy groups in the molecule thereof, the amount of the Grignard reagent to be used is usually 0.3 to 9 equivalents, and preferably 1.5 to 4.5 equivalents, with respect to moles of the compound.

In a case of using the compound represented by the general formula (IV), and the compound does not have a hydroxy group in the molecule thereof, the amount of the Grignard reagent to be used is usually 0.1 to 3 equivalents, and preferably 0.5 to 1.5 equivalents, with respect to moles of the compound. In addition, the amount of the Grignard reagent to be used increases by usually 0.1 to 3 equivalents, and preferably 0.5 to 1.5 equivalents, with respect to moles of the compound, per hydroxy group contained in a molecule of the compound. For example, in a case where the compound has one hydroxy group in the molecule thereof, the amount of the Grignard reagent to be used is usually 0.2 to 6 equivalents, and preferably 1 to 3 equivalents, with respect to moles of the compound, and in a case where the compound has two hydroxy groups in the molecule thereof, the amount of the Grignard reagent to be used is usually 0.3 to 9 equivalents, and preferably 1.5 to 4.5 equivalents, with respect to moles of the compound.

As the solvent, any solvent in which at least either of the compound represented by the formula (II), the general formula (III), and the general formula (IV), or the Grignard reagent is dissolved is available, and the solvent in which both of them are dissolved is preferable. Specific examples of the solvent include ether solvents such as diethyl ether, tetrahydrofuran, 2-methyltetrahydrofuran, diisopropyl ether, 1,2-dimethoxyethane, diethylene glycol dimethyl ether (diglyme), triethylene glycol dimethyl ether (triglyme), tetraethylene glycol dimethyl ether (tetraglyme), cyclopentyl methyl ether, tert-butyl methyl ether, and 1,4-dioxane; and hydrocarbon solvents such as hexane, heptane, octane, benzene, toluene, and xylene, and the ether solvents are preferable. Among those, tetrahydrofuran, 1,2-dimethoxyethane, diglyme, triglyme, and tetraglyme are more preferable, and tetrahydrofuran is particularly preferable.

The amount of the solvent to be used is usually 0.1 to 200 ml, and preferably 0.5 to 100 ml, with respect to 1 mmol of the compound represented by the formula (II), the general formula (III), or the general formula (IV).

The reaction temperature for the compound represented by the formula (II), the general formula (III), or the general formula (IV), and the Grignard reagent is usually −78° C. to 80° C., and the reaction time is usually 5 seconds to 5 hours. In addition, the reaction is preferably carried out in an inert gas atmosphere such as an argon gas atmosphere and a nitrogen gas atmosphere, and more preferably in an argon gas atmosphere. In addition, the obtained reaction product may be concentrated, dried, and then washed with a solvent such as hexane, heptane, and diisopropyl ether, as desired.

Specifically, the compound represented by the general formula (I) according to the present invention is produced, for example, as follows. That is, in an argon gas atmosphere, the compound represented by the formula (II), the general formula (III), or the general formula (IV) is dissolved in a solvent such as tetrahydrofuran. Next, a tetrahydrofuran solution in which 0.1 to 27 equivalents of a Grignard reagent such as phenylmagnesium chloride is dissolved, or the like, with respect to moles of the compound represented by the formula (II), the general formula (III), or the general formula (IV), is added dropwise thereto and the mixture is reacted for 5 seconds to 5 hours while heating or cooling at a temperature in a range of −78° C. to 80° C., as desired. An operation for obtaining a solid, such as concentration and drying of a reaction solution, is carried out, as desired, and the obtained solid is washed with a solvent such as diisopropyl ether, and dried to obtain a compound represented by the general formula (I).

Lewis Acid

The Lewis acid according to the present invention is a Lewis acid which contains beryllium (Be), boron (B), aluminum (Al), silicon (Si), tin (Sn), titanium (Ti), chromium (Cr), iron (Fe), or cobalt (Co) as an element. Examples of the Lewis acid specifically include a beryllium compound such as beryllium (II) fluoride, beryllium (II) chloride, and beryllium (II) bromide; a boron compound such as boron (III) chloride, boron (III) fluoride, boron (III) bromide, triphenoxyborane, phenyldichloroborane, and triphenylborane; an aluminum compound such as aluminum (III) chloride, aluminum (III) bromide, aluminum (III) iodide, dimethyl aluminum chloride, di ethyl aluminum chloride, methylaluminum dichloride, ethylaluminum dichloride, trimethyl aluminum, trimethyl aluminum, and triphenyl aluminum; a silyl compound such as trimethylsilyl triflate, trimethylsilyl iodide, tert-butyldimethylsilyl triflate, and triisopropylsilyl triflate; a tin compound such as tin (IV) chloride, tin (IV) bromide, tin (II) chloride, and tin (II) triflate; a titanium compound such as titanium (IV) chloride, titanium (IV) fluoride, titanium (IV) bromide, and an titanium (IV) iodide; a chromium compound such as chromium (II) fluoride, chromium (III) fluoride, chromium (II) chloride, chromium (III) chloride, chromium (II) bromide, chromium (III) bromide, chromium (II) iodide, and chromium (III) iodide; an iron compound such as iron (II) fluoride, iron (II) chloride, iron (III) chloride, iron (II) bromide, and iron (II) iodide; or a cobalt compound such as cobalt (II) fluoride, cobalt (II) chloride, cobalt (II) bromide, and cobalt (II) iodide, the boron compound or an aluminum compound is preferable, and the aluminum compound is more preferable. Among such the compounds, boron (III) chloride, aluminum (III) chloride, methylaluminum dichloride, dimethylaluminum chloride, and triphenyl aluminum are preferable, and aluminum (III) chloride is particularly preferable.

Compound Represented by General Formula (A)

The compound represented by the general formula (A) according to the present invention is represented by the following general formula.

$$Mg[N(SO_2R^{10})_2]_2 \qquad (A)$$

(In the formula, four $R^{10}$'s each independently represent an alkyl group having 1 to 6 carbon atoms, a perfluoroalkyl group having 1 to 6 carbon atoms, a phenyl group, or a perfluorophenyl group.)

Examples of the alkyl group having 1 to 6 carbon atoms in $R^{10}$ of the general formula (A) include the same ones as the alkyl group having 1 to 6 carbon atoms in $R^1$ of the general formula (I), and preferred examples thereof are also the same.

The perfluoroalkyl group having 1 to 6 carbon atoms in $R^{10}$ of the general formula (A) may be linear, branched, or cyclic, and is preferably linear and branched, and more preferably linear. In addition, among the perfluoroalkyl groups having 1 to 6 carbon atoms, a perfluoroalkyl group having 1 to 4 carbon atoms is preferable, and a perfluoroalkyl group having 1 or 2 carbon atoms is more preferable. Specific examples of the perfluoroalkyl group include a trifluoromethyl group, a pentafluoroethyl group, a heptafluoro-n-propyl group, a heptafluoroisopropyl group, a perfluoro-n-butyl group, a perfluoroisobutyl group, a perfluoro-sec-butyl group, a perfluoro-tert-butyl group, a perfluorocyclobutyl group, a perfluoro-n-pentyl group, a perfluoroisopentyl group, a perfluoro-sec-pentyl group, a perfluoro-tert-pentyl group, a perfluoroneopentyl group, a perfluoro-2-methylbutyl group, a perfluoro-1,2-dimethylpropyl group, a perfluoro-1-ethylpropyl group, a perfluorocyclopentyl group, a perfluoro-n-hexyl group, a perfluoroisohexyl group, a perfluoro-sec-hexyl group, a perfluoro-tert-hexyl group, a perfluoro-2-methylpentyl group, a perfluoro-1,2-dimethylbutyl group, a perfluoro-2,3-dimethylbutyl group, a perfluoro-1-ethylbutyl group, and a perfluorocyclohexyl group, the trifluoromethyl group, the pentafluoroethyl group, the heptafluoro-n-propyl group, the heptafluoroisopropyl group, the perfluoro-n-butyl group, the perfluoroisobutyl group, the perfluoro-sec-butyl group, and the perfluoro-tert-butyl group are preferable, the trifluoromethyl group, the pentafluoroethyl group, the heptafluoro-n-propyl group, and the perfluoro-n-butyl group are more preferable, the trifluoromethyl group and the pentafluoroethyl group are still more preferable, and the trifluoromethyl group is particularly preferable.

Four $R^{10}$'s in the general formula (A) may be the same as or different from each other, but all of four $R^{10}$'s are preferably the same as each other.

As four $R^{10}$'s in the general formula (A), an alkyl group having 1 to 6 carbon atoms and a perfluoroalkyl group having 1 to 6 carbon atoms are preferable, and a perfluoroalkyl group having 1 to 6 carbon atoms is more preferable. Specific examples of four $R^{10}$'s include a methyl group, an ethyl group, an n-propyl group, an isopropyl group, an n-butyl group, an isobutyl group, a sec-butyl group, a tert-butyl group; a trifluoromethyl group, a pentafluoroethyl group, a heptafluoro-n-propyl group, a heptafluoroisopropyl group, a perfluoro-n-butyl group, a perfluoroisobutyl group, a perfluoro-sec-butyl group, and a perfluoro-tert-butyl group; a phenyl group; and a perfluorophenyl group, the methyl group, the ethyl group, the n-propyl group, the n-butyl group; the trifluoromethyl group, the pentafluoroethyl group, the heptafluoro-n-propyl group, and the perfluoro-n-butyl group are preferable, the trifluoromethyl group and the pentafluoroethyl group are more preferable, and the trifluoromethyl group is particularly preferable.

Specific examples of the compound represented by the general formula (A) include magnesium bis(alkanesulfonyl) imides having 2 to 12 carbon atoms, such as magnesium bis(methanesulfonyl)imide, magnesium bis(ethanesulfonyl) imide, magnesium bis(n-propanesulfonyl)imide, magnesium bis(isopropanesulfonyl)imide, magnesium bis(n-butanesulfonyl)imide, magnesium bis(isobutanesulfonyl) imide, magnesium bis(sec-butanesulfonyl)imide, magnesium bis(tert-butanesulfonyl)imide, magnesium bis (cyclobutanesulfonyl)imide, magnesium bis(n-pentanesulfonyl)imide, magnesium bis(isopentanesulfonyl)imide, magnesium bis(sec-pentanesulfonyl)imide, magnesium bis(tert-pentanesulfonyl)imide, magnesium bis(neopentanesulfonyl)imide, magnesium bis(2-methylbutanesulfonyl)imide, magnesium bis(1,2-dimethylpropanesulfonyl) imide, magnesium bis(1-ethylpropanesulfonyl)imide, magnesium bis(cyclopentanesulfonyl)imide, magnesium bis (n-hexanesulfonyl)imide, magnesium bis(isohexanesulfonyl)imide, magnesium bis(sec-hexanesulfonyl)imide, magnesium bis(tert-hexanesulfonyl)imide, magnesium bis (neohexanesulfonyl)imide, magnesium bis(2-methylpentanesulfonyl)imide, magnesium bis(1,2-dimethylbutanesulfonyl)imide, magnesium bis(2,3-dimethylbutanesulfonyl)imide, magnesium bis(1-ethylbutanesulfonyl)imide, and magnesium bis (cyclohexanesulfonyl)imide; magnesium bis (perfluoroalkanesulfonyl)imides having 2 to 12 carbon atoms, such as magnesium bis(trifluoromethanesulfonyl) imide, magnesium bis(pentafluoroethanesulfonyl)imide, magnesium bis(heptafluoro-n-propanesulfonyl)imide, magnesium bis(heptafluoroisopropanesulfonyl)imide, magnesium bis(perfluoro-n-butanesulfonyl)imide, magnesium bis (perfluoroisobutanesulfonyl)imide, magnesium bis (perfluoro-sec-butanesulfonyl)imide, magnesium bis (perfluoro-tert-butanesulfonyl)imide, magnesium bis (perfluorocyclobutanesulfonyl)imide, magnesium bis (perfluoro-n-pentanesulfonyl)imide, magnesium bis (perfluoroisopentanesulfonyl)imide, magnesium bis (perfluoro-sec-pentanesulfonyl)imide, magnesium bis (perfluoro-tert-pentanesulfonyl)imide, magnesium bis (perfluoroneopentanesulfonyl)imide, magnesium bis (perfluoro-2-methylbutanesulfonyl)imide, magnesium bis (perfluoro-1,2-dimethylpropanesulfonyl)imide, magnesium bis(perfluoro-1-ethylpropanesulfonyl)imide, magnesium bis (perfluorocyclopentanesulfonyl)imide, magnesium bis(perfluoro-n-hexanesulfonyl)imide, magnesium bis(perfluoroisohexanesulfonyl)imide, magnesium bis(perfluoro-sec-hexanesulfonyl)imide, magnesium bis(perfluoro-tert-hexanesulfonyl)imide, magnesium bis (perfluoroneohexanesulfonyl)imide, magnesium bis (perfluoro-2-methylpentanesulfonyl)imide, magnesium bis (perfluoro-1,2-dimethylbutanesulfonyl)imide, magnesium bis(perfluoro-2,3-dimethylbutanesulfonyl)imide, magnesium bis(perfluoro-1-ethylbutanesulfonyl)imide, and magnesium bis(perfluorocyclohexanesulfonyl)imide; magnesium bis(phenylsulfonyl)imide; and magnesium bis (perfluorophenylsulfonyl)imide.

Among the specific examples, the magnesium bis(alkanesulfonyl)imide having 2 to 12 carbon atoms and the magnesium bis(perfluoroalkanesulfonyl)imide having 2 to 12 carbon atoms are preferable, the magnesium bis(methanesulfonyl)imide, the magnesium bis(ethanesulfonyl)imide, the magnesium bis(n-propanesulfonyl)imide, and the magnesium bis(n-butanesulfonyl)imide; the magnesium bis(trifluoromethanesulfonyl)imide, the magnesium bis(pentafluoroethanesulfonyl)imide, the magnesium bis(heptafluoro-n-propanesulfonyl)imide, and the magnesium bis(perfluoro-n-butanesulfonyl)imide are more preferable, the magnesium bis(trifluoromethanesulfonyl)imide and the magnesium bis (pentafluoroethanesulfonyl)imide are still more preferable, and the magnesium bis(trifluoromethanesulfonyl)imide is particularly preferable.

Solvent

The solvent according to the present invention is preferably a solvent which is capable of dissolving the compound represented by the general formula (I) according to the present invention and/or the Lewis acid according to the present invention, or the compound represented by the general formula (A) according to the present invention. Examples of such a solvent include ether solvents, halogenated hydrocarbon solvents, carbonate solvents, nitrile solvents, and sulfone solvents, and the solvent may be a mixture of two or more of those solvents.

Examples of the ether solvents include diethyl ether, tetrahydrofuran, 2-methyltetrahydrofuran, diisopropyl ether, 1,2-dimethoxyethane, diethylene glycol dimethyl ether (diglyme), triethylene glycol dimethyl ether (triglyme), tetraethylene glycol dimethyl ether (tetraglyme), cyclopentyl methyl ether, tert-butyl methyl ether, and 1,4-dioxane; examples of the halogenated hydrocarbon solvents include dichloromethane, chloroform, carbon tetrachloride, and 1,2-dichloroethane; examples of the carbonate solvents include dimethyl carbonate, diethyl carbonate, ethyl methyl carbonate, and propylene carbonate; examples of the nitrile solvents include acetonitrile, propionitrile, butyronitrile, succinonitrile, pimelonitrile, and methoxypropionitrile; and examples of the sulfone solvents include sulfolane, dimethyl sulfone, ethyl methyl sulfone, methyl-n-propyl sulfone, methyl isopropyl sulfone, n-butyl-methyl sulfone, isobutyl methyl sulfone, sec-butyl methyl sulfone, tert-butyl methyl sulfone, diethyl sulfone, ethyl-n-propyl sulfone, ethyl isopropyl sulfone, n-butyl ethyl sulfone, isobutyl ethyl sulfone, sec-butyl ethyl sulfone, tert-butyl ethyl sulfone, di-n-propyl sulfone, diisopropyl sulfone, n-butyl-n-propyl sulfone, and di-n-butyl sulfone.

Among the specific examples, the ether solvents and the sulfone solvents are preferable, and the ether solvents are more preferable. Among these solvents, the tetrahydrofuran, the 1,2-dimethoxyethane, the diglyme, the triglyme, the tetraglyme, and the sulfolane are preferable, the tetrahydrofuran, the diglyme, the triglyme, and the tetraglyme are more preferable, and the tetrahydrofuran and the triglyme are particularly preferable.

Electrolytic Solution of Present Invention

The electrolytic solution of the present invention is a formed by mixing compound represented by the general formula (I) according to the present invention with the Lewis acid according to the present invention or the compound represented by the general formula (A) according to the present invention in the solvent according to the present invention. Among those, the electrolytic solution is preferably formed by mixing the compound represented by the general formula (I) according to the present invention with the Lewis acid according to the present invention in the solvent according to the present invention.

The concentration of the compound represented by the general formula (I) in the electrolytic solution of the present invention is usually 0.01 to 5 M (mol/L), preferably 0.05 to 3 M (mol/L), and more preferably 0.1 to 1 M (mol/L).

The amount of the Lewis acid or the compound represented by the general formula (A) to be used in the electrolytic solution of the present invention is usually 0.5 to 36 equivalents, and preferably 1 to 18 equivalents, with respect to moles of the compound represented by the general formula (I).

More specifically, the amount of the Lewis acid or the compound represented by the general formula (A) to be used in the electrolytic solution of the present invention is in proportion to the total number of the magnesium chloride oxy groups and the magnesium bromide oxy groups contained in a molecule of the compound represented by the general formula (I). That is, the amount of the Lewis acid or the compound represented by the general formula (A) to be used is usually 0.5 to 4 equivalents, and preferably 1 to 2 equivalents, with respect to moles of the compound represented by the general formula (I), per magnesium chloride oxy group or magnesium bromide oxy group contained in a molecule of the compound represented by the general formula (I). For example, the amount of the Lewis acid or the compound represented by the general formula (A) to be used is usually 1 to 8 equivalents, and preferably 2 to 4 equivalents, with respect to moles of the compound represented by the general formula (I) in a case where the total number of the magnesium chloride oxy groups and the magnesium bromide oxy groups contained in a molecule of the compound represented by the general formula (I) is 2, or is usually 1.5 to 12 equivalents, and preferably 3 to 6 equivalents, with respect to moles of the compound represented by the general formula (I) in a case where the total number of the magnesium chloride oxy groups and the magnesium bromide oxy groups contained in the molecule is 3.

The electrolytic solution of the present invention may contain additives such as a film-forming agent, an overcharge inhibitor, an oxygen scavenger, a dehydrating agent, and a flame retardant, which are usually used in this field, and additives having coordinating properties, such as a crown ether, in addition to the above components.

The electrolytic solution of the present invention can be used in a magnesium battery, and in a case where the electrolytic solution is used in a magnesium secondary battery, it exhibits high oxidative stability and can be used stably and repeatedly.

The electrolytic solution of the present invention is produced by dissolving (mixing) the compound represented by the general formula (I) according to the present invention with the Lewis acid according to the present invention or the compound represented by the general formula (A) according to the present invention in the solvent according to the present invention. More specifically, the electrolytic solution is produced by using 0.5 to 36 mol of the Lewis acid according to the present invention or the compound represented by the general formula (A) according to the present invention with respect to 1 mol of the compound represented by the general formula (I) according to the present invention, and adding and mixing those into the solvent according to the present invention to reach the concentration. In addition, during mixing, the components may be heated or cooled at a temperature in a range of −78° C. to 300° C., as desired, and is preferably heated or cooled at a temperature in a range of 0° C. to 150° C. In addition, filtration may be carried out, as desired, after mixing.

The electrolytic solution of the present invention may be any one that contains the compound represented by the general formula (I) according to the present invention, the Lewis acid according to the present invention or the compound represented by the general formula (A) according to the present invention, and the solvent according to the present invention, and for example, a ligand formed from the compound represented by the general formula (I) and the solvent is also contained in the present invention. That is, the electrolytic solution of the present invention includes not only an electrolytic solution formed by mixing the compound represented by the general formula (I), the Lewis acid or the compound represented by the general formula (A), and the solvent but also an electrolytic solution formed by mixing a ligand formed from the compound represented by the general formula (I) and the solvent, the Lewis acid or the compound represented by the general formula (A), and as desired, the solvent.

In a case where the compound represented by the general formula (I) forms a ligand, the amounts of the Lewis acid according to the present invention or the compound represented by the general formula (A) according to the present invention, and the solvent according to the present invention to be used may be appropriately adjusted depending on the amount (moles) of the compound represented by the general formula (I) constituting the ligand.

Electrochemical Device

The electrochemical device of the present invention has a positive electrode, a negative electrode, and the electrolytic solution of the present invention. Specific examples of the electrochemical device include a primary battery, a secondary battery, an air battery, and an electric double layer capacitor, and the secondary battery is preferable. In addition, in the present invention, as long as a reaction of magnesium is involved in a negative electrode, the electrochemical device is contained in a "magnesium battery" in the electrolytic solution of the present invention (electrolytic solution for a magnesium battery). The reaction of magnesium as mentioned in the present invention specifically means, for example, dissolution•precipitation of magnesium at an interface between the magnesium metal and the electrolytic solution, a reaction in which magnesium ions are intercalated in a carbon-based material, a reaction in which an element such as bismuth and magnesium are alloyed, and a reaction in which the magnesium ions are absorbed or desorbed onto a battery material such as titanium oxide at a low potential such as 1 V or less, for example.

The positive electrode in the electrochemical device of the present invention is not particularly limited as long as it contains magnesium or magnesium ions inside thereof, or on the surface and at the vicinity thereof. In addition, as long as the reaction of magnesium as described above is involved in the negative electrode, metal ions other than magnesium may be contained inside or on the surface and at the vicinity of the positive electrode by the addition of the metal ions other than magnesium.

Specific examples of the positive electrode in the electrochemical device of the present invention include electrodes containing cobalt, manganese, vanadium, aluminum, iron, silicon, phosphorus, nickel, molybdenum, titanium, tungsten, ruthenium, copper, chromium, lithium, sodium, potassium, rubidium, cesium, beryllium, calcium, strontium, barium, niobium, lanthanoid elements, carbon, sulfur, magnesium, platinum, hafnium, scandium, zirconium, osmium, iridium, gold, mercury, thallium, lead, tin, and antimony; oxides, sulfides, selenides, tellurides, cyanides, halides, borides, silicon oxides, phosphorus oxides, boron oxides, and manganese oxides thereof; and double salts thereof as an active material. Among these, the electrodes containing molybdenum; oxides, sulfides, selenides, tellurides, cyanides, halides, borides, silicon oxides, phosphorus oxides, boron oxides, and manganese oxides of molybdenum; or double salts thereof as an active material are preferable.

In addition, the active material may be configured with combination of a plurality of metals and a plurality of compounds, and may be doped with a metal such as magnesium and potassium, sulfur, boron, phosphorus, or the like, or may be a hydrate.

The active material may be any crystalline form of a tetragonal material, an orthorhombic form, a hexagonal form, and the like; and its crystal structure may form a layered structure, a rutile type structure, a spinel type structure, an olivine type structure, a Chevrel type structure, an amorphous structure, or a crystal structure other than the above structures. In addition, the crystal structure may change by a physical or chemical treatment or by insertion and desorption of magnesium ions, or may constitute a part, not the whole. In addition, the active material may have a structure in which the positions of peaks are changed in an X-ray crystal structure analysis by the change of the crystal structure, and may be treated as confirmed with XPS for the change.

Specific examples of an inorganic active materials among the active materials include active materials constituted with $Mo_6S_8$, $V_2O_5$, $MnO_2$, $Mn_2O_3$, $Mn_3O_4$, $RuO_2$, $TiO_2$, $Co_3O_4$, $MoO_3$, $Co_3O_4$, $CoO$, $CoO_2$, $WO_3$, $PbO_2$, $Pb_3O_4$, $NiFe(CN)_6$, $CuFe(CN)_6$, $Ni[Fe(CN)_6]_{0.7}\cdot 4.7H_2O$, $Cu[Fe(CN)_6]_{0.7}\cdot 3.6H_2O$, $MgMo_6S_8$, $MgVPO_4F$, $MgFePO_4F$, $MgMnPO_4F$, $MgFePO_4$, $Mg_{0.1}V_2O_5$, $MgNiO_2$, $MgCoO_2$, $MgCo_2O_4$, $TiNb_2O_7$, $Mg_{0.5}Hf_{0.5}Sc_{1.0}(MoO_4)_3$, $MgZrWO_4$, $MgFe_2O_4$, $MgMn_2O_4$, $MgNi_2O_4$, $MgCr_2O_4$, $MgCoSiO_4$, $MgFeSiO_4$, $MgNiSiO_4$, $MgMnSiO_4$, $MgNi_{0.9}Mn_{0.1}SiO_4$, $MgVSiO_4$, $MgCuSiO_4$, $Mg_{1.03}Mn_{0.97}SiO_4$, $MgMnNiO_4$, $MgMn_{1.15}Ni_{0.6}Ti_{0.25}O_4$, $Mg_{0.75}Fe_{0.25}Ca(SiO_3)_2$, $Mg_{0.59}Co_{0.41}CaSiO$, $Mg_{0.71}Fe_{1.29}(SiO_3)_2$, $Mg_{1.88}Fe_{0.12}(SiO_3)_2$, $MgAg_{0.5}Fe_{0.95}Nb_{0.05}O_4$, $Mg_2SiO_4$, $KMnO_4$, $Mg(MnO_4)_2$, $NiCl_2$, $CoCl_2$, $FeCl_2$, $CrCl_2$, $FeF_3$, $MnF_3$, $LaF_3$, $NiS$, $FeS$, $CuS$, $CoS$, $ZrS_2$, $WS_2$, $CoS_2$, $MoS_2$, $MnS_2$, $NbS_2$, $NbS_3$, $TiS_2$, $TiB_2$, $ZrB_2$, $MoB_2$, $VS_2$, $WSe_2$, $Cu_2Se$, $Mo_9Se_{11}$, $NiSSe$, $VBO_3$, $TiBO_3$, $MnBO_3$, $CoBO_3$, $V_{0.5}Fe_{0.5}BO_3$, $V_{0.5}Ti_{0.5}BO_3$, $V_{0.5}Ti_{0.3}Fe_{0.2}BO_3$, or $V_2O_5\cdot MgCl_2\cdot P_2O_5$; a salt of a metal cation such as $Fe^{2+}$, $Cu^{2+}$, $Ti^{2+}$, and $Cd^{2+}$ with a polysulfide; boron (B)-doped $Mg_2SiO_4$; a complex of $TiNb_2O_7$ and graphene; an active material having an amorphous structure, synthesized from $KMnO_4$ and hydrochloric acid; a carbon complex of $MoS_2$ and $V_2O_5$; $V_2O_5$ in the form of an aerogel; $Mn_3O_4$ in the form of a nanowire; $MnO_2$ containing water of crystallization; porous $Mn_3O_4$ nanoparticles; $TiS_2$ in the form of a nanotube; potassium-doped K-$\alpha MnO_2$; and Prussian blue analogs.

In addition, in the positive electrode in the electrochemical device of the present invention, for example, sulfur; an organic sulfur compound; a radical compound; an organic compound; a polymer compound; a sulfur-containing polymer compound; a radical polymer; a functional compound; a material forming an electric double layer such as layered carbon, porous carbon, or activated carbon; and the like may be contained as an active material capable of occluding and storing magnesium or magnesium ions. Such the materials may contain magnesium in the oxidized form or in the form in mixture with sulfur, phosphorus, boron, or the like. In addition, the materials may also be in the form as partially halogenated.

Among the active materials, specific examples of the organic active materials include Rubeanic acid, 2,5-dimercapto-1,3,4-thiadiazole (DMcT), trioxotriangulene, 2,2,6,6-tetramethyl-1-piperidinyloxy (TEMPO), 4-hydroxy-2,2,6,6-tetramethylpiperidinyloxy (4-hydroxy-TEMPO), dimethoxybenzoquinone (DMBQ), 9,10-anthraquinone, porphyrin, magnesium porphyrin, phthalocyanine, magnesium phthalocyanine, magnesium anthracene, polyaniline, a polyquinone derivative, a quinone-based polymer, poly(hydroquinoyl-benzoquinonyl sulfide), Carbyne polysulfide, poly-2,2'-dithiodianiline (PDTDA), poly(4-methacryloyloxy-2,2,6,6-tetramethylpiperidin-N-oxyl) (PTMA), poly (anthraquinonyl)sulfide, fullerene, S-BUMB18C6, S-UOEE, graphite fluoride, graphite fluoride mixed with copper, and graphene fluoride.

The particle size, the surface area, and the like of the above-mentioned organic and inorganic active materials may be any ones that are in a range typically used in this field, and are not particularly limited.

The negative electrode in the electrochemical device of the present invention is not particularly limited as long as it contains magnesium or magnesium ions inside thereof, or on the surface and at the vicinity thereof. Specific examples of the negative electrode in the electrochemical device of the present invention metallic magnesium enabling the dissolution•precipitation of magnesium, a magnesium alloy, a metal that can be alloyed with magnesium, a carbon-based material enabling the intercalation of magnesium or magnesium ions, a material capable of occluding•releasing magnesium ions at a low potential such as a potential equal to or lower than 1 V, and the like.

Moreover, the electrochemical device of the present invention may have a separator, in addition to the negative electrode, the positive electrode, and the electrolytic solution of the present invention. The separator may be any one which is capable of electrically insulating the positive electrode and the negative electrode and transmitting magnesium ions, and examples thereof include microporous polymers such as a porous polyolefin. Specific examples of the porous polyolefin include porous polyethylene alone, and a double layer formed by superposing porous polyethylene and porous polypropylene.

Compound Represented by the General Formula (I')

The compound represented by the general formula (I') according to the present invention is represented as below.

(I')

{In the formula, m represents 0 or 2, n represents 2 in a case of m=0 and represents 0 or 1 in a case of m=2, $X^1$ represents a chlorine atom or a bromine atom, two $R^1$'s each independently represent a magnesium chloride oxy group (—OMgCl); a magnesium bromide oxy group (—OMgBr); an alkyl group having 1 to 6 carbon atoms, which may have a halogeno group or an alkoxy group as a substituent; an alkoxy group having 1 to 6 carbon atoms; an aryl group having 6 to 10 carbon atoms, which may have a halogeno group, an alkyl group, a halogenoalkyl group, or an alkoxy group as a substituent; an aryloxy group having 6 to 10 carbon atoms, which may have a halogeno group, an alkyl group, a halogenoalkyl group, or an alkoxy group as a substituent; or a group represented by the following general formula (1), and two $R^1$'s may form the following general formula (2):

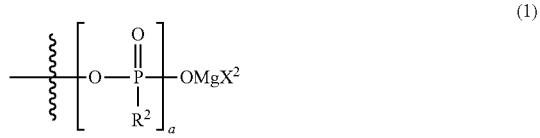
(1)

(in the formula, a represents an integer of 1 to 3, $X^2$ represents a chlorine atom or a bromine atom, and a pieces of $R^2$'s each independently represent a magnesium chloride oxy group (—OMgCl); a magnesium bromide oxy group (—OMgBr); an alkyl group having 1 to 6 carbon atoms, which may have a halogeno group or an alkoxy group as a substituent; an alkoxy group having 1 to 6 carbon atoms; an aryl group having 6 to 10 carbon atoms, which may have a halogeno group, an alkyl group, a halogenoalkyl group, or an alkoxy group as a substituent; or an aryloxy group having 6 to 10 carbon atoms, which may have a halogeno group, an alkyl group, a halogenoalkyl group, or an alkoxy group as a substituent); and

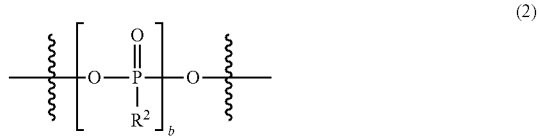
(2)

(in the formula, b represents an integer of 1 to 3, and $R^2$ is the same as described above), provided that (i) a case where m=2, n=0, and two $R^1$'s are the same unsubstituted aryl group having 6 to 10 carbon atoms, and (ii) a case where m=2, n=1, and two $R^1$'s are the same alkoxy group having 1 to 6 carbon atoms are excluded.}

$X^1$, $R^1$, m, and n in the general formula (I') are the same as $X^1$, $R^1$, m, and n in the general formula (I), respectively, and specific examples and preferred examples also include the same ones as the specific examples and the preferred examples of $X^1$, $R^1$, m, and n in the general formula (I).

In the general formula (I'), (i) a case where m=2, n=0, and two $R^1$'s are the same unsubstituted aryl group having 6 to 10 carbon atoms, and (ii) a case where m=2, n=1, and two $R^1$'s are the same alkoxy group having 1 to 6 carbon atoms, that is, the compounds represented by the following general formulae (I'-i) and (I'-ii) are excluded from the compound represented by the general formula (I') of the present invention.

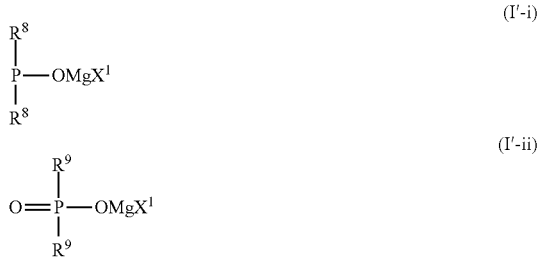
(I'-i)

(I'-ii)

(In the formula, two $R^8$'s represent the same unsubstituted aryl group having 6 to 10 carbon atoms, two $R^9$'s represent the same alkoxy group having 1 to 6 carbon atoms, and $X^1$ is the same as described above.)

Examples of the unsubstituted aryl group having 6 to 10 carbon atoms in $R^8$ include a phenyl group and a naphthyl group.

Examples of the alkoxy group having 1 to 6 carbon atoms in $R^9$ include the same ones as those for $R^1$ in the general formula (I).

Specific preferred examples of the general formula (I) include the following general formula (I'-I) or (I'-II).

(I'-I)

(In the formula, $R^{14}$ represents a magnesium chloride oxy group; an alkyl group having 1 to 6 carbon atoms; a phenyl group which may have a halogeno group, an alkyl group, a halogenoalkyl group, or an alkoxy group as a substituent; or a phenoxy group which may have a halogeno group, an alkyl group, a halogenoalkyl group, or an alkoxy group as a substituent, $R^{15}$ represents a magnesium chloride oxy group; an alkyl group having 1 to 6 carbon atoms; an alkoxy group having 1 to 6 carbon atoms; a phenyl group which may have a halogeno group, an alkyl group, a halogenoalkyl group, or an alkoxy group as a substituent; a phenoxy group which may have a halogeno group, an alkyl group, a halogenoalkyl group, or an alkoxy group as a substituent; or the group represented by the general formula (3), or $R^{14}$ and $R^{15}$ may form the general formula (4).)

(I'-II)

(In the formula, $R^{16}$ represents a magnesium chloride oxy group; an alkyl group having 1 to 6 carbon atoms; an alkoxy group having 1 to 6 carbon atoms; a phenyl group having a halogeno group, an alkyl group, a halogenoalkyl group, or an alkoxy group as a substituent; or a phenoxy group which may have a halogeno group, an alkyl group, a halogenoalkyl group, or an alkoxy group as a substituent, and $R^{17}$ represents a magnesium chloride oxy group; an alkyl group having 1 to 6 carbon atoms; an alkoxy group having 1 to 6 carbon atoms; a phenyl group which may have a halogeno group, an alkyl group, a halogenoalkyl group, or an alkoxy group as a substituent; or a phenoxy group which may have a halogeno group, an alkyl group, a halogenoalkyl group, or an alkoxy group as a substituent.)

Examples of the alkyl group having 1 to 6 carbon atoms; the alkoxy group having 1 to 6 carbon atoms; the phenyl group which may have a halogeno group, an alkyl group, a halogenoalkyl group, or an alkoxy group as a substituent; and the phenoxy group which may have a halogeno group, an alkyl group, a halogenoalkyl group, or an alkoxy group as a substituent in $R^{14}$ to $R^{17}$ include the same ones as those for $R^3$ in the general formula (3), and preferred examples thereof are also the same.

Examples of the halogeno group, the alkyl group, the halogenoalkyl group, and the alkoxy group as a substituent of the phenyl group in $R^{16}$ include the same examples of the substituent of the aryl group having 6 to 10 carbon atoms in $R^1$ of the general formula (I), and preferred examples thereof are also the same.

The phenyl group having a halogeno group, an alkyl group, a halogenoalkyl group, or an alkoxy group as a substituent in $R^{16}$ usually has 1 to 5 substituents, preferably has 1 or 2 substituents, and more preferably has one substituent. The phenyl group may have a substituent at any position of an ortho-position, a meta-position, and a para-position, and preferably has a substituent at a para-position.

As the phenyl group having a halogeno group, an alkyl group, a halogenoalkyl group, or an alkoxy group as a substituent in $R^{16}$ of the general formula (I'-II), a phenyl group having an alkyl group or an alkoxy group as a substituent is preferable, and a phenyl group having an alkoxy group as a substituent is more preferable.

Specific examples of the phenyl group having a halogeno group, an alkyl group, a halogenoalkyl group, or an alkoxy group as a substituent in $R^{16}$ of the general formula (I'-II) include a fluorophenyl group and a perfluorophenyl group; and a methylphenyl group, an ethylphenyl group, an n-propylphenyl group, an isopropylphenyl group, an n-butylphenyl group, an isobutylphenyl group, a sec-butylphenyl group, and a tert-butylphenyl group; a trifluoromethylphenyl group, a pentafluoroethylphenyl group, a heptafluoro-n-propylphenyl group, and a perfluoro-n-butylphenyl group; a methoxyphenyl group, an ethoxyphenyl group, an n-propoxyphenyl group, an isopropoxyphenyl group, an n-butoxyphenyl group, an isobutoxyphenyl group, a sec-butoxyphenyl group, and a tert-butoxyphenyl group.

Among the specific examples, the methylphenyl group, the ethylphenyl group, the n-propylphenyl group, the isopropylphenyl group, the n-butylphenyl group, the isobutylphenyl group, the sec-butylphenyl group, and the tert-butylphenyl group; the methoxyphenyl group, the ethoxyphenyl group, the n-propoxyphenyl group, the isopropoxyphenyl group, the n-butoxyphenyl group, the isobutoxyphenyl group, the sec-butoxyphenyl group, and the tert-butoxyphenyl group are preferable, and the methylphenyl group, the ethylphenyl group, the n-propylphenyl group, the n-butylphenyl group, the methoxyphenyl group, the ethoxyphenyl group, the n-propoxyphenyl group, and the n-butoxyphenyl group are more preferable.

As $R^{14}$ in the general formula (I'-I), a magnesium chloride oxy group; an alkyl group having 1 to 6 carbon atoms; a phenyl group which may have an alkyl group or an alkoxy group as a substituent; a phenoxy group which may have an alkyl group or an alkoxy group as a substituent; and the general formula (4) formed by $R^{14}$ and $R^{15}$ are preferable, the magnesium chloride oxy group; the alkyl group having 1 to 6 carbon atoms; the phenyl group which may have an alkoxy group as a substituent; the phenoxy group; and the formula (6) formed by $R^{14}$ and $R^{15}$ are more preferable, and the magnesium chloride oxy group; the alkyl group having 1 to 4 carbon atoms; the phenyl group which may have an alkoxy group as a substituent; and the phenoxy group are particularly preferable.

Specific examples of $R^{14}$ include a magnesium chloride oxy group, a methyl group, an ethyl group, an n-propyl group, an n-butyl group, a phenyl group, a methylphenyl group, an ethylphenyl group, an n-propylphenyl group, an n-butylphenyl group, a methoxyphenyl group, an ethoxyphenyl group, an n-propoxyphenyl group, an n-butoxyphenyl group, a phenoxy group, a methylphenoxy group, an ethylphenoxy group, an n-propylphenoxy group, an n-butylphenoxy group, a methoxyphenoxy group, an ethoxyphenoxy group, an n-propoxyphenoxy group, an n-butoxyphenoxy group, and the formula (6) formed by $R^{14}$ and $R^{15}$, the magnesium chloride oxy group, the methyl group, the ethyl group, the n-propyl group, the n-butyl group, the phenyl group, the methoxyphenyl group, the ethoxyphenyl group, the n-propoxyphenyl group, the n-butoxyphenyl group, the phenoxy group, and the formula (6) formed by $R^{14}$ and $R^{15}$ are preferable, the magnesium chloride oxy group, the methyl group, the ethyl group, the phenyl group, the methoxyphenyl group, the ethoxyphenyl group, and the phenoxy group are more preferable, and the magnesium chloride oxy group, the methyl group, the phenyl group, the methoxyphenyl group, and the phenoxy group are particularly preferable.

As $R^{15}$ in the general formula (I'-I), a magnesium chloride oxy group; an alkyl group having 1 to 6 carbon atoms; an alkoxy group having 1 to 6 carbon atoms; a phenyl group which may have an alkyl group or an alkoxy group as a substituent; a phenoxy group which may have an alkyl group or an alkoxy group as a substituent; the group represented by the general formula (3); and the general formula (4) formed by $R^{14}$ and $R^{15}$ are preferable, the magnesium chloride oxy group; the alkyl group having 1 to 6 carbon atoms; the alkoxy group having 1 to 6 carbon atoms; the phenyl group which may have an alkoxy group as a substituent; the phenoxy group; the group represented by the formula (5); and the formula (6) formed by $R^{14}$ and $R^{15}$ are more preferable, and the magnesium chloride oxy group; the alkyl group having 1 to 4 carbon atoms; the phenyl group which may have an alkoxy group as a substituent; the phenoxy group; and the group represented by the formula (5) are particularly preferable.

Specific examples of IC include a magnesium chloride oxy group, a methyl group, an ethyl group, an n-propyl group, an n-butyl group, a methoxy group, an ethoxy group, an n-propoxy group, an n-butoxy group, a phenyl group, a methylphenyl group, an ethylphenyl group, an n-propylphenyl group, an n-butylphenyl group, a methoxyphenyl group, an ethoxyphenyl group, an n-propoxyphenyl group, an n-butoxyphenyl group, a phenoxy group, a methylphenoxy group, an ethylphenoxy group, an n-propylphenoxy group, an n-butylphenoxy group, a methoxyphenoxy group, an ethoxyphenoxy group, an n-propoxyphenoxy group, an n-butoxyphenoxy group, the group represented by the formula (5), and the formula (6) formed by $R^{14}$ and $R^{15}$, the magnesium chloride oxy group, the methyl group, the ethyl group, the n-propyl group, the n-butyl group, the methoxy group, the ethoxy group, the phenyl group, the methoxyphenyl group, the ethoxyphenyl group, the n-propoxyphenyl group, the n-butoxyphenyl group, the phenoxy group, the group represented by the formula (5), and the formula (6) formed by $R^{14}$ and $R^{15}$ are preferable, the magnesium chloride oxy group, the methyl group, the ethyl group, the phenyl group, the methoxyphenyl group, the ethoxyphenyl group, the phenoxy group, and the group represented by the formula (5) are more preferable, and the magnesium chloride oxy group, the methyl group, the phenyl group, the methoxyphenyl group, the phenoxy group, and the group represented by the formula (5) are particularly preferable.

As a combination of $R^{14}$ and $R^{15}$ in the general formula (I'-I), combinations 1 to 18 described in Table 5 are preferable, combinations 1 to 4, 6, 7, 10 to 12, 14, 15, and 18 are more preferable, combinations 1, 2, 4, 6, 7, 10 to 12, 14, and 15 are still more preferable, and combinations 1, 2, 4, 7, 10, 12, 14, and 15 are particularly preferable.

TABLE 5

| | $R^{14}$ | $R^{15}$ |
|---|---|---|
| 1 | Magnesium chloride oxy group | Magnesium chloride oxy group |
| 2 | Magnesium chloride oxy group | Alkyl group having 1 to 6 carbon atoms |
| 3 | Magnesium chloride oxy group | Alkoxy group having 1 to 6 carbon atoms |
| 4 | Magnesium chloride oxy group | Phenyl group |
| 5 | Magnesium chloride oxy group | Phenyl group having alkyl group as substituent |
| 6 | Magnesium chloride oxy group | Phenyl group having alkoxy group as substituent |
| 7 | Magnesium chloride oxy group | Phenoxy group |
| 8 | Magnesium chloride oxy group | Phenoxy group having alkyl group as substituent |
| 9 | Magnesium chloride oxy group | Phenoxy group having alkoxy group as substituent |
| 10 | Magnesium chloride oxy group | Group represented by general formula (3) |
| 11 | Same, alkyl group having 1 to 6 carbon atoms | |
| 12 | Phenyl group | Phenyl group |
| 13 | Same, phenyl group having alkyl group as substituent | |
| 14 | Same, phenyl group having alkoxy group as substituent | |
| 15 | Phenoxy group | Phenoxy group |
| 16 | Same, phenoxy group having alkyl group as substituent | |
| 17 | Same, phenoxy group having alkoxy group as substituent | |
| 18 | General formula (4) | |

Specific preferred examples of the compound represented by the general formula (I'-I) include the following magnesium chloride compounds.

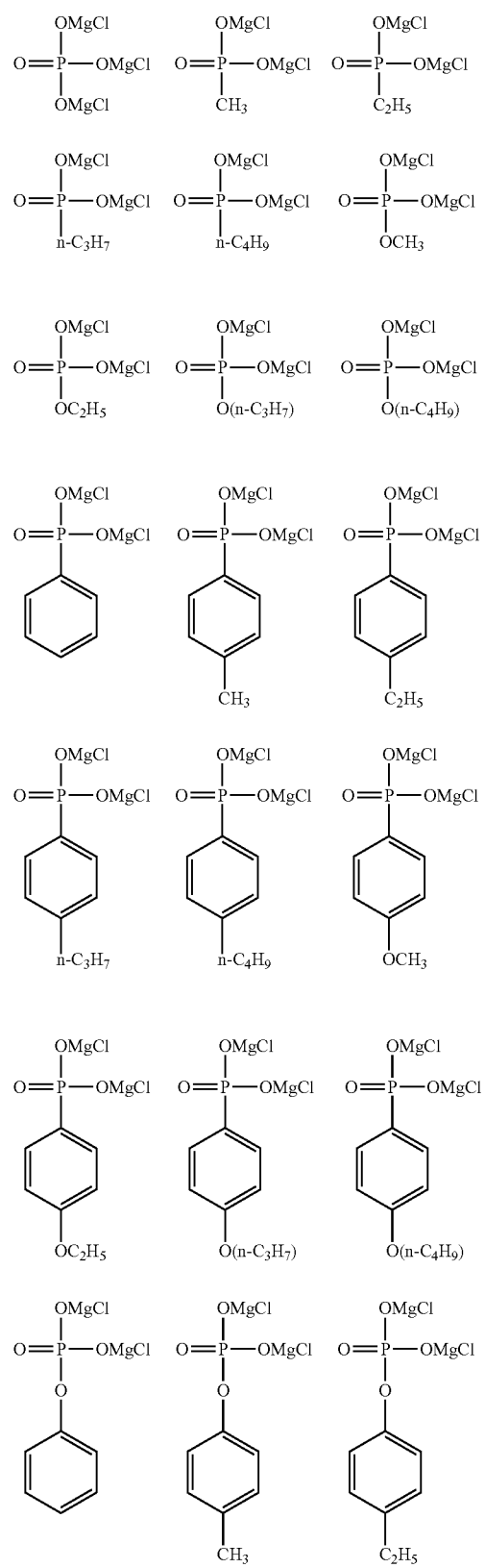

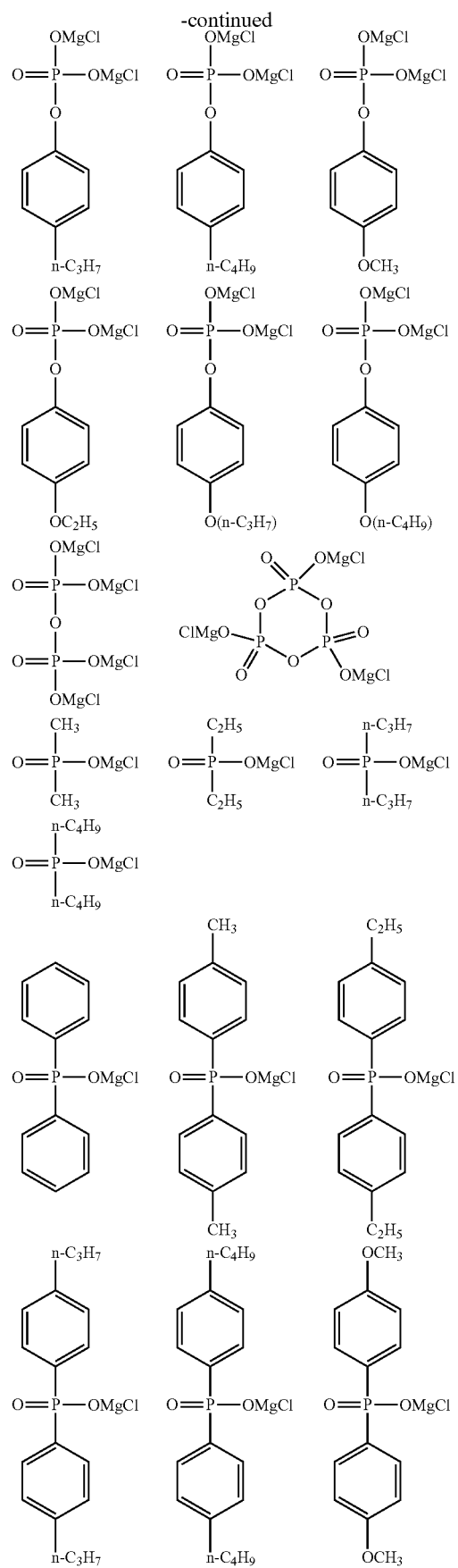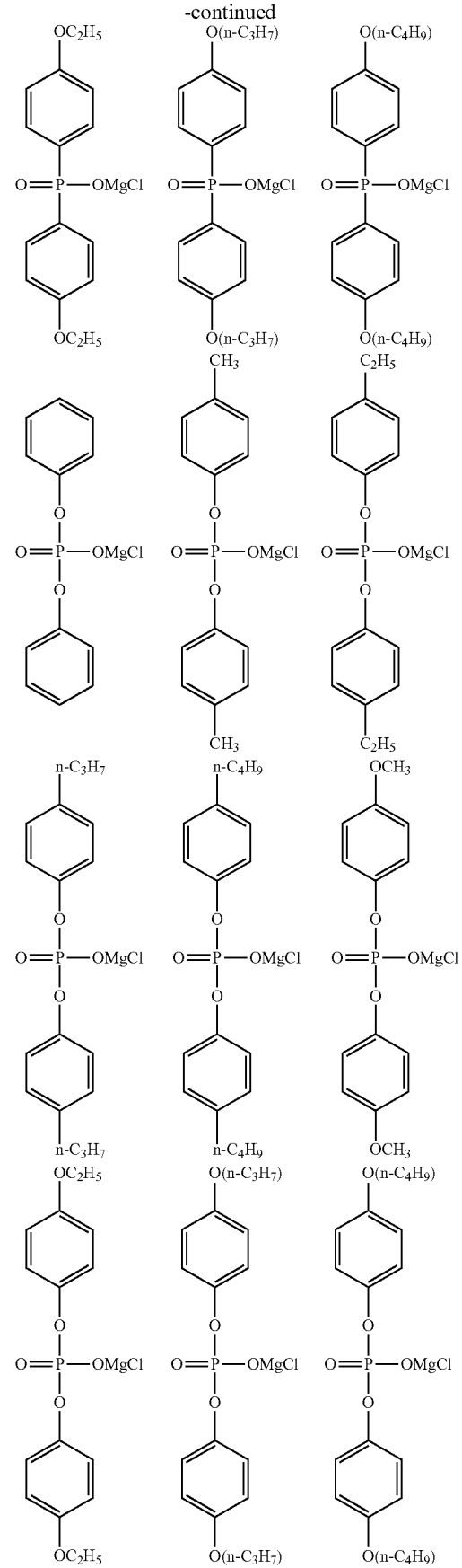

Among the specific preferred examples, the following ones are more preferable.

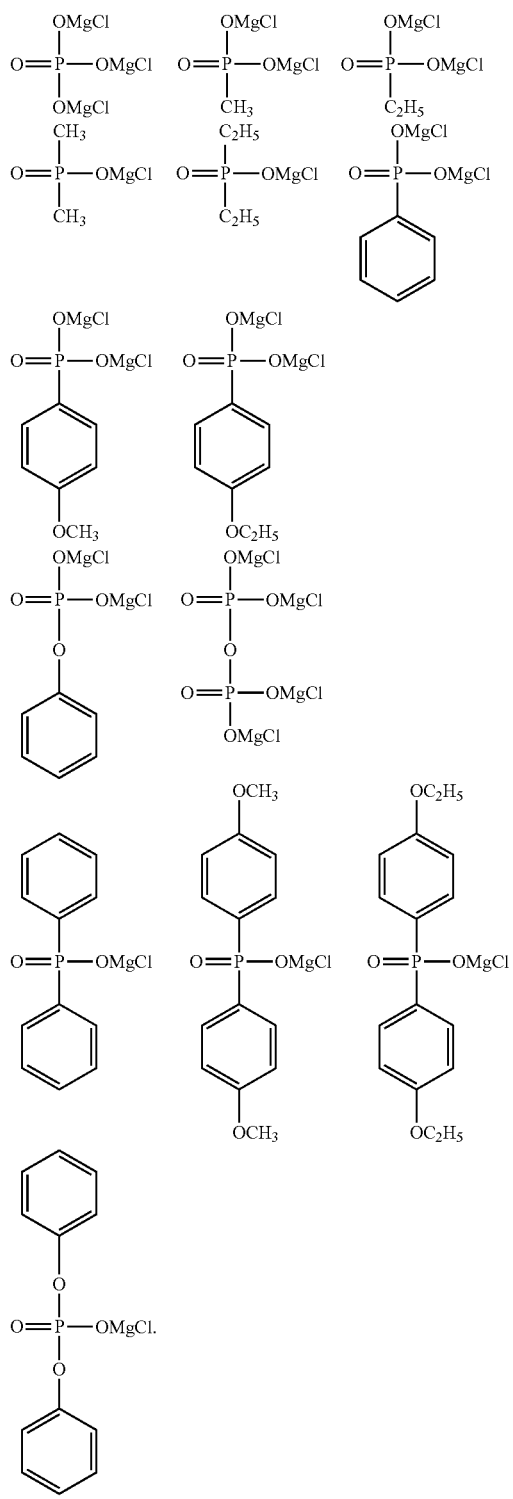

As $R^{16}$ in the general formula (I'-II), a magnesium chloride oxy group; an alkyl group having 1 to 6 carbon atoms; an alkoxy group having 1 to 6 carbon atoms; a phenyl group having an alkyl group or an alkoxy group as a substituent; and a phenoxy group which may have an alkyl group or an alkoxy group as a substituent are preferable, a magnesium chloride oxy group; an alkyl group having 1 to 6 carbon atoms; an alkoxy group having 1 to 6 carbon atoms; phenyl group having an alkoxy group as a substituent; and a phenoxy group are more preferable, a magnesium chloride oxy group; an alkyl group having 1 to 4 carbon atoms; phenyl group having an alkoxy group as a substituent; and a phenoxy group are particularly preferable.

Specific examples of $R^{16}$ include a magnesium chloride oxy group, a methyl group, an ethyl group, an n-propyl group, an n-butyl group, a methoxy group, an ethoxy group, an n-propoxy group, an n-butoxy group, a methylphenyl group, an ethylphenyl group, an n-propylphenyl group, an n-butylphenyl group, a methoxyphenyl group, an ethoxyphenyl group, an n-propoxyphenyl group, an n-butoxyphenyl group, a phenoxy group, a methylphenoxy group, an ethylphenoxy group, an n-propylphenoxy group, an n-butylphenoxy group, a methoxyphenoxy group, an ethoxyphenoxy group, an n-propoxyphenoxy group, and an n-butoxyphenoxy group, the magnesium chloride oxy group, the methyl group, the ethyl group, the n-propyl group, the n-butyl group, the methoxy group, the ethoxy group, the methoxyphenyl group, the ethoxyphenyl group, the n-propoxyphenyl group, the n-butoxyphenyl group, and the phenoxy group are preferable, the magnesium chloride oxy group, the methyl group, the ethyl group, the methoxyphenyl group, the ethoxyphenyl group, and the phenoxy group are more preferable, and the magnesium chloride oxy group, and the phenoxy group are particularly preferable.

As $R^{17}$ in the general formula (I'-II), a magnesium chloride oxy group; an alkyl group having 1 to 6 carbon atoms; an alkoxy group having 1 to 6 carbon atoms; a phenyl group which may have an alkyl group or an alkoxy group as a substituent; and a phenoxy group which may have an alkyl group or an alkoxy group as a substituent are preferable, a magnesium chloride oxy group; an alkyl group having 1 to 6 carbon atoms; an alkoxy group having 1 to 6 carbon atoms; a phenyl group which may have an alkoxy group as a substituent; and a phenoxy group are more preferable, and a magnesium chloride oxy group; an alkyl group having 1 to 4 carbon atoms; a phenyl group which may have an alkoxy group as a substituent; and a phenoxy group are particularly preferable.

Specific examples of $R^{17}$ include a magnesium chloride oxy group, a methyl group, an ethyl group, an n-propyl group, an n-butyl group, a methoxy group, an ethoxy group, an n-propoxy group, an n-butoxy group, a phenyl group, a methylphenyl group, an ethylphenyl group, an n-propylphenyl group, an n-butylphenyl group, a methoxyphenyl group, an ethoxyphenyl group, an n-propoxyphenyl group, an n-butoxyphenyl group, a phenoxy group, a methylphenoxy group, an ethylphenoxy group, an n-propylphenoxy group, an n-butylphenoxy group, a methoxyphenoxy group, an ethoxyphenoxy group, an n-propoxyphenoxy group, and an n-butoxyphenoxy group, the magnesium chloride oxy group, the methyl group, the ethyl group, the n-propyl group, the n-butyl group, the methoxy group, the ethoxy group, the phenyl group, the methoxyphenyl group, the ethoxyphenyl group, the n-propoxyphenyl group, the n-butoxyphenyl group, and the phenoxy group are preferable, the magnesium chloride oxy group, the methyl group, the ethyl group, the phenyl group, the methoxyphenyl group, the ethoxyphenyl group, and the phenoxy group are more preferable, and the magnesium chloride oxy group, the phenyl group, and the phenoxy group are particularly preferable.

As a combination of $R^{16}$ and $R^{17}$ in the general formula (I'-II), combinations 1 to 16 described in Table 6 are preferable, combinations 1 to 4, 6, 7, 10, 11, 13, and 14 are more preferable, combinations 1, 2, 4, 6, 7, 10, 13, and 14 are still more preferable, combinations 1, 2, 4, 7, 10, and 14 are even still more preferable, and combinations 1, 4, and 14 are particularly preferable.

TABLE 6

| | $R^{16}$ | $R^{17}$ |
|---|---|---|
| 1 | Magnesium chloride oxy group | Magnesium chloride oxy group |
| 2 | Magnesium chloride oxy group | Alkyl group having 1 to 6 carbon atoms |
| 3 | Magnesium chloride oxy group | Alkoxy group having 1 to 6 carbon atoms |
| 4 | Magnesium chloride oxy group | Phenyl group |
| 5 | Magnesium chloride oxy group | Phenyl group having alkyl group as substituent |
| 6 | Magnesium chloride oxy group | Phenyl group having alkoxy group as substituent |
| 7 | Magnesium chloride oxy group | Phenoxy group |
| 8 | Magnesium chloride oxy group | Phenoxy group having alkyl group as substituent |
| 9 | Magnesium chloride oxy group | Phenoxy group having alkoxy group as substituent |
| 10 | Same, | alkyl group having 1 to 6 carbon atoms |
| 11 | Same, | alkoxy group having 1 to 6 carbon atoms |
| 12 | Same, | phenyl group having alkyl group as substituent |
| 13 | Same, | phenyl group having alkoxy group as substituent |
| 14 | Phenoxy group | Phenoxy group |
| 15 | Same, | phenoxy group having alkyl group as substituent |
| 16 | Same, | phenoxy group having alkoxy group as substituent |

Specific preferred examples of the compound represented by the general formula (I'-II) include the following magnesium chloride compounds.

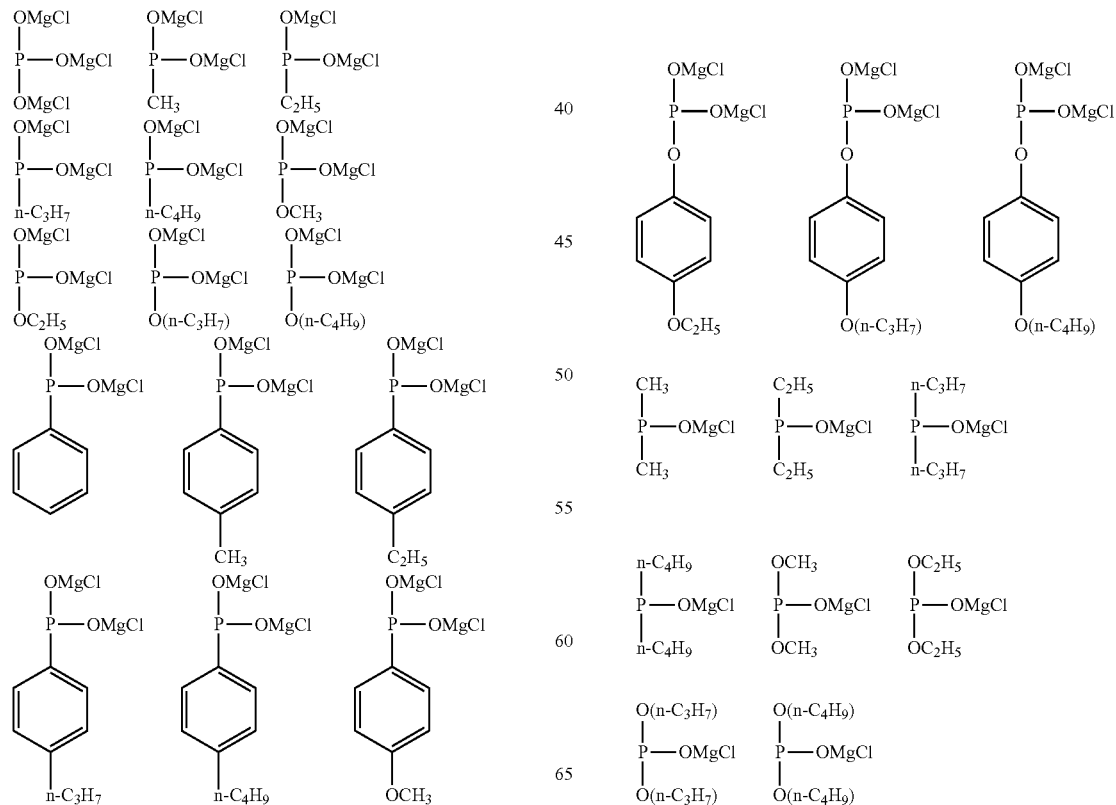
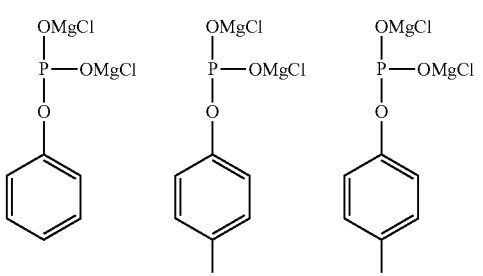
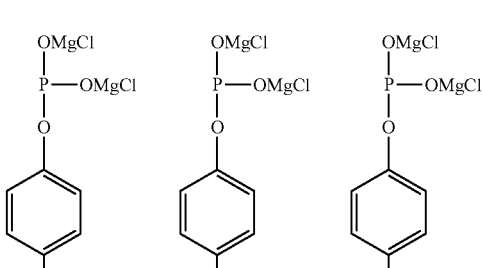
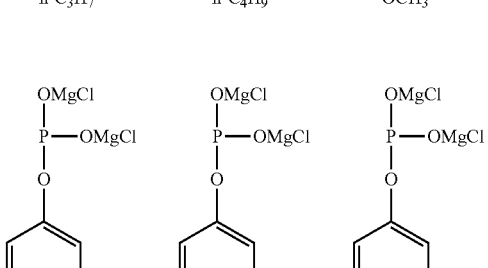
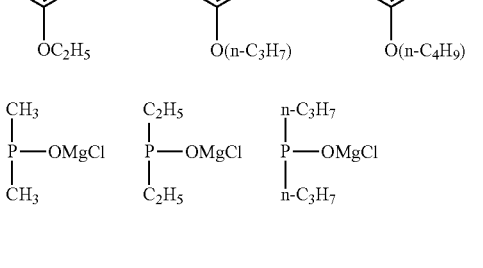
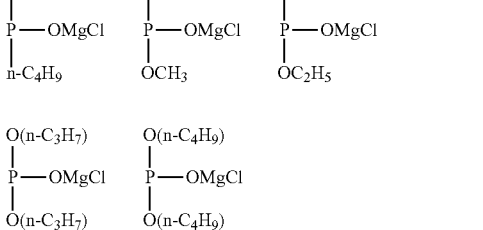

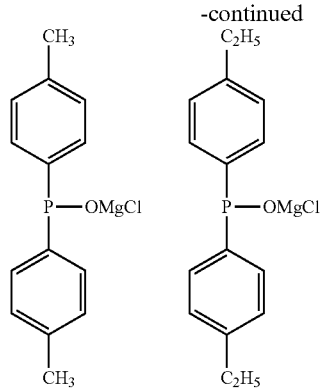
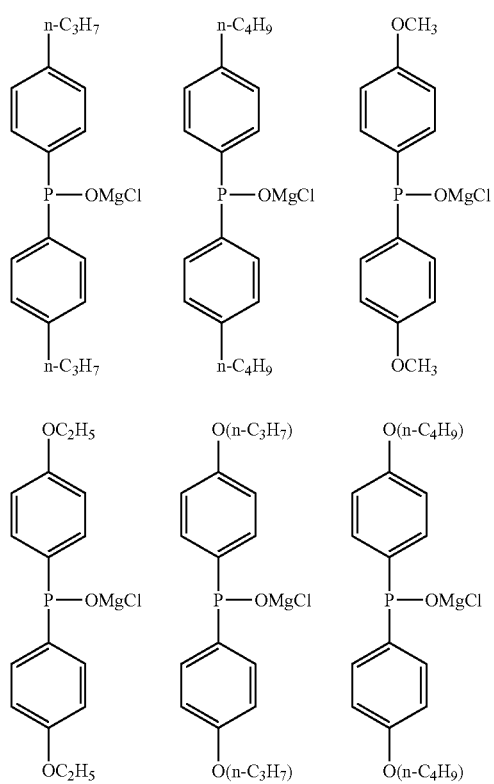
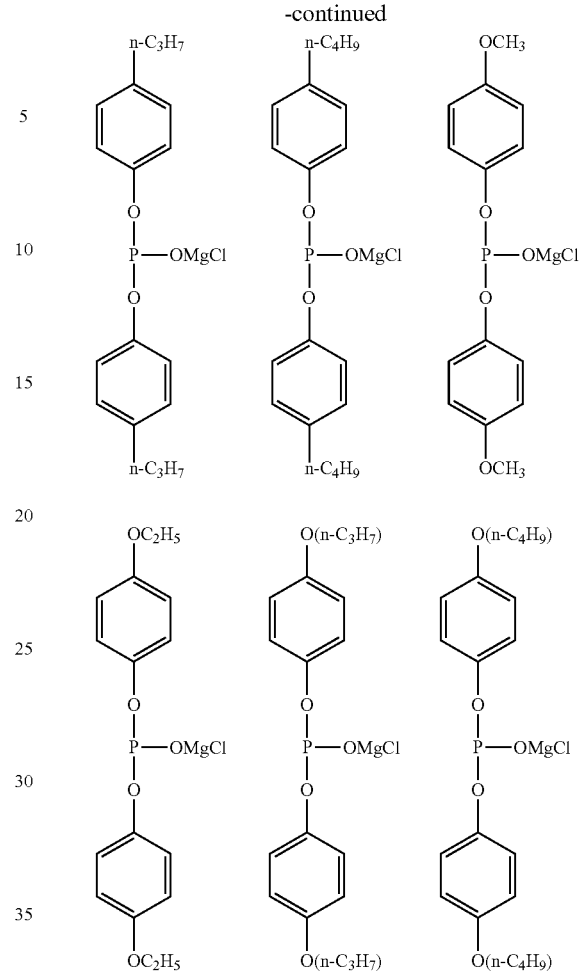
Among the specific preferred examples, the following ones are more preferable.
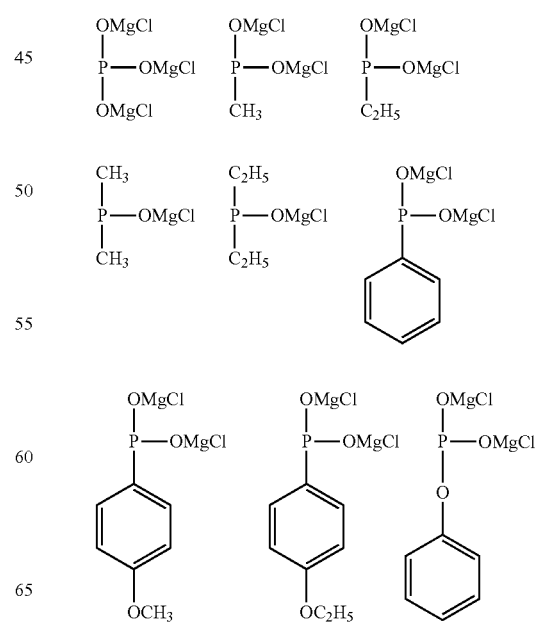

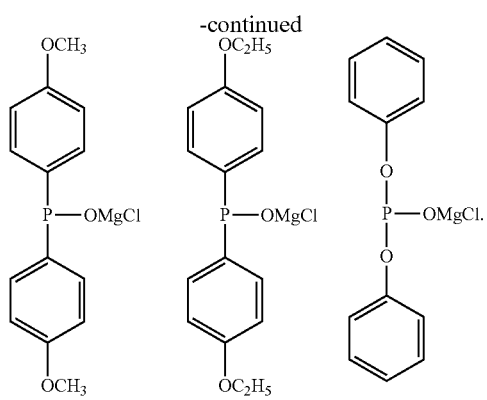

Among the specific preferred examples of the compounds represented by the general formulae (I'-I) and (I'-II), the following ones are particularly preferable.

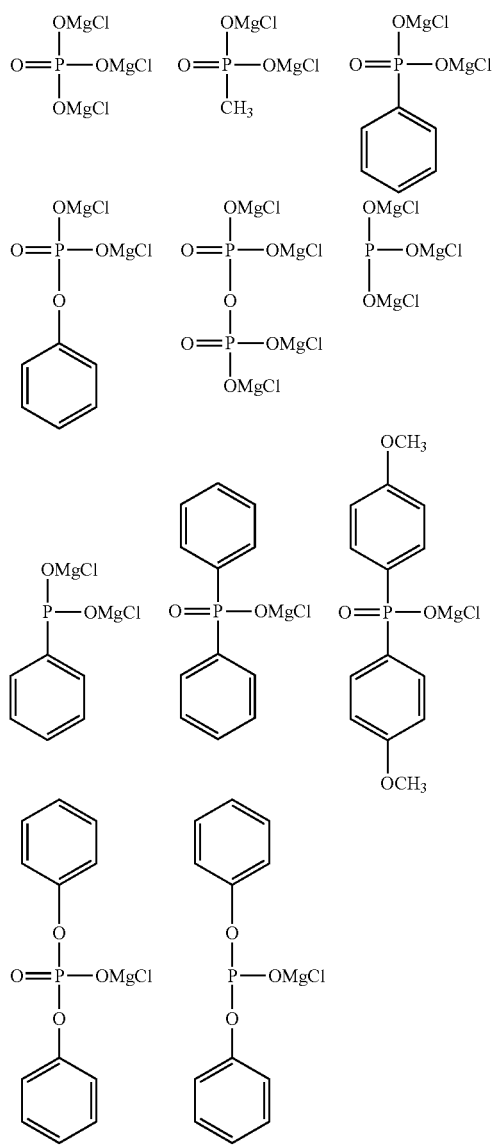

The compound represented by the general formula (I') may form a ligand, and for example, the compound represented by the general formula (I') may form a ligand together with the solvent according to the present invention. Specifically, in a case where the compound represented by the general formula (I') forms a ligand together with THF, it is presumed that a ligand as below is formed.

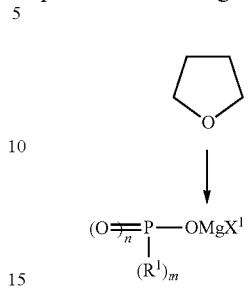

(In the formula, $R^1$, $X^1$, m, and n are the same as described above.)

In addition, the compound represented by the general formula (I') may form an aggregate in which a plurality of ligands are associated, and for example, in a case where two ligands are associated to form an aggregate, it is presumed to follow the below.

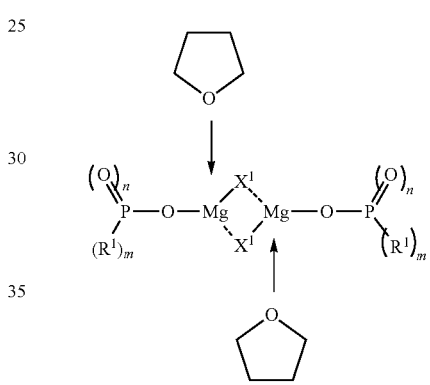

(In the formula, $R^1$, $X^1$, m, and n are the same as described above.)

Method for Producing Compound Represented by General Formula (I')

The compound represented by the general formula (I') according to the present invention may be produced in accordance with the method described in [Method for Producing Compound Represented by the general formula (I')].

Hereinafter, the present invention will be more specifically described with reference to Examples and Comparative Examples, but the present invention is not limited thereto.

EXAMPLES

Example 1 Preparation of Electrolytic Solution 1

(1) Synthesis of Magnesium Salt

In an argon gas atmosphere, ethylmagnesium chloride (EtMgCl) solution in THF (manufactured by Tokyo Chemical Industry Co., Ltd., 2M) 30 ml (60 mmol) was added dropwise to a solution obtained by dissolving 1.96 g (20 mmol) of orthophosphoric acid (manufactured by Tokyo Chemical Industry Co., Ltd.) in 20 ml of tetrahydrofuran (THF) (manufactured by Wako Pure Chemical Industries, Ltd.) at 0° C. or lower, followed by stirring for 1 hour. The reaction solution was concentrated and 50 ml of diisopropyl ether (IPE) (manufactured by Wako Pure Chemical Industries, Ltd.) was poured thereinto to produce powder. The powder was collected by filtration and dried under reduced pressure to obtain a orthophosphoric acid tris(magnesium chloride) salt (P(O)(OMgCl)$_3$).

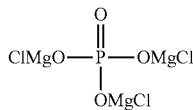

In the $^1$H-NMR measurement of the obtained compound, a peak derived from the reactant was not observed.

The results of the $^1$H-NMR measurement and the IR measurement of orthophosphoric acid are shown below.

$^1$H-NMR (400 MHz, DMSO-d6) δ (ppm): 8.66 (brs, 3H, OH)

IR (ATR): $v_{OH}$=2749

It was confirmed that the obtained compound had a structure different from that of orthophosphoric acid by the $^1$H-NMR measurement. In addition, it was confirmed that the OH bond detected in orthophosphoric acid has disappeared in the obtained compound by the IR measurement.

In addition, it was confirmed that the molar ratio of magnesium to phosphorus contained in the obtained compound was Mg:P=3:1 by a high-frequency inductively-coupled plasma atomic emission spectroscopy (ICP-AES) measurement. PS3520UVDDII (manufactured by Hitachi High-Tech Science Corporation) was used in the ICP-AES measurement.

(2) Preparation of Electrolytic Solution

In an argon gas atmosphere, 0.83 g (3 mmol) of the orthophosphoric acid tris(magnesium chloride)salt (P(O)(OMgCl)$_3$) obtained in (1) was added to 12 ml of triethylene glycol dimethyl ether (triglyme) (manufactured by Wako Pure Chemical Industries, Ltd.). After heating at 45° C. under stirring, 1.20 g (9 mmol) of aluminum chloride (AlCl$_3$) (manufactured by Wako Pure Chemical Industries, Ltd.) was added to the mixture. After stirring at 60° C. for 1 hour, the mixture was cooled to room temperature and filtered to obtain an electrolytic solution 1 [orthophosphoric acid tris(magnesium chloride) salt-aluminum chloride/triglyme solution].

Example 2 Preparation of Electrolytic Solution 2

In an argon gas atmosphere, 0.27 g (1 mmol) of the obtained orthophosphoric acid tris(magnesium chloride) salt (P(O)(OMgCl)$_3$) in (1) of Example 1 was added to 14 ml of triglyme (manufactured by Wako Pure Chemical Industries, Ltd.). After heating at 45° C. under stirring, 3.51 g (6 mmol) of magnesium bis(trifluoromethanesulfonyl)imide (Mg(TFSI)$_2$) (manufactured by Kishida Chemical Co., Ltd.) was added to the mixture. After stirring at 120° C. for 1 hour, the mixture was cooled to room temperature and filtered to obtain an electrolytic solution 2 [orthophosphoric acid tris(magnesium chloride) salt-magnesium bis(trifluoromethanesulfonyl)imide/triglyme solution].

Example 3 Preparation of Electrolytic Solution 3

(1) Synthesis of Magnesium Salt

In an argon gas atmosphere, n-butylmagnesium chloride (n-BuMgCl) solution in THF (manufactured by Tokyo Chemical Industry Co., Ltd., 2M) 20 ml (40 mmol) was added dropwise to a solution obtained by dissolving 3.16 g (20 mmol) of phenylphosphonic acid (manufactured by Wako Pure Chemical Industries, Ltd.) in 20 ml of THF (manufactured by Wako Pure Chemical Industries, Ltd.) at 0° C. or lower, followed by stirring for 3 hours. The reaction solution was concentrated and 30 ml of IPE (manufactured by Wako Pure Chemical Industries, Ltd.) was poured thereinto to produce powder. The powder was collected by filtration and dried under reduced pressure to obtain a phenylphosphonic acid bis(magnesium chloride) salt (PhP(O)(OMgCl)$_2$).

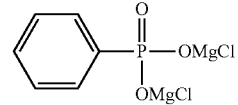

The results of the $^1$H-NMR measurement of the obtained compound are shown below.

$^1$H-NMR (400 MHz, DMSO-d6) δ (ppm): 6.50-8.30 (m, 5H)

The results of the $^1$H-NMR measurement and the IR measurement of phenylphosphonic acid are shown below.

$^1$H-NMR (400 MHz, DMSO-d6) δ (ppm): 7.35-7.75 (m, 5H, Ar), 10.98 (brs, 2H, OH)

IR (ATR): $v_{OH}$=2668

It was confirmed that the obtained compound had a structure different from that of phenylphosphonic acid by the $^1$H-NMR measurement. In addition, it was confirmed that the OH bond detected in phenylphosphonic acid has disappeared in the obtained compound by the IR measurement.

It was confirmed that the molar ratio of magnesium to phosphorus contained in the obtained compound was Mg:P=2:1 by the ICP-AES measurement.

(2) Preparation of Electrolytic Solution

In an argon gas atmosphere, 1.38 g (5 mmol) of the phenylphosphonic acid bis(magnesium chloride) salt (PhP(O)(OMgCl)$_2$) obtained in (1) was added to 20 ml of triglyme (manufactured by Wako Pure Chemical Industries, Ltd.). After heating at 45° C. under stirring, 2.00 g (15 mmol) of aluminum chloride (AlCl$_3$) (manufactured by Wako Pure Chemical Industries, Ltd.) was added to the mixture. After stirring at 60° C. for 1 hour, the mixture was cooled to room temperature to obtain an electrolytic solution 3 [phenylphosphonic acid bis(magnesium chloride) salt-aluminum chloride/triglyme solution].

Example 4 Preparation of Electrolytic Solution 4

(1) Synthesis of Magnesium Salt

In an argon gas atmosphere, phenylmagnesium chloride (PhMgCl) solution in THF (manufactured by Tokyo Chemical Industry Co., Ltd., 2 M) 20 ml (40 mmol) was added dropwise to a solution obtained by dissolving 8.73 g (40 mmol) of diphenylphosphinic acid (manufactured by Wako Pure Chemical Industries, Ltd.) in 20 ml of THF (manufactured by Wako Pure Chemical Industries, Ltd.) at 0° C. or lower, followed by stirring for 1.5 hours. The reaction solution was concentrated and 50 ml of IPE (manufactured by Wako Pure Chemical Industries, Ltd.) was poured thereinto to produce powder. The powder was collected by filtration and dried under reduced pressure to obtain a diphenylphosphinic acid magnesium chloride salt (Ph$_2$P(O)(OMgCl)).

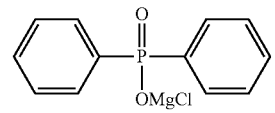

The results of the $^1$H-NMR measurement of the obtained compound are shown below.

$^1$H-NMR (400 MHz, DMSO-d6) δ (ppm): 6.80-8.20 (m, 10H) The results of the $^1$H-NMR measurement and the IR measurement of diphenylphosphinic acid are shown below.

$^1$H-NMR (400 MHz, DMSO-d6) δ (ppm): 7.40-7.55 (m, 6H, Ar), 7.65-7.80 (m, 4H, Ar), 12.01 (brs, 1H, OH)

IR (ATR): $v_{OH}$=2661

It was confirmed that the obtained compound had a structure different from that of diphenylphosphinic acid by the $^1$H-NMR measurement. In addition, it was confirmed that the OH bond detected in diphenylphosphinic acid has disappeared in the obtained compound by the IR measurement.

It was confirmed that the molar ratio of magnesium to phosphorus contained in the obtained compound was Mg:P=1:1 by the ICP-AES measurement.

(2) Preparation of Electrolytic Solution

In an argon gas atmosphere, 1.39 g (5 mmol) of the diphenylphosphinic acid magnesium chloride salt (Ph$_2$PO(OMgCl)) obtained in (1) was added to 20 ml of triglyme (manufactured by Wako Pure Chemical Industries, Ltd.). After heating at 45° C. under stirring, 1.33 g (10 mmol) of aluminum chloride (AlCl$_3$) (manufactured by Wako Pure Chemical Industries, Ltd.) was added to the mixture. After stirring at 60° C. for 2.5 hours, the mixture was cooled to room temperature to obtain an electrolytic solution 4 [diphenylphosphinic acid magnesium chloride salt-aluminum chloride/triglyme solution].

Example 5 Preparation of Electrolytic Solution 5

(1) Synthesis of Magnesium Salt

In an argon gas atmosphere, phenylmagnesium chloride (PhMgCl) solution in THF (manufactured by Tokyo Chemical Industry Co., Ltd., 2 M) 20 ml (40 mmol) was added dropwise to a solution obtained by dissolving 8.09 g (40 mmol) of diphenylphosphine oxide (manufactured by Wako Pure Chemical Industries, Ltd.) in 20 ml of THF (manufactured by Wako Pure Chemical Industries, Ltd.) at room temperature, followed by stirring for 2 hours. The reaction solution was concentrated and dried, and 40 ml of IPE (manufactured by Wako Pure Chemical Industries, Ltd.) was poured thereinto to precipitate powder. The powder was collected by filtration and dried under reduced pressure to obtain a diphenylphosphine oxide magnesium chloride salt (Ph$_2$P(OMgCl)).

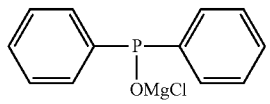

The results of the $^1$H-NMR measurement of the obtained compound are shown below.

$^1$H-NMR (400 MHz, DMSO-d6) δ (ppm): 6.95-7.95 (m, 10H)

The results of the $^1$H-NMR measurement and the IR measurement of diphenylphosphine oxide are shown below.

$^1$H-NMR (400 MHz, DMSO-d6) δ (ppm): 7.54-7.58 (m, 4H, Ar), 7.60-7.65 (m, 2H, Ar), 7.68-7.76 (m, 4H, Ar), 8.10 (d, 490 Hz, 1H, PH)

IR (ATR): $v_{P=O}$=1161, $v_{PH}$=2373

It was confirmed that the obtained compound had a structure different from that of diphenylphosphine oxide by the $^1$H-NMR measurement. In addition, it was confirmed that the P=O bond and the PH bond detected in diphenylphosphine oxide have disappeared in the obtained compound by the IR measurement.

It was confirmed that the molar ratio of magnesium to phosphorus contained in the obtained compound was Mg:P=1:1 by the ICP-AES measurement.

(2) Preparation of Electrolytic Solution

In an argon gas atmosphere, 1.30 g (5 mmol) of the diphenylphosphine oxide magnesium chloride salt (Ph$_2$P(OMgCl)) obtained in (1) was added to 20 ml of triglyme (manufactured by Wako Pure Chemical Industries, Ltd.). After heating at 40° C. under stirring, 1.00 g (7.5 mmol) of aluminum chloride (AlCl$_3$) (manufactured by Wako Pure Chemical Industries, Ltd.) was added to the mixture. After stirring at 60° C. for 30 minutes, the mixture was cooled to room temperature to obtain an electrolytic solution 5 [diphenylphosphine oxide magnesium chloride salt-aluminum chloride/triglyme solution].

Example 6 Preparation of Electrolytic Solution 6

(1) Synthesis of Magnesium Salt

In an argon gas atmosphere, phenylmagnesium chloride (PhMgCl) solution in THF (manufactured by Tokyo Chemical Industry Co., Ltd., 2 M) 20 ml (40 mmol) was added dropwise to a solution obtained by dissolving 2.84 g (20 mmol) of phenylphosphinic acid (manufactured by Tokyo Chemical Industry Co., Ltd.) in 30 ml of THF (manufactured by Wako Pure Chemical Industries, Ltd.) at −20° C., followed by stirring for 30 minutes. The reaction solution was concentrated and 50 ml of IPE (manufactured by Wako Pure Chemical Industries, Ltd.) was poured thereinto to produce powder. The powder was collected by filtration and dried under reduced pressure to obtain a phenylphosphinic acid bis(magnesium chloride) salt (PhP(OMgCl)$_2$).

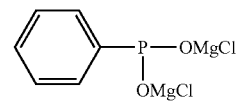

The results of the $^1$H-NMR measurement of the obtained compound are shown below.

$^1$H-NMR (400 MHz, DMSO-d6) δ (ppm): 7.12-7.65 (m, 5H, Ph)

The results of the $^1$H-NMR measurement and the IR measurement of phenylphosphinic acid are shown below.

$^1$H-NMR (400 MHz, DMSO-d6) δ (ppm): 7.49 (d, 544 Hz, 1H, PH), 7.50-7.78 (m, 5H, Ar), 11.90 (brs, 1H, OH)

IR (ATR): $v_{PH}$=2407, $v_{OH}$=2600

It was confirmed that the obtained compound had a structure different from that of phenylphosphinic acid by the $^1$H-NMR measurement. In addition, it was confirmed that the OH bond and the PH bond detected in phenylphosphinic acid have disappeared in the obtained compound by the IR measurement.

It was confirmed that the molar ratio of magnesium to phosphorus contained in the obtained compound was Mg:P=2:1 by the ICP-AES measurement.

(2) Preparation of Electrolytic Solution

In an argon gas atmosphere, 0.65 g (2.5 mmol) of the phenylphosphinic acid bis(magnesium chloride) salt (PhP(OMgCl)$_2$) obtained in (1) was added to 10 ml of triglyme (manufactured by Wako Pure Chemical Industries, Ltd.). After heating at 40° C. under stirring, 1.33 g (10 mmol) of aluminum chloride (AlCl$_3$) (manufactured by Wako Pure Chemical Industries, Ltd.) was added to the mixture. After stirring at 50° C. for 10 minutes, the mixture was cooled to room temperature to obtain an electrolytic solution 6 [phenylphosphinic acid bis(magnesium chloride) salt-aluminum chloride/triglyme solution].

Example 7 Preparation of Electrolytic Solution 7

(1) Synthesis of Magnesium Salt

In an argon gas atmosphere, phenylmagnesium chloride (PhMgCl) solution in THF (manufactured by Tokyo Chemical Industry Co., Ltd., 2 M) 30 ml (60 mmol) was added dropwise to a solution obtained by dissolving 1.64 g (20 mmol) of phosphorous acid (manufactured by Wako Pure Chemical Industries, Ltd.) in 30 ml of THF (manufactured by Wako Pure Chemical Industries, Ltd.) at −70° C., followed by stirring for 30 minutes. The reaction solution was concentrated and 40 ml of IPE (manufactured by Wako Pure Chemical Industries, Ltd.) was poured thereinto to produce powder. The powder was collected by filtration and dried under reduced pressure to obtain a phosphorous acid tris(magnesium chloride) salt (P(OMgCl)$_3$).

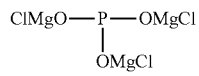

In the $^1$H-NMR measurement of the obtained compound, a peak derived from the reactant was not observed.

The results of the $^1$H-NMR measurement and the IR measurement of phosphorous acid are shown below.

$^1$H-NMR (400 MHz, DMSO-d6) δ (ppm): 6.74 (d, 648 Hz, 1H, PH), 11.58 (brs, 2H, OH)

IR (ATR): $v_{PH}$=2486, $v_{OH}$=2665

It was confirmed that the obtained compound had a structure different from that of phosphorous acid by the $^1$H-NMR measurement. In addition, it was confirmed that the OH bond and the PH bond detected in phosphorous acid has disappeared in the obtained compound by the IR measurement.

It was confirmed that the molar ratio of magnesium to phosphorus contained in the obtained compound was Mg:P=3:1 by the ICP-AES measurement.

(2) Preparation of Electrolytic Solution

In an argon gas atmosphere, 0.65 g (2.5 mmol) of the phosphorous acid tris(magnesium chloride) salt (P(OMgCl)$_3$) obtained in (1) was added to 10 ml of triglyme (manufactured by Wako Pure Chemical Industries, Ltd.). After heating at 40° C. under stirring, 2.00 g (15 mmol) of aluminum chloride (AlCl$_3$) (manufactured by Wako Pure Chemical Industries, Ltd.) was added to the mixture. After stirring at 50° C. for 10 minutes, the mixture was cooled to room temperature to obtain an electrolytic solution 7 [phosphorous acid tris(magnesium chloride) salt-aluminum chloride/triglyme solution].

Example 8 Preparation of Electrolytic Solution 8

(1) Synthesis of Magnesium Salt

In an argon gas atmosphere, phenylmagnesium chloride (PhMgCl) solution in THF (manufactured by Tokyo Chemical Industry Co., Ltd., 2 M) 20 ml (40 mmol) was added dropwise to a solution obtained by dissolving 9.37 g (40 mmol) of diphenyl phosphite (manufactured by Wako Pure Chemical Industries, Ltd.) in 30 ml of THF (manufactured by Wako Pure Chemical Industries, Ltd.) at −70° C., followed by stirring for 1 hour. The reaction solution was concentrated and 50 ml of IPE (manufactured by Wako Pure Chemical Industries, Ltd.) was poured thereinto to produce powder. The powder was collected by filtration and dried under reduced pressure to obtain a diphenyl phosphite magnesium chloride salt ((PhO)$_2$P(OMgCl)).

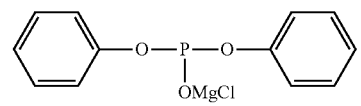

The results of the $^1$H-NMR measurement of the obtained compound are shown below.

$^1$H-NMR (400 MHz, DMSO-d6) δ (ppm): 6.88-7.12 (m, 4H, Ar), 7.14-7.43 (m, 6H, Ar)

The results of the $^1$H-NMR measurement and the IR measurement of diphenyl phosphite are shown below.

$^1$H-NMR (400 MHz, DMSO-d6) δ (ppm): 7.06 (d, 682 Hz, 1H, PH), 7.15-7.48 (m, 10H, Ar)

IR (ATR): $v_{P=O}$=1275, $v_{PH}$=2480

It was confirmed that the obtained compound had a structure different from that of diphenyl phosphite by the $^1$H-NMR measurement. In addition, it was confirmed that the P=O bond and the PH bond detected in diphenyl phosphite have disappeared in the obtained compound by the IR measurement.

It was confirmed that the molar ratio of magnesium to phosphorus contained in the obtained compound was Mg:P=1:1 by the ICP-AES measurement.

(2) Preparation of Electrolytic Solution

In an argon gas atmosphere, 0.73 g (2.5 mmol) of the diphenyl phosphite magnesium chloride salt ((PhO)$_2$P(OMgCl)) obtained in (1) was added to 10 ml of triglyme (manufactured by Wako Pure Chemical Industries, Ltd.). After heating at 40° C. under stirring, 0.67 g (5 mmol) of aluminum chloride (AlCl$_3$) (manufactured by Wako Pure Chemical Industries, Ltd.) was added to the mixture. After stirring at 50° C. for 10 minutes, the mixture was cooled to room temperature to obtain an electrolytic solution 8 [diphenyl phosphite magnesium chloride salt-aluminum chloride/triglyme solution].

Example 9 Preparation of Electrolytic Solution 9

(1) Synthesis of Magnesium Salt

In an argon gas atmosphere, phenylmagnesium chloride (PhMgCl) solution in THF (manufactured by Tokyo Chemical Industry Co., Ltd., 2 M) 20 ml (40 mmol) was added dropwise to a solution obtained by dissolving 1.92 g (20 mmol) of diphenyl phosphate (manufactured by Tokyo Chemical Industry Co., Ltd.) in 30 ml of THF (manufactured by Wako Pure Chemical Industries, Ltd.) at −70° C., followed by stirring for 30 minutes. The reaction solution was concentrated and 20 ml of IPE (manufactured by Wako Pure Chemical Industries, Ltd.) was poured thereinto to produce powder. The powder was collected by filtration and dried under reduced pressure to obtain a diphenyl phosphate magnesium chloride salt ((PhO)$_2$P(O)(OMgCl)).

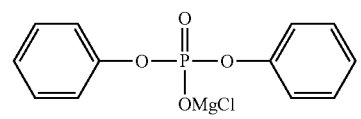

The results of the $^1$H-NMR measurement of the obtained compound are shown below.

$^1$H-NMR (400 MHz, DMSO-d6) δ (ppm): 6.96-7.04 (m, 2H, Ar), 7.15-7.37 (m, 8H, Ar)

In addition, the results of the $^1$H-NMR measurement and the IR measurement of diphenyl phosphate are shown below.

$^1$H-NMR (400 MHz, DMSO-d6) δ (ppm): 7.14-7.23 (m, 6H, Ar), 7.35-7.42 (m, 4H, Ar)

IR (ATR): $v_{OH}$=2575

It was confirmed that the obtained compound had a structure different from that of diphenyl phosphate by the $^1$H-NMR measurement. In addition, it was confirmed that the OH bond detected in diphenyl phosphate has disappeared in the obtained compound by the IR measurement.

It was confirmed that the molar ratio of magnesium to phosphorus contained in the obtained compound was Mg:P=1:1 by the ICP-AES measurement.

(2) Preparation of Electrolytic Solution

In an argon gas atmosphere, 0.77 g (2.5 mmol) of the diphenyl phosphate magnesium chloride salt ((PhO)$_2$P(O)(OMgCl)) obtained in (1) was added to 10 ml of triglyme (manufactured by Wako Pure Chemical Industries, Ltd.). After heating at 40° C. under stirring, 0.67 g (5 mmol) of aluminum chloride (AlCl$_3$) (manufactured by Wako Pure Chemical Industries, Ltd.) was added to the mixture. After stirring at 50° C. for 30 minutes, the mixture was cooled to room temperature to obtain an electrolytic solution 9 [diphenyl phosphate magnesium chloride salt-aluminum chloride/triglyme solution].

Example 10 Preparation of Electrolytic Solution 10

(1) Synthesis of Magnesium Salt

In an argon gas atmosphere, phenylmagnesium chloride (PhMgCl) solution in THF (manufactured by Tokyo Chemical Industry Co., Ltd., 2 M) 20 ml (40 mmol) was added dropwise to a solution obtained by dissolving 3.48 g (20 mmol) of phenyl phosphate (manufactured by Tokyo Chemical Industry Co., Ltd.) in 30 ml of THF (manufactured by Wako Pure Chemical Industries, Ltd.) at −70° C., followed by stirring for 30 minutes. The reaction solution was concentrated and 40 ml of IPE (manufactured by Wako Pure Chemical Industries, Ltd.) was poured thereinto to produce powder. The powder was collected by filtration and dried under reduced pressure to obtain a phenyl phosphate bis(magnesium chloride) salt ((PhO)P(O)(OMgCl)$_2$).

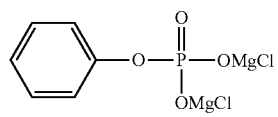

The results of the $^1$H-NMR measurement of the obtained compound are shown below.

$^1$H-NMR (400 MHz, DMSO-d6) δ (ppm): 6.80-7.08 (m, 1H, Ar), 7.11-7.50 (m, 4H, Ar)

The results of the $^1$H-NMR measurement and the IR measurement of phenyl phosphate are shown below.

$^1$H-NMR (400 MHz, DMSO-d6) δ (ppm): 7.10-7.20 (m, 3H, Ar), 7.34 (t, 8.7 Hz, 2H, Ar), 11.67 (brs, 2H, OH)

IR (ATR): $v_{OH}$=2703

It was confirmed that the obtained compound had a structure different from that of phenyl phosphate by the $^1$H-NMR measurement. In addition, it was confirmed that the OH bond detected in phenyl phosphate has disappeared in the obtained compound by the IR measurement.

It was confirmed that the molar ratio of magnesium to phosphorus contained in the obtained compound was Mg:P=2:1 by the ICP-AES measurement.

(2) Preparation of Electrolytic Solution

In an argon gas atmosphere, 0.73 g (2.5 mmol) of the phenyl phosphate bis(magnesium chloride) salt ((PhO)P(O)(OMgCl)$_2$) obtained in (1) was added to 10 ml of triglyme (manufactured by Wako Pure Chemical Industries, Ltd.). After heating at 40° C. under stirring, 1.33 g (10 mmol) of aluminum chloride (AlCl$_3$) (manufactured by Wako Pure Chemical Industries, Ltd.) was added to the mixture. After stirring at 50° C. for 10 minutes, the mixture was cooled to room temperature to obtain an electrolytic solution 10 [phenyl phosphate bis(magnesium chloride) salt-aluminum chloride/triglyme solution].

Example 11 Preparation of Electrolytic Solution 11

(1) Synthesis of Magnesium Salt

In an argon gas atmosphere, phenylmagnesium chloride (PhMgCl) solution in THF (manufactured by Tokyo Chemical Industry Co., Ltd., 2 M) 5 ml (10 mmol) was added to a mixed liquid in which 2.78 g (10 mmol) of bis(4-methoxyphenyl)phosphinic acid (manufactured by Sigma-Aldrich Co. LLC.) was added dropwise to 30 ml of THF (manufactured by Wako Pure Chemical Industries, Ltd.) at −10° C., followed by stirring for 30 minutes. The reaction solution was concentrated and 50 ml of IPE (manufactured by Wako Pure Chemical Industries, Ltd.) was poured thereinto to produce powder. The powder was collected by filtration and dried under reduced pressure to obtain a bis(4-methoxyphenyl)phosphinic acid magnesium chloride salt ((4-(MeO)C$_6$H$_4$)$_2$P(OMgCl)).

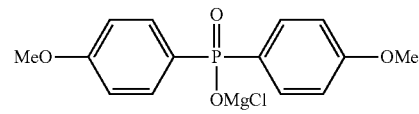

The results of the $^1$H-NMR measurement of the obtained compound are shown below.

$^1$H-NMR (400 MHz, DMSO-d6) δ (ppm): 3.64-3.82 (m, 6H, OMe), 6.50-6.87 (m, 4H, Ar), 7.25-7.77 (m, 4H, Ar)

The results of the $^1$H-NMR measurement and the IR measurement of bis(4-methoxyphenyl)phosphinic acid are shown below.

$^1$H-NMR (400 MHz, DMSO-d6) δ (ppm): 3.77 (s, 6H, OMe), 6.96-7.03 (m, 4H, Ar), 7.56-7.64 (m, 4H, Ar), 11.55 (brs, 1H, OH)

IR (ATR): $v_{OH}$=2550

It was confirmed that the obtained compound had a structure different from that of bis(4-methoxyphenyl)phosphinic acid by the $^1$H-NMR measurement. In addition, it was confirmed that the OH bond detected in bis(4-methoxyphenyl)phosphinic acid has disappeared in the obtained compound by the IR measurement.

It was confirmed that the molar ratio of magnesium to phosphorus contained in the obtained compound was Mg:P=1:1 by the ICP-AES measurement.

(2) Preparation of Electrolytic Solution

In an argon gas atmosphere, 0.84 g (2.5 mmol) of the bis(4-methoxyphenyl)phosphinic acid magnesium chloride salt ((4-(MeO)C$_6$H$_4$)$_2$P(OMgCl)) obtained in (1) was added to 10 ml of THF (manufactured by Wako Pure Chemical Industries, Ltd.). After heating at 40° C. under stirring, 0.33 g (2.5 mmol) of aluminum chloride (AlCl$_3$) (manufactured by Wako Pure Chemical Industries, Ltd.) was added to the mixture. After stirring at 50° C. for 10 minutes, the mixture was cooled to room temperature to obtain an electrolytic solution 11 [bis(4-methoxyphenyl)phosphinic acid magnesium chloride salt-aluminum chloride/THF solution].

Example 12 Preparation of Electrolytic Solution 12

(1) Synthesis of Magnesium Salt

In an argon gas atmosphere, phenylmagnesium chloride (PhMgCl) solution in THF (manufactured by Tokyo Chemical Industry Co., Ltd., 2 M) 20 ml (40 mmol) was added dropwise to a solution obtained by dissolving 1.92 g (20 mmol) of methylphosphonic acid (manufactured by Sigma-Aldrich Co. LLC.) in 45 ml of THF (manufactured by Wako Pure Chemical Industries, Ltd.) at −30° C., followed by stirring for 30 minutes. The reaction solution was concentrated and 40 ml of IPE (manufactured by Wako Pure Chemical Industries, Ltd.) was poured thereinto to produce powder. The powder was collected by filtration and dried under reduced pressure to obtain a methylphosphonic acid bis(magnesium chloride) salt (MeP(O)(OMgCl)$_2$).

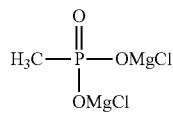

The results of the $^1$H-NMR measurement of the obtained compound are shown below.

$^1$H-NMR (400 MHz, DMSO-d6) δ (ppm): 0.84-1.48 (m, 3H, Me)

The results of the $^1$H-NMR measurement and the IR measurement of methylphosphonic acid are shown below.

$^1$H-NMR (400 MHz, DMSO-d6) δ (ppm): 1.25 (d, 17 Hz, 1H, Me), 10.30 (brs, 2H, OH)

IR (ATR): ν$_{OH}$=2730

It was confirmed that the obtained compound had a structure different from that of methylphosphonic acid by the $^1$H-NMR measurement. In addition, it was confirmed that the OH bond detected in methylphosphonic acid has disappeared in the obtained compound by the IR measurement.

It was confirmed that the molar ratio of magnesium to phosphorus contained in the obtained compound was Mg:P=2:1 by the ICP-AES measurement.

(2) Preparation of Electrolytic Solution

In an argon gas atmosphere, 0.53 g (2.5 mmol) of the methylphosphonic acid bis(magnesium chloride) salt (MeP(O)(OMgCl)$_2$) obtained in (1) was added to a mixed liquid of 15 ml of THF (manufactured by Wako Pure Chemical Industries, Ltd.) and 5 ml of triglyme (manufactured by Wako Pure Chemical Industries, Ltd.). After heating at 40° C. under stirring, 1.33 g (10 mmol) of aluminum chloride (AlCl$_3$) (manufactured by Wako Pure Chemical Industries, Ltd.) was added to the mixture. After stirring at 50° C. for 30 minutes, the mixture was cooled to room temperature to obtain an electrolytic solution 12 [methylphosphonic acid bis(magnesium chloride) salt-aluminum chloride/THF-triglyme solution].

Example 13 Preparation of Electrolytic Solution 13

(1) Synthesis of Magnesium Salt

In an argon gas atmosphere, phenylmagnesium chloride (PhMgCl) solution in THF (manufactured by Tokyo Chemical Industry Co., Ltd., 2 M) 40 ml (80 mmol) was added dropwise to a solution obtained by dissolving 3.56 g (20 mmol) of diphosphoric acid (manufactured by Sigma-Aldrich Co. LLC.) in 30 ml of THF (manufactured by Wako Pure Chemical Industries, Ltd.) at −70° C., followed by stirring for 30 minutes. The reaction solution was concentrated and 40 ml of IPE (manufactured by Wako Pure Chemical Industries, Ltd.) was poured thereinto to produce powder. The powder was collected by filtration and dried under reduced pressure to obtain a diphosphoric acid tetrakis (magnesium chloride) salt ((ClMgO)$_2$P(O)OP(O)(OMgCl)$_2$).

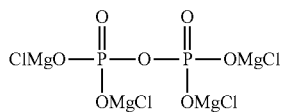

In the $^1$H-NMR measurement of the obtained compound, a peak derived from the reactant was not observed.

The results of the $^1$H-NMR measurement and the IR measurement of diphosphoric acid are shown below.

$^1$H-NMR (400 MHz, DMSO-d6) δ (ppm): 11.88 (brs, 4H, OH)

IR (ATR): ν$_{OH}$=2778

It was confirmed that the obtained compound had a structure different from that of diphosphoric acid by the $^1$H-NMR measurement. In addition, it was confirmed that the OH bond detected in diphosphoric acid has disappeared in the obtained compound by the IR measurement.

It was confirmed that the molar ratio of magnesium to phosphorus contained in the obtained compound was Mg:P=4:2 by the ICP-AES measurement.

(2) Preparation of Electrolytic Solution

In an argon gas atmosphere, 1.03 g (2.5 mmol) of diphosphoric acid tetrakis(magnesium chloride) salt ((ClMgO)$_2$P(O)OP(O)(OMgCl)$_2$) obtained in (1) was added to 10 ml of triglyme (manufactured by Wako Pure Chemical Industries, Ltd.). After heating at 40° C. under stirring, 2.67 g (20 mmol) of aluminum chloride (AlCl$_3$) (manufactured by Wako Pure Chemical Industries, Ltd.) was added to the mixture. After stirring at 50° C. for 3 hours, the mixture was cooled to room temperature to obtain an electrolytic solution 13 [diphosphoric acid tetrakis(magnesium chloride) salt-aluminum chloride/triglyme solution].

Comparative Example 1 Preparation of Comparative Electrolytic Solution 1

In an argon gas atmosphere, 1.48 g (20 mmol) of tert-butanol (tert-BuOH) (manufactured by Wako Pure Chemical Industries, Ltd.) was added dropwise to ethylmagnesium chloride (EtMgCl) solution in THF (manufactured by Tokyo Chemical Industry Co., Ltd., 2M) 10 ml (20 mmol) delluted with THF (manufactured by Wako Pure Chemical Industries, Ltd.) under stirring. 0.44 g (3.3 mmol) of aluminum chloride (AlCl$_3$) (manufactured by Wako Pure Chemical Industries, Ltd.) was added to the obtained solution, followed by stirring, to obtain a comparative electrolytic solution 1 [(tert-BuOMgCl)$_6$—AlCl$_3$/THF solution].

Comparative Example 2 Preparation of Comparative Electrolytic Solution 2

In an argon gas atmosphere, magnesium perchlorate (Mg(ClO$_4$)$_2$) (manufactured by Aldrich) 1.34 g (6 mmol) was dissolved in trimethyl phosphate (manufactured by Aldrich) 12 ml. After cooling to room temperature, iodine ($I_2$) (manufactured by Aldrich) 200 mg (0.78 mmol) was dissolved in the obtained solution to obtain a comparative electrolytic solution 2 [$Mg(ClO_4)_2$—$I_2$/trimethyl phosphate solution].

Experimental Example 1 Cyclic Voltammetry (CV) Measurement of Various Electrolytic Solutions Cyclic voltammetry (CV) measurement was carried out using the electrolytic solutions 1 to 4, and the comparative electrolytic solutions 1 and 2, immediately after the preparation thereof. In addition, CV measurement was carried out in a similar manner using the electrolytic solution 1 after one month from the preparation.

CV measurement was carried out, specifically as follows. That is, using a 3-electrode beaker cell, a platinum electrode (diameter: 3 mm; manufactured by BAS Co., Ltd.), an Mg rod (diameter: 1.6 mm; manufactured by The Nilaco Corporation), and an Mg rod (diameter: 1.6 mm; manufactured by The Nilaco Corporation) were used as a working electrode, a counter electrode, and a reference electrode, respectively. 2 ml of the electrolytic solution was added into the beaker cell to carry out the measurement with a scan rate of 5 mV/s from −1.5 to 3.5 V at room temperature (25° C.). An electrochemical measurement system (manufactured by BioLogic Co., Ltd.) was used for the measurement.

The oxidative stability (at the $10^{th}$ cycle) of each electrolytic solution is shown in Table 7.

Figure 1:
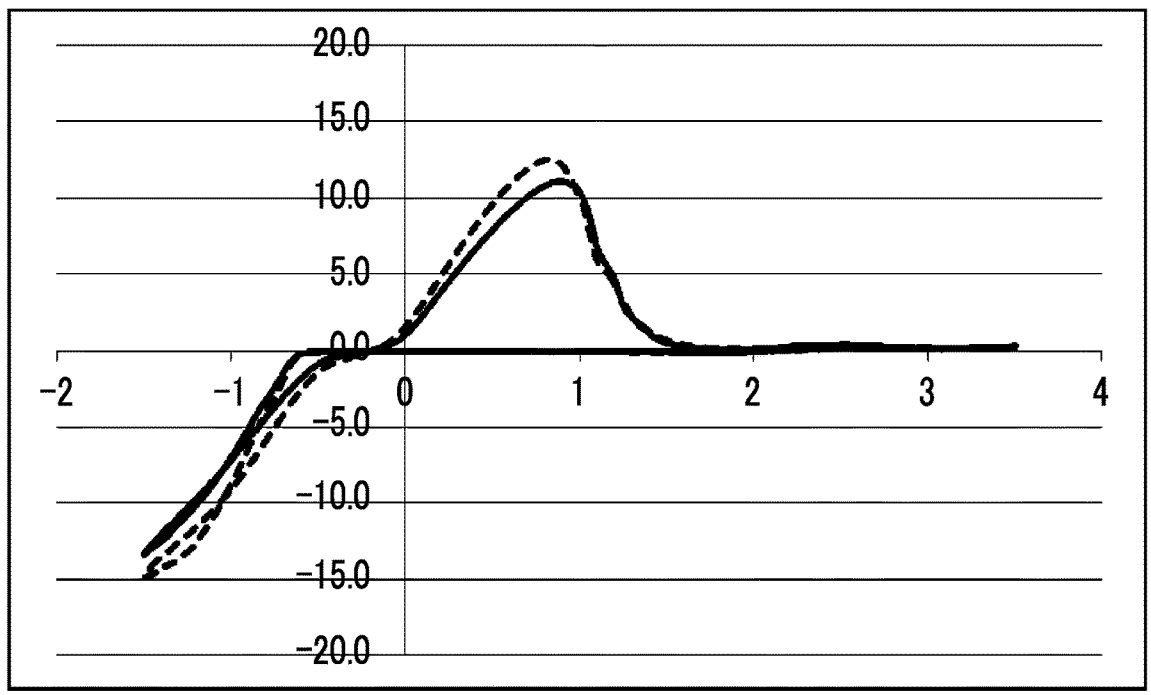
FIG. 1 shows a graph illustrating the results from 10 cycles immediately after preparation of a solution or after the passage of one month from preparation of the solution in CV measurement using an electrolytic solution 1 "[orthophosphoric acid tris(magnesium chloride) salt-aluminum chloride/triglyme solution]" in Experimental Example 1

In addition, the results from the electrolytic solution at the $10^{th}$ cycle are shown in FIGS. 1 to 15 (FIG. 1: the results from the electrolytic solution 1, FIG. 2: the results from the electrolytic solution 2, FIG. 3: the results from the electrolytic solution 3, FIG. 4: the results from the electrolytic solution 4, FIG. 5: the results from the electrolytic solution 5, FIG. 6: the results from the electrolytic solution 6, FIG. 7: the results from the electrolytic solution 7, FIG. 8: the results from the electrolytic solution 8, FIG. 9: the results from the electrolytic solution 9, FIG. 10: the results from the electrolytic solution 10, FIG. 11: the results from the electrolytic solution 11, FIG. 12: the results from the electrolytic solution 12, FIG. 13: the results from the electrolytic solution 13, FIG. 14: the results of the comparative electrolytic solution 1, and FIG. 15: the results of the comparative electrolytic solution 2, each immediately after the preparation of the electrolytic solution and after one month after the preparation of the electrolytic solution). In addition, in FIG. 3, the results from the $1^{st}$ cycle and the $30^{th}$ cycle of the electrolytic solution 3 are also shown together.

Furthermore, the horizontal axis in these Figures represents a potential of the working electrode, based on potential of the reference electrode, and the vertical axis ($mA/cm^2$) represents a current density obtained by dividing a current value observed at each potential with a surface area of the working electrode. In addition, the solid line in FIG. 1 represents the results from the $10^{th}$ cycle immediately after the preparation of the electrolytic solution, and the dashed line in FIG. 1 represents the results from the $10^{th}$ cycle after one month from the preparation of the electrolytic solution. The solid lines in FIGS. 2 and 4 to 15 represent the results from the $10^{th}$ cycle (immediately after the preparation of the electrolytic solution). The solid line in FIG. 3 represents the results from the $1^{st}$ cycle (immediately after the preparation of the electrolytic solution), the dashed line in FIG. 3 represents the results from the $10^{th}$ cycle (immediately after the preparation of the electrolytic solution), and the dotted line in FIG. 3 represents the results from the $30^{th}$ cycle (immediately after the preparation of the electrolytic solution).

TABLE 7

| Electrolytic solution | | Oxidative stability |
|---|---|---|
| Example 1 | $P(O)(OMgCl)_3$—$AlCl_3$/triglyme | +3.4 V |
| Example 2 | $P(O)(OMgCl)_3$—$Mg(TFSI)_2$/triglyme | +3.4 V |
| Example 3 | $PhP(O)(OMgCl)_2$—$AlCl_3$/triglyme | +3.2 V |
| Example 4 | $Ph_2P(O)(OMgCl)$—$AlCl_3$/triglyme | +3.4 V |
| Example 5 | $Ph_2P(OMgCl)$—$AlCl_3$/triglyme | +3.5 V |
| Example 6 | $PhP(OMgCl)_2$—$AlCl_3$/triglyme | +3.4 V |
| Example 7 | $P(OMgCl)_3$—$AlCl_3$/triglyme | +3.1 V |
| Example 8 | $(PhO)_2(OMgCl)$—$AlCl_3$/triglyme | +3.2 V |
| Example 9 | $(PhO)_2P(O)(OMgCl)$—$AlCl_3$/triglyme | +3.0 V |
| Example 10 | $(PhO)P(O)(OMgCl)_2$—$AlCl_3$/triglyme | +3.1 V |
| Example 11 | $(4-(MeO)C_6H_4)_2P(O)(OMgCl)$—$AlCl_3$/THF | +3.2 V |
| Example 12 | $MeP(O)(OMgCl)_2$—$AlCl_3$/THF-triglyme | +3.1 V |
| Example 13 | $(ClMgO)_2P(O)OP(O)(OMgCl)_2$—$AlCl_3$/triglyme | +3.1 V |
| Comparative Example 1 | $(tert\text{-}BuOMgCl)_6$—$AlCl_3$/THF | +2.4 V |
| Comparative Example 2 | $Mg(ClO_4)_2$—$I_2$/trimethyl phosphate | +2.6 V |

From the results of Table 7 and FIGS. 1 to 13, it has been found that the oxidative stability of each of the electrolytic solutions of the present invention was +3.0 V or more. Meanwhile, by the CV measurement of the comparative electrolytic solution 1 [(tert-$BuOMgCl)_6$—$AlCl_3$/THF solution] which was an electrolytic solution described in J. Mater. Chem. A, 2014, 2, 581-584 (Non-Patent Literature 3), it was found that the oxidative stability was approximately +2.4 V as the value described in the literature. In addition, in the CV measurement of the comparative electrolytic solution 2 [$Mg(ClO_4)_2$—$I_2$/trimethyl phosphate solution] which was the electrolytic solution described in JP5786540B (Patent Literature 2), reversible deposition/dissolution of magnesium was not confirmed and the oxidative stability was approximately +2.6 V.

From the above, it was found that the electrolytic solution of the present invention has noticeably higher oxidative stability than the electrolytic solution containing a tert-BuOMgCl salt which is non-nucleophilic magnesium (Comparative Example 1) in the same manner as the compound represented by the general formula (I) according to the present invention, and can be used at a higher voltage than that for the electrolytic solution in the related art. In addition, it was found that the electrolytic solution of the present invention shows a remarkably higher current density and higher oxidation resistance than the non-aqueous magnesium ion electrolytic solution containing a phosphorus-containing organic compound, a halogen, and magnesium ions (Comparative Example 2). That is, it was found that the electrolytic solution of the present invention formed by mixing a magnesium salt of a phosphoric acid analog or a condensate thereof with a Lewis acid in an appropriate solvent has deposition/dissolution of magnesium with a higher efficiency and higher oxidation resistance than known electrolytic solution used magnesium salts of alcohols.

In addition, from the results of FIG. 3, it was found that deposition/dissolution of magnesium proceeds repeatedly and stably with the electrolytic solution of the present invention.

In addition, from the results of FIG. 1, it was found that the electrolytic solution of the present invention has the performance not being deteriorated even after storage of one month and excellent storage stability.

Experimental Example 2 Manufacture of
Electrochemical Device and Charge-Discharge Test First, a $Mo_6S_8$ electrode was produced in accordance with the method described in J. Electrochem. Soc., 2014, 161, A593. Then, the produced $Mo_6S_8$ electrode was used for a working electrode, an Mg rod (diameter: 1.6 mm; manufactured by The Nilaco Corporation) was used for a counter electrode and a reference electrode, and 2 ml of the electrolytic solution 1 prepared in Example 1 was added into a beaker to produce a 3-electrode beaker cell.

A constant current charge-discharge test was carried out at a rate of 0.1 C with a cut-off potential of 0.8 V to 1.9 V (vs. the Mg reference electrode) at room temperature, and the obtained charge-discharge curve is shown in FIG. 16.

In addition, the horizontal axis (mAh/g) in these Figures represents a discharge capacity at each potential, and the vertical axis represents a potential of the working electrode, based on the potential of the reference electrode. In addition, the solid line in FIG. 16 represents the results from the $1^{st}$ cycle, and the dotted line in FIG. 16 represents the results from the $5^{th}$ cycle.

From the results of FIG. 16, it was found that a battery manufactured using the electrolytic solution of the present invention is operated as a secondary battery device.

The invention claimed is:

1. An electrolytic solution for a magnesium battery, formed by mixing a compound represented by the following general formula (I), a Lewis acid or a compound represented by the following general formula (A), and a solvent:

(I)

where, in the formula (I), m represents 0 or 2, n represents 2 in a case of m=0 and represents 0 or 1 in a case of m=2, $X^1$ represents a chlorine atom or a bromine atom, each $R^1$ independently represents a magnesium chloride oxy group (—OMgCl); a magnesium bromide oxy group (—OMgBr); an alkyl group having 1 to 6 carbon atoms, which may have a halogeno group or an alkoxy group as a substituent; an alkoxy group having 1 to 6 carbon atoms; an aryl group having 6 to 10 carbon atoms, which may have a halogeno group, an alkyl group, a halogenoalkyl group, or an alkoxy group as a substituent; an aryloxy group having 6 to 10 carbon atoms, which may have a halogeno group, an alkyl group, a halogenoalkyl group, or an alkoxy group as a substituent; or a group represented by the following general formula (1), or two $R^1$'s may form the following general formula (2):

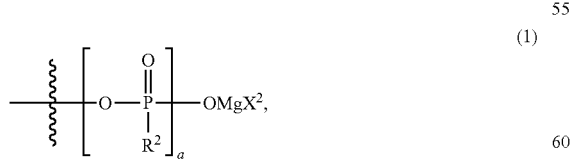
(1)

where, in the formula (1), a represents an integer of 1 to 3, $X^2$ represents a chlorine atom or a bromine atom, and each $R^2$ independently represents a magnesium chloride oxy group (—OMgCl); a magnesium bromide oxy group (—OMgBr); an alkyl group having 1 to 6 carbon atoms, which may have a halogeno group or an alkoxy group as a substituent; an alkoxy group having 1 to 6 carbon atoms; an aryl group having 6 to 10 carbon atoms, which may have a halogeno group, an alkyl group, a halogenoalkyl group, or an alkoxy group as a substituent; or an aryloxy group having 6 to 10 carbon atoms, which may have a halogeno group, an alkyl group, a halogenoalkyl group, or an alkoxy group as a substituent; and

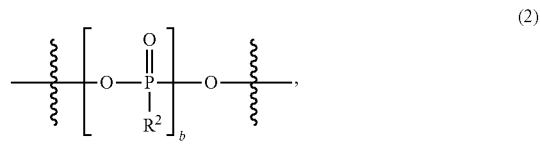
(2)

where, in the formula (2), b represents an integer of 1 to 3, and $R^2$ is the same as described above; and $$Mg[N(SO_2R^{10})_2]_2 \quad (A),$$

where, in the formula (A), each $R^{10}$ independently represents an alkyl group having 1 to 6 carbon atoms, a perfluoroalkyl group having 1 to 6 carbon atoms, a phenyl group, or a perfluorophenyl group.

2. The electrolytic solution for a magnesium battery according to claim 1,
wherein the Lewis acid contains beryllium, boron, aluminum, silicon, tin, titanium, chromium, iron, or cobalt as an element.

3. The electrolytic solution for a magnesium battery according to claim 1,
wherein the Lewis acid contains aluminum as an element.

4. The electrolytic solution for a magnesium battery according to claim 1,
wherein the Lewis acid is aluminum chloride.

5. The electrolytic solution for a magnesium battery according to claim 1,
wherein each $R^1$ in the general formula (I) independently represents a magnesium chloride oxy group (—OMgCl); an alkyl group having 1 to 6 carbon atoms; an alkoxy group having 1 to 6 carbon atoms; a phenyl group which may have a halogeno group, an alkyl group, a halogenoalkyl group, or an alkoxy group as a substituent; a phenoxy group which may have a halogeno group, an alkyl group, a halogenoalkyl group, or an alkoxy group as a substituent; or a group represented by the following general formula (3), or two $R^1$'s form the following general formula (4):

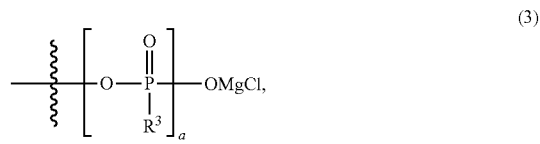
(3)

where in the formula (3), each $R^3$ independently represents a magnesium chloride oxy group (—OMgCl); an alkyl group having 1 to 6 carbon atoms; an alkoxy group having 1 to 6 carbon atoms; a phenyl group which may have a halogeno group, an alkyl group, a halogenoalkyl group, or an alkoxy group as a substituent; or a phenoxy group which may have a halogeno group, an alkyl group, a halogenoalkyl group, or an alkoxy group as a substituent, and a is the same as described above; and

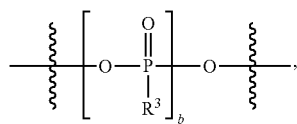
(4)

where, in the formula (4), represents an integer of 1 to 3, and $R^3$ is the same as described above.

6. The electrolytic solution for a magnesium battery according to claim 1,
wherein each $R^1$ in the general formula (I) independently represents a magnesium chloride oxy group (—OMgCl); an alkyl group having 1 to 6 carbon atoms; an alkoxy group having 1 to 6 carbon atoms; a phenyl group which may have an alkoxy group as a substituent; a phenoxy group; or a group represented by the following formula (5), or two $R^1$'s form the following formula (6),

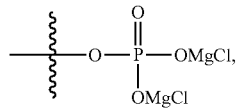
(5)

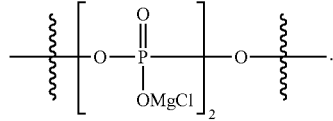
(6)

7. The electrolytic solution for a magnesium battery according to claim 1,
wherein $X^1$ in the general formula (I) is a chlorine atom.

8. The electrolytic solution for a magnesium battery according to claim 1,
wherein the compound represented by the general formula (A) is magnesium bis(trifluoromethanesulfonyl)imide.

9. The electrolytic solution for a magnesium battery according to claim 1,
wherein the solvent comprises at least one selected from the group consisting of ether solvents, halogenated hydrocarbon solvents, carbonate solvents, nitrile solvents, and sulfone solvents.

10. An electrochemical device comprising:
the electrolytic solution according to claim 1;
a positive electrode; and
a negative electrode.

11. A compound represented by the following general formula (I'):

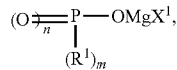
(I')

where, in the formula (I'), m represents 0 or 2,
n represents 2 when m=0 and represents 0 or 1 when m=2,
$X^1$ represents a chlorine atom,
each $R^1$ independently represents a magnesium chloride oxy group (—OMgCl); a magnesium bromide oxy group (—OMgBr); an alkyl group having 1 to 6 carbon atoms, which may have a halogeno group or an alkoxy group as a substituent; an alkoxy group having 1 to 6 carbon atoms; an aryl group having 6 to 10 carbon atoms, which may have a halogeno group, an alkyl group, a halogenoalkyl group, or an alkoxy group as a substituent; an aryloxy group having 6 to 10 carbon atoms, which may have a halogeno group, an alkyl group, a halogenoalkyl group, or an alkoxy group as a substituent; or a group represented by the following general formula (1), or two $R^1$'s may form the following general formula (2):

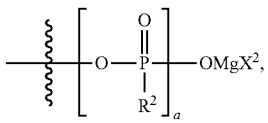
(1)

where, in the formula (1), a represents an integer of 1 to 3, $X^2$ represents a chlorine atom or a bromine atom, and each $R^2$ independently represents magnesium chloride oxy group (—OMgCl); magnesium bromide oxy group (—OMgBr); an alkyl group having 1 to 6 carbon atoms, which may have a halogeno group or an alkoxy group as a substituent; an alkoxy group having 1 to 6 carbon atoms; an aryl group having 6 to 10 carbon atoms, which may have a halogeno group, an alkyl group, a halogenoalkyl group, or an alkoxy group as a substituent; or an aryloxy group having 6 to 10 carbon atoms, which may have a halogeno group, an alkyl group, a halogenoalkyl group, or an alkoxy group as a substituent; and

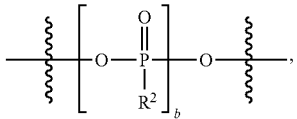
(2)

where, in the formula (2), b represents an integer of 1 to 3, and $R^2$ is the same as described above, and
provided that (i) a case where m=2, n=0, and the two $R^1$'s are the same unsubstituted aryl group having 6 to 10 carbon atoms, and (ii) a case where m=2, n=1, and the two $R^1$'s are the same alkoxy group having 1 to 6 carbon atoms are excluded.

12. The compound according to claim 11,
wherein each $R^1$ in the general formula (I') independently represents magnesium chloride oxy group (—OMgCl); magnesium bromide oxy group (—OMgBr); an alkyl group having 1 to 6 carbon atoms, which has a halogeno group or an alkoxy group as a substituent; an aryl group having 6 to 10 carbon atoms, which has a halogeno group, an alkyl group, a halogenoalkyl group, or an alkoxy group as a substituent; an aryloxy group having 6 to 10 carbon atoms, which may have a halogeno group, an alkyl group, a halogenoalkyl group, or an alkoxy group as a substituent; or the group represented by the general formula (1); or the two $R^1$'s form the general formula (2).

* * * * *